United States Patent
Watanabe

(10) Patent No.: US 7,728,050 B2
(45) Date of Patent: Jun. 1, 2010

(54) CURABLE COMPOSITION, INK COMPOSITION, INKJET RECORDING METHOD, PRINTED MATTER, METHOD FOR PRODUCING PLANOGRAPHIC PRINTING PLATE, PLANOGRAPHIC PRINTING PLATE AND OXETANE COMPOUND

(75) Inventor: Kotaro Watanabe, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 110 days.

(21) Appl. No.: 11/592,199

(22) Filed: Nov. 3, 2006

(65) Prior Publication Data

US 2007/0112088 A1    May 17, 2007

(30) Foreign Application Priority Data

| Nov. 4, 2005 | (JP) | ............................. 2005-320963 |
| Mar. 3, 2006 | (JP) | ............................. 2006-058670 |
| Mar. 20, 2006 | (JP) | ............................. 2006-077675 |

(51) Int. Cl.
*C08F 2/46* (2006.01)
*C08J 3/28* (2006.01)
*C09D 11/00* (2006.01)
*C09D 11/10* (2006.01)
*C09D 11/02* (2006.01)

(52) U.S. Cl. .................. 522/168; 522/181; 522/170; 106/31.13; 106/31.6; 427/508; 427/511; 427/514; 523/160

(58) Field of Classification Search .................. 549/200, 549/510; 522/168, 181; 106/31.13, 31.6; 427/508, 511; 523/160
See application file for complete search history.

(56) References Cited

U.S. PATENT DOCUMENTS

| 5,463,084 | A | * | 10/1995 | Crivello et al. ............. 549/214 |
| 5,547,806 | A |   | 8/1996  | Kamikawa et al. |
| 5,721,020 | A | * | 2/1998  | Takami et al. ............. 427/508 |
| 5,750,590 | A | * | 5/1998  | Schaefer et al. ........... 523/115 |
| 6,166,101 | A | * | 12/2000 | Takami ..................... 522/168 |
| 6,174,967 | B1 |  | 1/2001  | Soucek et al. |
| 6,255,484 | B1 | * | 7/2001 | Kashima et al. ........... 544/219 |
| 6,284,898 | B1 |  | 9/2001  | Moszner et al. |
| 6,495,636 | B2 | * | 12/2002 | Sugiyama et al. ........ 525/326.3 |
| 6,805,439 | B2 | * | 10/2004 | Maeda et al. ................ 347/96 |
| 2001/0002423 | A1 |   | 5/2001 | Sugiyama et al. |
| 2003/0008232 | A1 |   | 1/2003 | Kinsho et al. |
| 2004/0019128 | A1 |   | 1/2004 | Kondo |
| 2004/0052967 | A1 |   | 3/2004 | Takabayashi |
| 2004/0069182 | A1 |   | 4/2004 | Nakajima |
| 2004/0167315 | A1 |   | 8/2004 | Sasa |
| 2004/0227798 | A1 |   | 11/2004 | Nakajima |
| 2004/0244641 | A1 |   | 12/2004 | Takabayashi et al. |
| 2004/0252171 | A1 | * | 12/2004 | Nishizeki et al. ........... 347/100 |
| 2005/0037286 | A1 | * | 2/2005 | Hirabayashi et al. ..... 430/281.1 |
| 2005/0196697 | A1 |   | 9/2005 | Masumi et al. |
| 2005/0224757 | A1 |   | 10/2005 | Syundo et al. |
| 2006/0174799 | A1 |   | 8/2006 | Aoai |
| 2006/0178449 | A1 |   | 8/2006 | Tsuchimura et al. |
| 2007/0206054 | A1 |   | 9/2007 | Watanbe |

FOREIGN PATENT DOCUMENTS

| EP | 0 262 414 A | 4/1988 |
| EP | 1 477 537 A | 11/2004 |
| EP | 1 484 370 A1 | 12/2004 |
| EP | 1 486 526 A1 | 12/2004 |
| EP | 1 557 413 A | 7/2005 |
| EP | 1 688 467 A1 | 8/2006 |
| EP | 1 688 468 A1 | 8/2006 |
| JP | 63-235382 A | 9/1988 |
| JP | 3-216379 A | 9/1991 |
| JP | 5-214280 A | 8/1993 |
| JP | 6-21256 B2 | 3/1994 |
| JP | 6-62905 B2 | 8/1994 |
| JP | 9-183928 A | 7/1997 |
| JP | 11-43540 A | 2/1999 |
| JP | 11-60702 A | 3/1999 |
| JP | 2000-63371 A | 2/2000 |
| JP | 2002-317139 A | 10/2002 |

(Continued)

OTHER PUBLICATIONS

Sangermano et al., "Synthesis and cationic photopolymerization of a new fluorinated oxetane monomer", Polymer 45 (2004) 2133-2139.*

(Continued)

*Primary Examiner*—Sanza L McClendon
(74) *Attorney, Agent, or Firm*—Sughrue Mion, PLLC

(57) ABSTRACT

According to the present invention, provided are a curable composition containing a (A) compound which has a structure having two or more cyclic ether groups, in the molecule and a linking group linking the cyclic ether groups, which contains an alkylene group having 4 or more carbon atoms, or a curable composition containing a compound which has, in the molecule, two or more moiety structures containing 4-membered or more cyclic ether and a moiety structure represented by the following formula (Y-I), and an ink composition comprising the curable composition and a compound represented by the following formula (i).

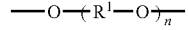

Formula (Y-I)

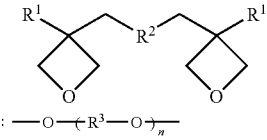

Formula (i)

16 Claims, 1 Drawing Sheet

FOREIGN PATENT DOCUMENTS

| | | |
|---|---|---|
| JP | 2003-192943 A | 7/2003 |
| JP | 2003-192944 A | 7/2003 |
| JP | 2003-312121 A | 11/2003 |
| JP | 2003-341217 A | 12/2003 |
| JP | 2004-91558 A | 3/2004 |
| JP | 2005-2191 A | 1/2005 |
| WO | 2002/020625 | 3/2002 |
| WO | 2006-008251 A2 | 1/2006 |
| WO | 2007/015815 | 2/2007 |

OTHER PUBLICATIONS

Motoi et al. A Facile Synthesis of Oxetane Derivatives for Preparing Cross-Linked Polyoxetane Resins Bearing the Bromide at the Spacer end. Bull. Chem. Soc. Jpn., 61, 1653-1659. (1988).*

Supplementary European Search Report, EP Application No. 07 71 7108.

* cited by examiner

CURABLE COMPOSITION, INK COMPOSITION, INKJET RECORDING METHOD, PRINTED MATTER, METHOD FOR PRODUCING PLANOGRAPHIC PRINTING PLATE, PLANOGRAPHIC PRINTING PLATE AND OXETANE COMPOUND

CROSS-REFERENCE TO RELATED APPLICATION

This application claims priority under 35 USC 119 from Japanese Patent Application Nos. 2005-320963, 2006-058670 and 2006-077675, the disclosures of which are incorporated by reference herein.

BACKGROUND OF THE INVENTION

1. Field of the Invention

The present invention relates to a curable composition that is suitably used for an ink composition, a coating material, and an adhesive, to an ink composition that includes such a curable composition and is suitably used for inkjet recording, to an inkjet recording method, to a printed material using the same, to a planographic printing plate that is obtained using such an ink composition, to a method of manufacturing a planographic printing plate, and to an oxetane compound.

2. Description of the Related Art

Cyclic ether compounds, such as three- or four-membered rings, are known as materials having high reactivity, and are used as polymerizable compounds that are included in curable compositions applied to thermopolymerization using photocationic polymerization or acid anhydrides (for example, Japanese Patent Application Laid-Open (JP-A) No. 11-43540 and No. 11-60702).

As an image recording method of forming an image on a recording medium, such as a paper or the like, on the basis of image data signals, there are an electrophotographic method, a sublimate-type and melt-type thermal transfer method, and an inkjet method. Among these, the inkjet method is feasible with a low cost device, in which an image is directly formed on a recording medium by discharging ink on a necessary image area only. Therefore, the ink can be efficiently used and the running cost is low. In addition, the inkjet method is superior as an image recording method since noise is low.

According to the inkjet method, it is possible to print not only on a normal paper but also on a non-absorptive recording medium, such as a plastic sheet and a metal plate. However, in this case, speeding-up upon printing and high definition are key matters. Further, there is a property in which the time required for drying and curing droplets after printing have a large effect on productivity of printed materials or sharpness of printed images.

As one of the inkjet methods, there is a recording method that uses inkjet recording ink curable by irradiation of radiation. According to this method, since ink droplets are cured by irradiating radiation immediately after or after a predetermined time after ink is ejected, the productivity of printing can be increased and sharp images can be formed.

When high sensitivity of inkjet recording ink curable by irradiation of radiation, such as ultraviolet rays, is realized, high curability with respect to radiation is given, which causes numerous benefits, such as the improvement of the productivity of inkjet recording, the reduction in power consumption, the extension of lifetime due to a reduction in load on a radiation generator, and the prevention of the occurrence of volatilization of low molecule substances by insufficient curing. Further, high sensitivity means the improvement of the strength of an image formed by, in particular, inkjet recording ink. Particularly, if it is applied to the formation of a planographic printing plate, strength of the cured image area is increased, and thus high printing durability can be obtained.

Recently, such an inkjet method curable by radiation, for example, ultraviolet rays has been drawing attention from the point of relatively less odor, quick drying properties, and a capability of recording onto a non-ink absorptive recording medium. Ultraviolet ray curable ink compositions for inkjet using radical polymerization are disclosed (for example, see JP-A No. 63-235382, JP-A No. 3-216379, JP-A No. 5-214280, JP-B No. 6-21256, and JP-B No. 6-62905). Further, with an object of providing inkjet recording ink capable of recording an image without bleeding, but with high sensitivity, and high adhesiveness onto a recording medium, even for a substrate that is normally difficult to directly record by an inkjet recording method, and highly safe due to less irritation and sensitization to skin, compositions including colorants and polymerizable compounds including a specific radial polymerizable acrylate compound group are proposed (for example, see JP-A No. 2003-192943 and JP-A No. 2003-192944). Radical polymerizable ink is superior in a curing rate, and is capable of forming an image without bleeding, but have a problem in that the adhesiveness onto a recording medium is decreased due to volume shrinkage upon curing.

For this reason, with an object of improving the adhesiveness onto a recording medium, cationic polymerizable ink compositions with a lower shrinkage rate upon curing by ultraviolet rays are proposed (for example, see JP-A No. 9-183928). However, cationic polymerizable ink has a big disadvantage for practical use in that the stability during the storage is not sufficient due to a reaction based on acid generated over time. Therefore, as an attempt to improve the storage stability, techniques of adding a basic compound or a thermal base generator are proposed (for example, see JP-A No. 2003-312121, JP-A No. 2003-341217, and JP-A No. 2004-91558). However, it was found a new problem occurs in that the basic compound inhibits the function of acid generated by exposure, thus decreasing the ink curing sensitivity.

Further, multifunctional cyclic ether that is used for improving sensitivity of cationic polymerizable ink has a three-dimensional structure in which polymers obtained by curing are highly cross-linked. For this reason, flexibility of a film after curing is lowered, a crack or separation is likely to occur on the recording medium, and durability of a formed image is problematic.

As such, a curable composition that can be applied to a UV curable ink composition or the like and high sensitive to irradiation of radiation, and can be cured with sufficient flexibility, or a curable composition that has a film formation property with high sensitivity and high strength to irradiation of radiation has not been proposed yet.

An oxetane compound is a substance applied in photocationic polymerization or thermal polymerization using acid anhydride and heretofore, various types thereof have been reported (for example, see Japanese Patent Application Laid-open (JP-A) Nos. 2002-317139, 2005-2191 and 2000-63371).

For example, JP-A No. 2000-63371 discloses an oxetane compound represented by the following formula (oxetane ring-containing (meth)acrylate).

Oxetane ring-containing (meth)acrylate

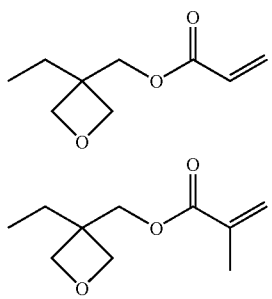

SUMMARY OF THE INVENTION

The present invention has been made in view of the above circumstances and provides a curable composition, an ink composition, an inkjet recording method, printed matter, a method for producing a planographic printing plate, a planographic printing plate, and an oxetane compound.

A first aspect of the present invention provides a curable composition comprising a compound (A) that has a structure having two or more cyclic ether groups, in a molecule and a linking group that links the cyclic ether groups and includes an alkylene group having 4 or more carbon atoms.

A second aspect of the present invention provides a curable composition containing a compound that has, in a molecule, two or more moiety structures containing a 4-membered or more cyclic ether and a moiety structure represented by the following formula (Y-I):

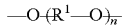  Formula (Y-I)

wherein, in the formula (Y-I), $R^1$ represents an alkylene group, a cycloalkylene group or an arylene group; and n represents an integer of 1 or more.

A third aspect of the present invention provides an inkjet recording method, comprising: ejecting an ink composition onto a recording medium using an inkjet recording apparatus, the ink composition containing a polymerizable compound (a) having two or more moiety structures containing a 4-membered or more cyclic ether and a moiety structure represented by the following formula (Y-I), a compound (b) that generates acid upon exposure to radiation and a colorant (c), and curing the ink composition by irradiation with active radiation.

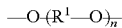  Formula (Y-I)

wherein, in the formula (Y-I), $R^1$ represents an alkylene group, a cycloalkylene group or an arylene group; and n represents an integer of 1 or more.

A fourth aspect of the present invention provides a compound represented by the following formula (i):

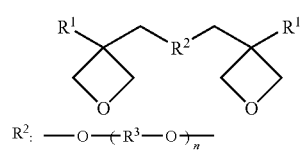  Formula (i)

wherein, in the formula (i), each $R^1$ independently represents an alkyl group, a cycloalkyl group or an aryl group; $R^3$ represents an alkylene group, a cycloalkylene group or an arylene group; and n represents an integer of 1 or more.

DETAILED DESCRIPTION OF THE INVENTION

Curable Composition and Ink Composition

Figure 1:
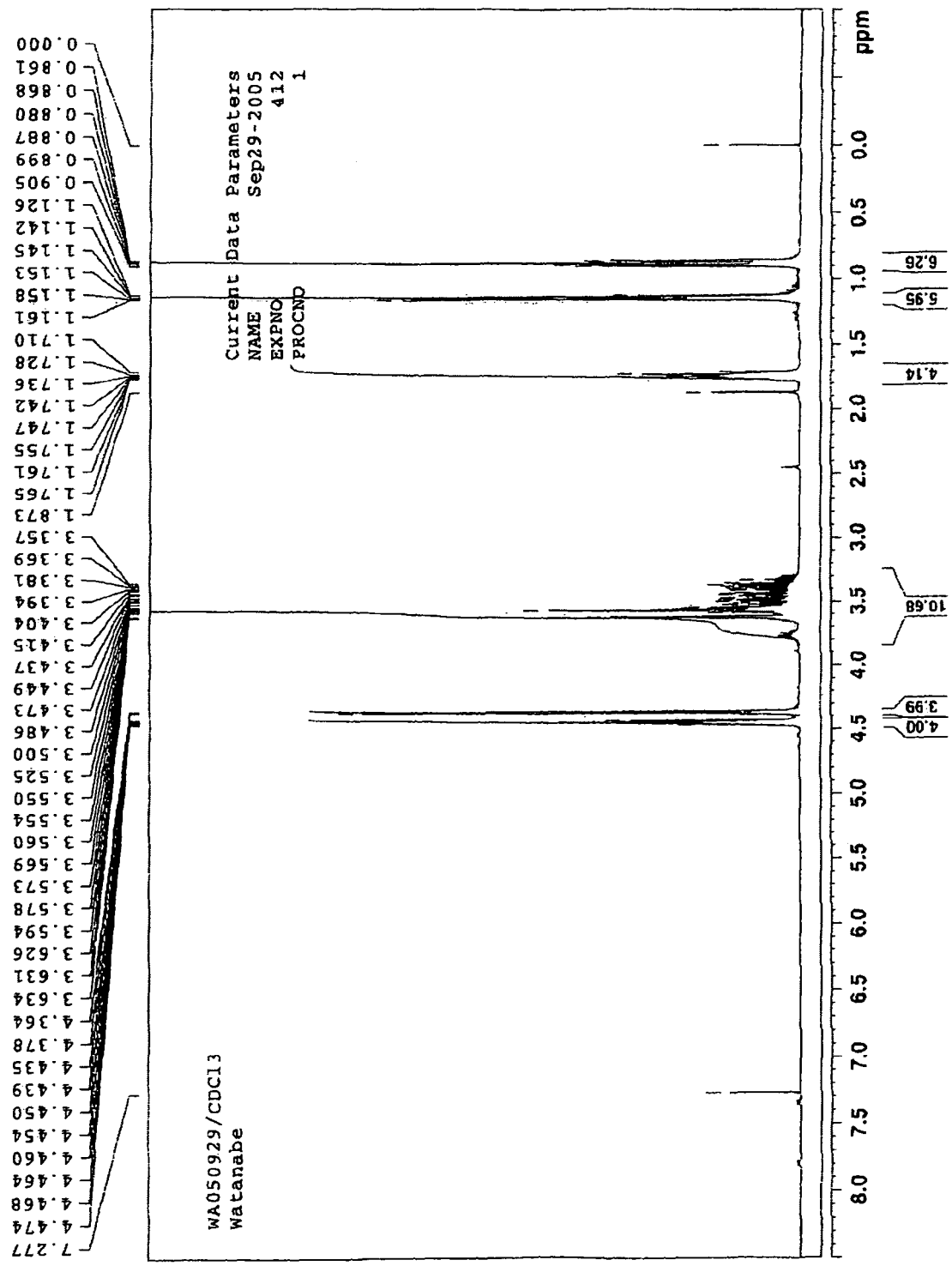
FIG. 1 is a chart showing $^1$H-NMR spectrum measurement results of a compound obtained in Example 19.

The curable composition according to the first embodiment of the invention (hereinafter may be referred to as a "curable composition A") is a curable composition containing a compound (A) (specific polymerizable compound) which has a structure having two or more cyclic ether groups in the molecule and a linking group linking the cyclic ether groups, which contains an alkylene group having 4 or more carbon atoms.

The curable composition A of the invention is a composition, which is curable upon exposure to radiation.

The term "radiation" as used in the invention is not particularly limited as long as it can provide energy capable of generating an initiator and broadly include α-rays, γ-rays, X-rays, ultraviolet rays, visible rays, electron beam and the like. Of these, ultraviolet rays and electron beam are preferred, with ultraviolet rays being particularly preferred from the viewpoint of curing sensitivity and easy availability of devices. Therefore, the curable composition A of the invention is preferably curable composition A, which is curable by irradiating ultraviolet rays as radiations.

A particularly preferable embodiment for the curable composition A of the invention is an ink composition comprising the curable composition A. Hereinafter, the curable composition A of the invention will be described by way of example with reference to an ink composition (ink composition of the invention), but the invention is not limited thereto.

[(A) Compound (Specific Polymerizable Compound) which has a Structure Having Two or More Cyclic Ether Groups in the Molecule and a Linking Group Linking the Cyclic Ether Groups, which Contains an Alkylene Group Having 4 or More Carbon Atoms]

The specific polymerizable compound of the invention is will be described.

The specific polymerizable compound of the invention is a compound having in the molecular structure two or more cyclic ether groups and a linking group linking the cyclic ether groups, which contains an alkylene group having 4 or more carbon atoms.

Further, when the specific polymerizable compound has three or more a cyclic ether groups in the molecule, two cyclic ether groups may be linked by a linking group which contains an alkylene group having 4 or more carbon atoms or all of the cyclic ether groups may be linked by a linking group which contains an alkylene group having 4 or more carbon atoms. The latter is preferred from the viewpoint of good sensitivity and flexibility.

The specific polymerizable compound of the invention is preferably a compound that is cured by initiating polymerization by acid generated from the compound that generates acid upon exposure to radiation, which is to be described later.

A cyclic ether group constituting the specific polymerizable compound is preferably a cyclic ether group having 2 to 9 carbon atoms, more preferably a cyclic ether group having 2 to 6 carbon atoms. Further, the cyclic ether group may form a monocyclic ring or polycyclic ring.

As cyclic ether, specifically from the viewpoint of cationic polymerizability, particularly preferred is cyclic ether shown in the following:

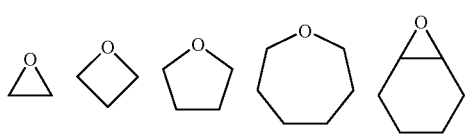

A substituent may be introduced into a carbon atom constituting a cyclic ether group. Examples of the substituent introducible include an alkyl group having 1 to 18 carbon atoms, a cycloalkyl group having 3 to 12 carbon atoms, an aryl group having 6 to 14 carbon atoms, an alkoxy group having 1 to 18 carbon atoms, an aryloxy group having 6 to 10 carbon atoms, an alkylamino group having 1 to 18 carbon atoms and an arylamino group having 6 to 10 carbon atoms.

The specific polymerizable compound of the invention should have two or more cyclic ether groups in the molecule, preferably has 2 to 4 cyclic ether groups, with two cyclic ether groups being more preferred from the viewpoint of suppression of viscosity.

Further, in the specific polymerizable compound, the cyclic ethers present in the molecule may be the same or different from each other.

A linking group linking the cyclic ether groups should have an alkylene group having 4 or more carbon atoms. Examples of the alkylene group having 4 or more carbon atoms include an alkylene group having 4 to 30 carbon atoms, preferably an alkylene group having 4 to 20 carbon atoms, more preferably an alkylene group having 8 to 16 carbon atoms. In particular, a linear alkylene group is preferably used. Specific examples of the alkylene group include an n-butylene group, an n-hexylene group, an n-octylene group, an n-decylene group, an n-dodecylene group and an n-tetradecylene group.

The specific polymerizable compound may contain one alkylene group or may be two or more alkylene groups.

Furthermore, the linking group of the specific polymerizable compound may comprise only an alkylene group having 4 or more carbon atoms or may comprise a combination with other groups.

Examples of the other groups constituting the linking group include —O—, —S—, —C(=O)O—, —N(H)— and a combination thereof.

The preferable embodiment of the specific polymerizable compound includes the following.

Specifically, it include combinations in which two cyclic ethers are present in the molecule, the cyclic ether has a structure forming a 3-membered ring (2 carbon atoms) or 4-membered ring (3 carbon atoms), one alkylene group is also contained and the alkylene group has 5 to 16 carbon atoms. Among them, preferred is a combination in which the cyclic ether has a structure forming a 4-membered ring, i.e., having 3 carbon atoms and the alkylene group has 7 to 16 carbon atoms.

Hereinafter, representative and specific examples of the specific polymerizable compound according to the invention will be described, but the invention is not limited to these specific examples in any way.

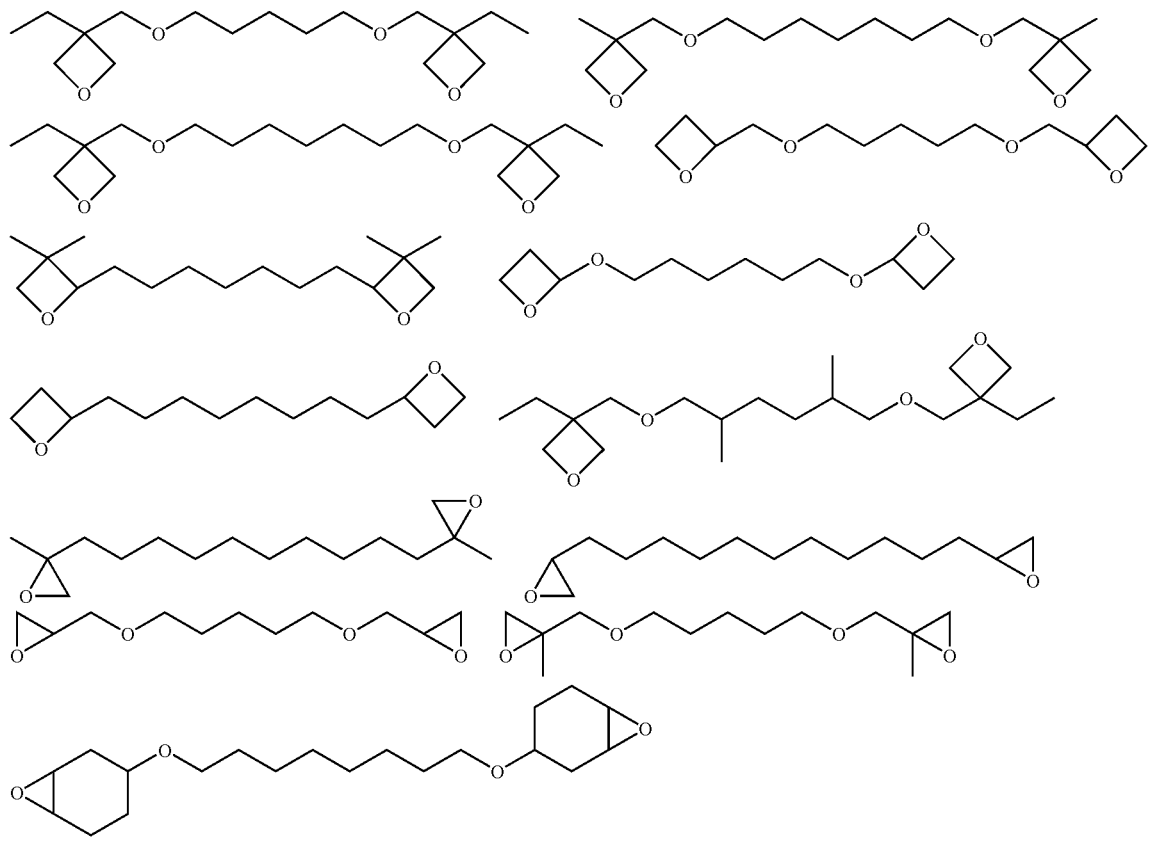

-continued
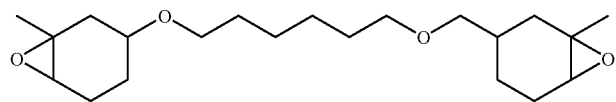
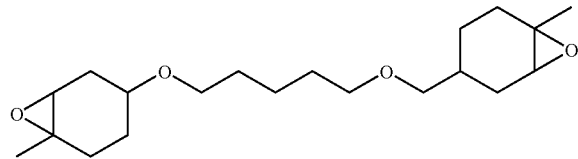
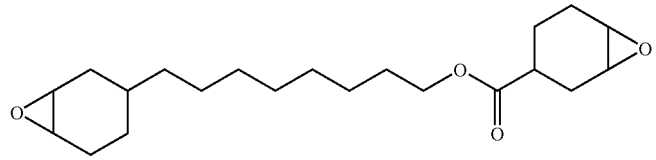
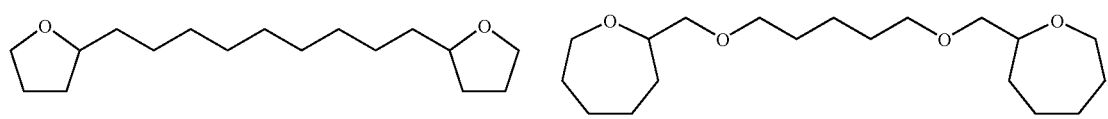
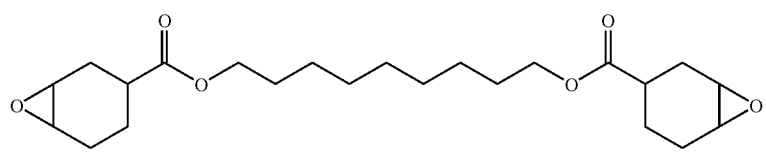
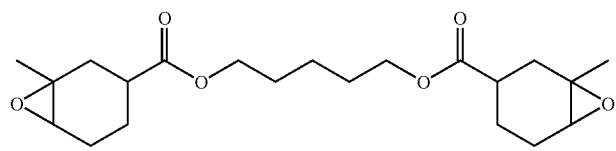
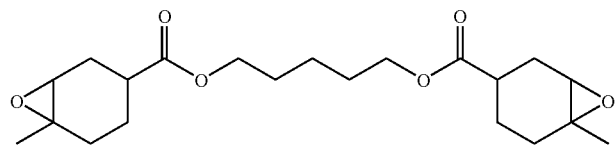
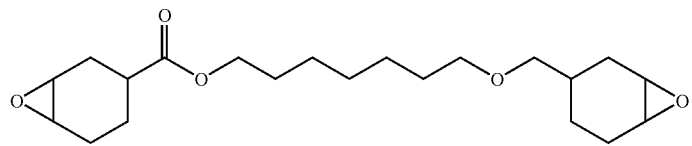
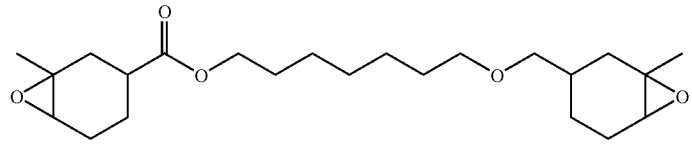
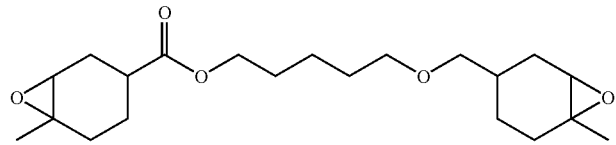

-continued
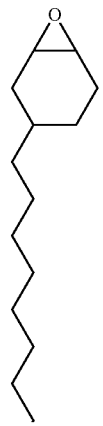
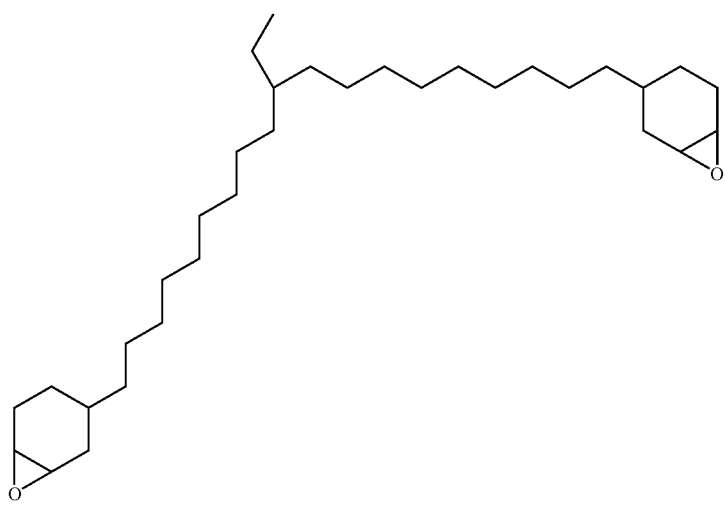
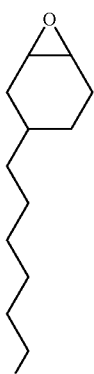

-continued
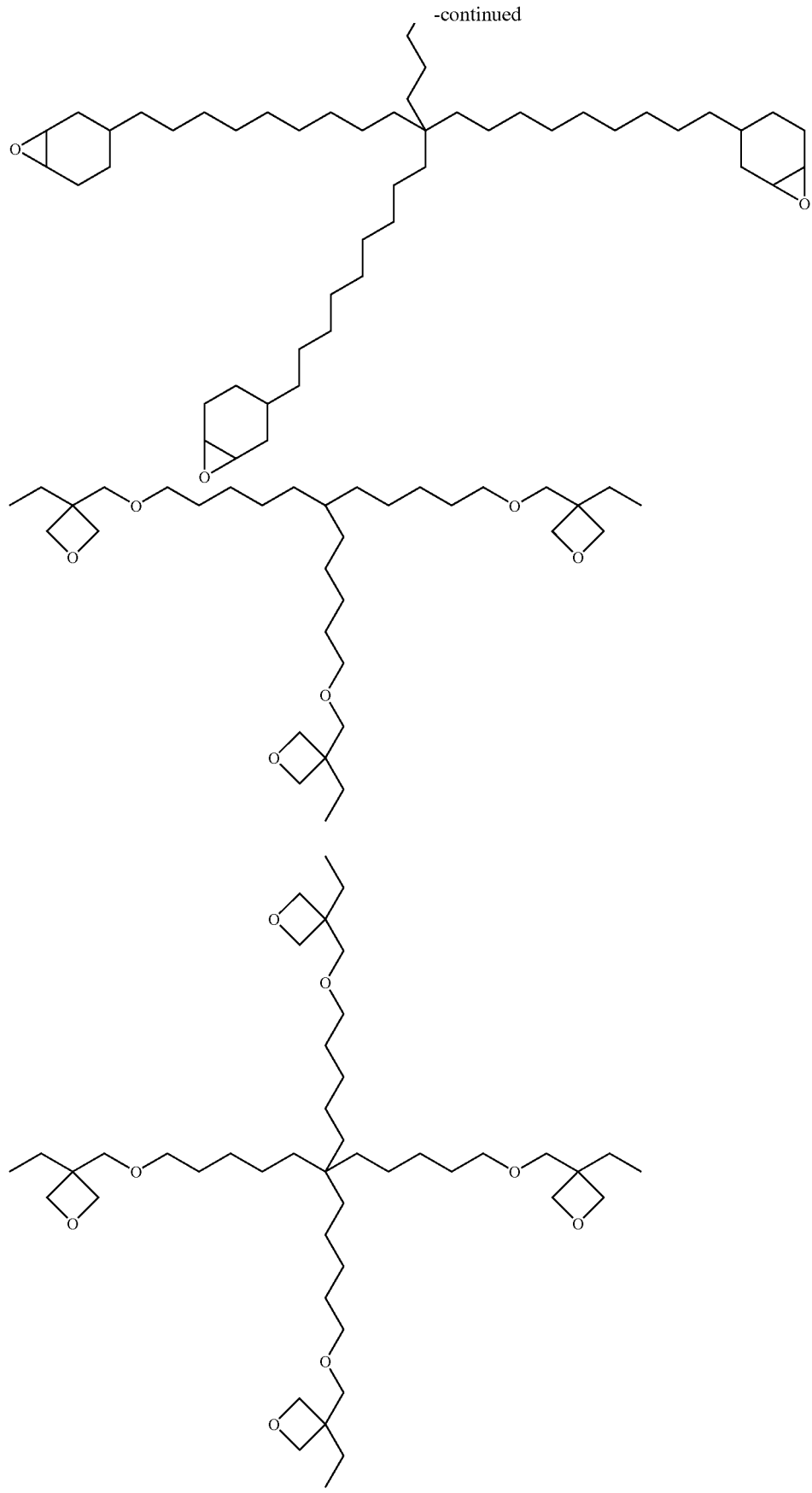

The specific polymerizable compound of the invention may be prepared in according to a conventionally known method for producing a cyclic ether compound and, for example, may be synthesized by the following method.

(1) Raw Materials

The raw materials used in the synthesis of the specific polymerizable compound of the invention will be described.

Any raw material may be used as long as the raw material makes it possible to produce a cyclic ether compound according to the method by Motoi (Motoi et. al., Bull. Chem. Soc. Jpn. 61, 1998) as a dehydrohalogenation reaction and the same desulfonation reaction. Specifically, the specific polymerizable compound of the invention can be produced by an etherification reaction of a cyclic ether alcohol compound represented by the following formula (X-I) and a dihalogenated alkyl compound represented by the following formula (X-II).

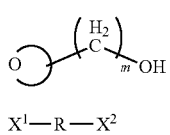

Formula (X-I)

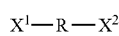

Formula (X-II)

in the formula (X-I), m represents an integer of 0 to 10, preferably 0 to 5, more preferably 0 to 3. Further, the cyclic ether group in the formula (X-I) may be substituted with an alkyl group having 1 to 5 carbon atoms or an aromatic group.

Further, in the formula (X-II), R represents an alkylene group, a cycloalkylene group or an arylene group, and $X^1$ and $X^2$ each independently represents a halogen group.

Specific examples of an oxetane alcohol compound represented by the formula (X-I) include 3-methyl-3-oxetane methanol, 3-methyl-3-oxetane ethanol, 3-methyl-3-oxetane propanol, 3-ethyl-3-oxetane methanol, 3-ethyl-3-oxetane ethanol, 3-ethyl-3-oxetane propanol, 3-propyl-3-oxetane methanol, 3-propyl-3-oxetane ethanol and 3-propyl-3-oxetane propanol. These may be used alone or in a combination of two or more thereof.

Further, more specific examples of the dihalogenated alkyl compound represented by the following formula (X-II) include 1,7-dibromoheptane and 1,8-dibromooctane.

The reaction ratio between the oxetane alcohol compound represented by the formula (X-I) and the dihalogenated alkyl compound represented by the following formula (X-II) is not particularly limited. Preferably, 0.05 to 0.6 mole of the dihalogenated alkyl compound represented by the following formula (X-II) is reacted with 1 mole of the oxetane alcohol compound represented by the formula (X-I). More preferably, 0.2 to 0.5 mole of the halogenated vinyl ether compound represented by the formula (X-II) is reacted with 1 mole of the oxetane alcohol compound represented by the formula (X-I).

(2) Reaction Temperature

The following will describe the reaction temperature upon the production of the specific polymerizable compound of the invention. The reaction temperature for reacting the above-mentioned two components is decided, considering the yield of the specific polymerizable compound or the like, but the reaction temperature is in the range of preferably 0 to 100° C., more preferably 10 to 90° C., and even more preferably 20 to 80° C. from the viewpoint of reactivity between the raw materials and yield improvement, and the degree of freedom of selectivity of organic solvents usable.

(3) Reaction Time

Next, the following will describe the reaction time upon the production of the specific polymerizable compound of the invention. The reaction time is decided, considering the yield of the specific polymerizable compound, the reaction temperature or the like. For example, a value in the range of 10 minutes to 100 hours is preferable at the preferable reaction temperature of 0 to 100° C. In this reaction time range, unreacted raw materials are not remained and thus high productivity can be attained. The reaction time upon the production of the specific polymerizable compound is more preferably set to a value in the range of 30 minutes to 50 hours and even more preferably set to a value in the range of 1 to 10 hours.

(4) Reaction Atmosphere (pH)

The following will describe the reaction atmosphere (pH) upon the production of the specific polymerizable compound of the invention. The reaction atmosphere (pH value) is decided, considering the yield of the specific polymerizable compound or the like, but the reaction atmosphere is preferably in the range of 5 to 14 from the viewpoint of suppression of a side reaction and the degree of freedom on the selection of raw materials used. The pH value upon the production of the specific polymerizable compound is more preferably set to a value in the range of 6 to 14 and even more preferably set to a value in the range of 7 to 14. In order to adjust the pH value in these ranges, it is preferable to add alkali such as sodium hydroxide and potassium hydroxide.

(5) Phase Transfer Catalyst

The following will describe the phase transfer catalyst used upon the production of the specific polymerizable compound of the invention. This phase transfer catalyst is preferably added during the reaction to improve the reactivity of the oxetane alcohol compound and the dihalogenated alkyl compound. For example, the added amount of the phase transfer catalyst is preferably set to a value in the range of 0.1 to 30 parts by weight per 100 parts by weight of the total amount of the raw materials, from the viewpoint of expression properties of effects such as the improvement in the reactivity and yield by addition, and easy purification of the specific polymerizable compound obtained. The added amount of the phase transfer catalyst is more preferably set to a value in the range of 1.0 to 20.0 parts by weight and even more preferably set to a value in the range of 2.0 to 10.0 parts by weight per 100 parts by weight of the total amount of the raw materials.

The kind of the phase transfer catalyst is not particularly limited. For example, the phase transfer catalyst is preferably at least one compound selected from the group consisting of a quaternary ammonium salt compound and a quaternary phosphonium salt compound. More particular examples of the phase transfer catalyst include tetra-n-butylammonium bromide, tetramethylammonium bromide, benzyltriethylammonium bromide, hexadecyltrimethylammonium bromide, triethylhexadecylammonium bromide, trioctylmethylammonium bromide, methyltriphenylphosphonium bromide, triethylhexadecylphosphonium bromide, tetraphenylphosphonium bromide and tetrabutylphosphonium bromide. These may be used alone or in combination of two or more thereof.

(6) Organic Solvent

The following will describe the organic solvent used upon the production of the specific polymerizable compound of the invention. This organic solvent is preferably a liquid whose boiling point under the atmospheric pressure is 250° C. or lower since the liquid is a good solvent for the raw materials and the production can be easily made. Examples of the organic solvent include hydrocarbons such as hexane, heptane and octane, halogenated hydrocarbons such as dichloromethane and chloroform, ethers such as diethyl ether, dibutyl ether, ethylene glycol dimethyl ether, tetrahydrofuran and dioxane, ketones such as acetone, methyl ethyl ketone, methyl isobutyl ketone and cyclohexanone, esters such as ethyl acetate, butyl acetate, amyl acetate and γ-butyrolactone, and aromatic hydrocarbons such as benzene, toluene and xylene. These may be used alone or in combination of two or more thereof.

A structure of the compound obtained by the production method can be identified from $^1$H-NMR and IR spectra.

In the curable composition A of the invention, the content of the specific polymerizable compound is preferably 1 to 90% by weight, more preferably 1 to 70% by weight, and even more preferably 1 to 50% by weight based on the total solid content constituting a composition.

Further, if the specific polymerizable compound has three or more cyclic ethers in the molecule, the content of the specific polymerizable compound is preferably 0.1 to 30% by weight, more preferably 1 to 20% by weight, and even more preferably 1 to 10% by weight based on the total solid content constituting a composition.

The preferable content range of the specific polymerizable compound is applicable in the case that the curable composition A of the invention is used in an ink composition.

The curable composition according to the second embodiment of the invention (hereinafter may be referred to as a "curable composition B") contains a compound which has two or more moiety structures containing 4-membered or more cyclic ether moiety and a moiety structure represented by the following formula (Y-I) (hereinafter referred to as a "specific polymerizable compound").

(Specific Polymerizable Compound)

The specific polymerizable compound according to the invention will be described.

The specific polymerizable compound is a compound having two or more moiety structures containing 4-membered or more cyclic ether and a moiety structure represented by the following formula (Y-I) in its molecular structure.

The specific polymerizable compound according to the invention is preferably a compound that is cured by initiating polymerization by acid generated from the compound that generates acid upon exposure to radiation, which is to be described later.

The 4-membered or more cyclic ether contained in the molecule is preferably cyclic ether having 3 to 9 carbon atoms, more preferably cyclic ether having 3 to 7 carbon atoms.

As the cyclic ether contained in the moiety structure (Y-I), specifically, from the viewpoint of reactivity, particularly preferred is cyclic ether shown in the following figures:

FIG. 1

FIG. 2

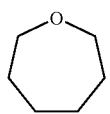

FIG. 3

The moiety structure represented by the following formula (Y-I) cyclic ether is linked to a carbon atom of cyclic ether via a linking group such as an alkylene group.

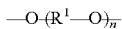 Formula (Y-I)

in the formula (Y-I), $R^1$ represents an alkylene group, a cycloalkylene group or an arylene group.

In the formula (Y-I), examples of the alkylene group represented by $R^1$ include an alkylene group having carbon atoms 2 to 12 (preferably 2 to 8, more preferably 2 to 6). Specific examples thereof include an ethylene group, a propylene group, an isopropylene group, a butylene group, a pentylene group and a hexylene group.

Examples of the cycloalkylene group represented by $R^1$ include a cycloalkylene group having carbon atoms 4 to 12 (preferably 4 to 8, more preferably 5 to 7). Specific examples thereof include a cycloheptyl group, a cyclohexyl group, a cyclopentyl group and a bicyclic group.

Examples of the arylene group represented by $R^1$ include an arylene group having carbon atoms 6 to 12 (preferably 6 to 12, more preferably 6 to 8). Specific examples thereof include a phenyl group, a biphenyl group, a naphthyl group and a benzyl group, preferably a phenyl group and a benzyl group.

Among these, $R^3$ is preferably an alkyl group, more preferably an alkyl group having 1 to 4 carbon atoms.

$R^1$ may be further substituted with substituents, if introducible. Examples of substituents introducible to $R^1$ include a halogen atom, an alkoxy group, an aryloxy group, a nitro group and an amino group.

The moiety structure containing 4-membered or more cyclic ether in the specific polymerizable compound may have a substituent selected from an alkyl group, a cycloalkyl group or an aryl group and the substituent linked to both cyclic ether moieties may be the same or different from each other.

Examples of the alkyl group introducible to a cyclic ether moiety include an alkyl group having carbon atoms 1 to 10 (preferably 1 to 6, more preferably 1 to 4). Specific examples thereof include a methyl group, an ethyl group, a propyl group, an isopropyl group, a butyl group, a pentyl group and a hexyl group.

The alkyl group is preferably a methyl group, an ethyl group, a propyl group, an isopropyl group, a butyl group and a pentyl group, more preferably a methyl group, an ethyl group, a propyl group and an isopropyl group.

Examples of the cycloalkyl group introducible to a cyclic ether moiety include a cycloalkyl group having carbon atoms 4 to 12 (preferably 5 to 7, more preferably 5 to 6). Specific examples thereof include a cycloheptyl group, a cyclohexyl group, a cyclopentyl group and a bicyclic group.

The cycloalkyl group is preferably a cycloheptyl group, a cyclohexyl group and a cyclopentyl group, more preferably a cycloheptyl group and a cyclohexyl group.

Examples of the aryl group introducible to a cyclic ether moiety include an aryl group having carbon atoms 6 to 12 (preferably 6 to 8). Specific examples thereof include a phenyl group, a biphenyl group, a naphthyl group and a benzyl group.

The aryl group is preferably a phenyl group, a biphenyl group, a naphthyl group and a benzyl group, more preferably a phenyl group and a benzyl group.

Among these, the substituent on the cyclic ether moiety is preferably an alkyl group, more preferably an alkyl group having carbon atoms 1 to 4.

The substituents on both cyclic ether moieties may be the same or different from each other, but are preferably the same from the viewpoint of synthesis suitability and the substituents are most preferably an alkyl group having 1 to 4 carbon atoms from the viewpoint of polymerization reactivity.

The specific polymerizable compound of the invention is particularly preferably one wherein cyclic ether moieties have an alkyl group having 1 to 4 carbon atoms and $R^1$ is an alkylene group having 1 to 4 carbon atoms.

n represents an integer of 1 or more, preferably an integer of 1 to 8, more preferably an integer of 2 to 6, and particularly preferably an integer of 2 to 4, from the viewpoints of low viscosity and high sensitivity.

The substituent selected from an alkyl group a cycloalkyl group or an aryl group introduced to the cyclic ether moiety may have further substituents, if introducible and examples of the substituent introducible include those exemplified for $R^1$.

Hereinafter, representative and specific examples of the specific polymerizable compound according to the invention, having two moiety structures containing a cyclic ether moiety are shown, but the invention is not limited to these specific examples in any way.

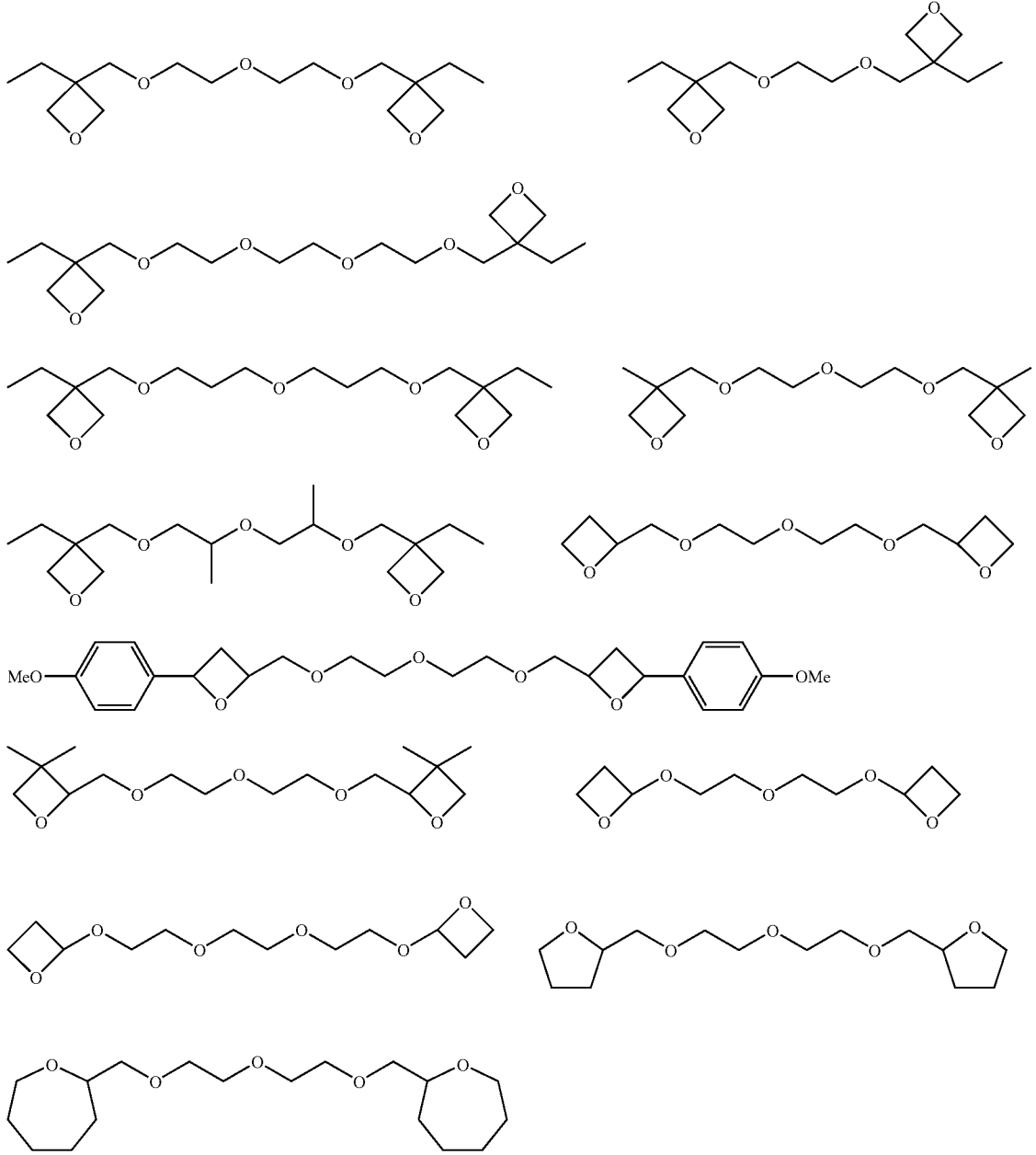

Hereinafter, specific examples of the specific polymerizable compound according to the invention, having three or four moiety structures containing a cyclic ether moiety are shown, but the invention is not limited to these specific examples in any way.

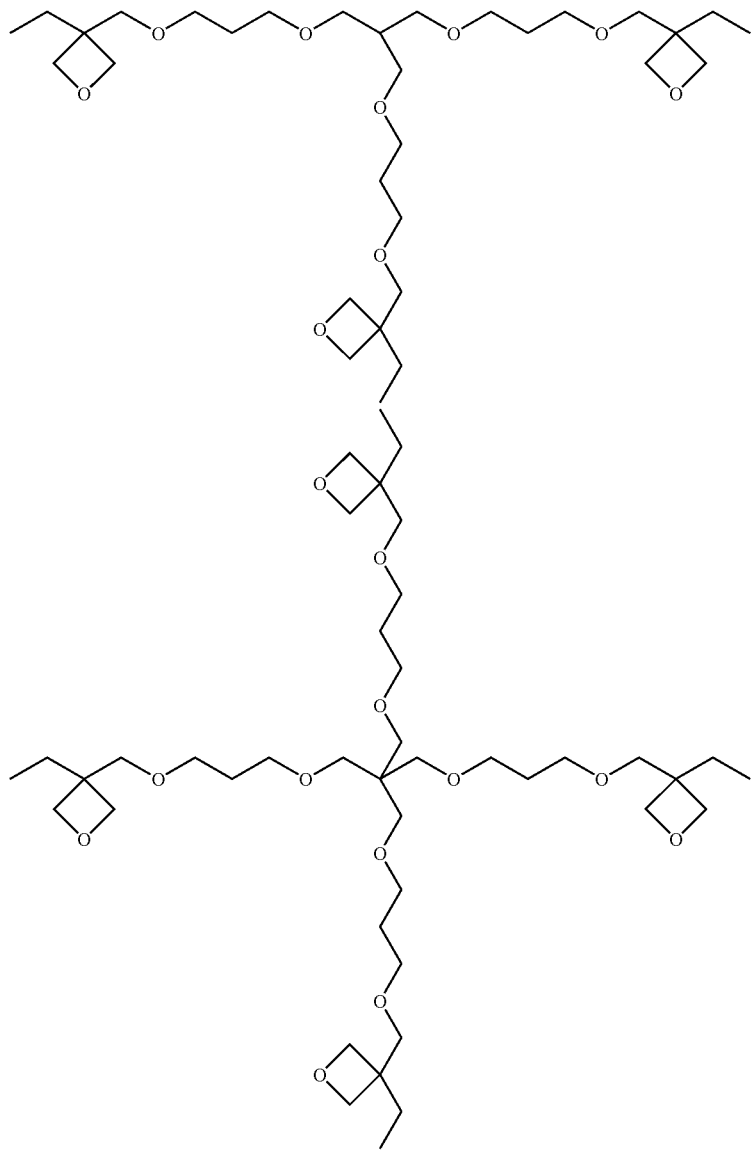

The specific polymerizable compound may be produced by a conventionally known method. Further, the specific polymerizable compound may be produced by applying a production method described in the third embodiment of the invention, which is to be described later.

The content of the specific polymerizable compound is preferably 1 to 90% by weight, more preferably 1 to 70% by weight, and even more preferably 1 to 50% by weight based on the total solid content constituting the curable composition of the invention B.

Unless particularly noted, the following description is common to the curable compositions A and B of the invention.

The curable composition and the ink composition of the invention may comprises, together with the specific polymerizable compound, other polymerizable compounds (cationic polymerizable compounds) described in detail below, within the range not damaging the effects of the invention.

In the invention, the curable composition and the ink composition of the invention preferably comprise the specific polymerizable compound, at least one compound selected from an epoxy compound or other oxetane compounds not included in the specific polymerizable compound, as described below as the other polymerizable compounds, and a vinyl ether compound, from the viewpoint of effectively suppressing the shrinkage during the curing of the composition.

[Other Polymerizable Compound]

The cationic polymerizable compound may be used together in the invention, is not particularly limited as long as it is a compound which is cured by initiating polymerization by acid generated from the compound which generates acid upon exposure to radiation, which is to be described later and may be various known cationic polymerizable monomers as a photo-cationic polymerizable monomer. Examples of the cationic polymerizable monomer include epoxy compounds, vinyl ether compounds, and other oxetane compounds not included in the specific polymerizable compound described in JP-A Nos. 6-9714, 2001-31892, 2001-40068, 2001-55507, 2001-310938, 2001-310937, 2001-220526 and the like.

Examples of the epoxy compounds include aromatic epoxides, alicyclic epoxides and aliphatic epoxides.

The aromatic epoxides are di- or polyglycidyl ethers prepared by the reaction between polyhydric phenol having at least one aromatic nucleus or an alkylene oxide adduct thereof and epichlorohydrin, including for example, di- or polyglycidyl ethers of bisphenol A or an alkylene oxide adduct thereof, di- or polyglycidyl ethers of hydrogenated bisphenol A or an alkylene oxide adduct thereof and novolak type epoxy resin. Here, examples of the alkylene oxide include ethylene oxide and propylene oxide.

Alicyclic epoxides are preferably cyclohexene oxide or cyclopentene oxide-containing compounds that are produced by epoxidizing a compound having at least one cycloalkane ring such as cyclohexene and cyclopentene ring with an appropriate oxidizing agent such as hydrogen peroxide and peracid.

The aliphatic epoxides include di- or polyglycidyl ethers of aliphatic polyhydric alcohol or an alkylene oxide adduct thereof and the like. Representative examples thereof include diglycidyl ethers of alkylene glycols such as diglycidyl ether of ethylene glycol, diglycidyl ether of propylene glycol or diglycidyl ether of 1,6-hexanediol; polyglycidyl ethers of polyhydric alcohol such as di- or triglycidyl ethers of glycerine or an alkylene oxide adduct thereof, and diglycidyl ethers of polyalkylene glycols such as diglycidyl ethers of polyethylene glycol or an alkylene oxide adduct thereof, diglycidyl ethers of polypropylene glycol or an alkylene oxide adduct thereof. Here, examples of the alkylene oxide include ethylene oxide and propylene oxide.

Monofunctional and multifunctional epoxy compounds usable in the invention will be exemplified in detail.

Examples of the monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Further, examples of the multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-metha-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicylopentadiene diepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxy octane, and 1,2,5,6-diepoxy cyclooctane.

Among these epoxy compounds, the aromatic epoxides and alicyclic epoxides are preferable since they are excellent in the curing rate. The alicyclic epoxides are particularly preferable.

Examples of the vinyl ether compounds include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether; and monovinyl ether compounds such as ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, iso-propyl vinyl ether, iso-propenyl ether-O-propylene carbonate, dodecyl vinyl ether, diethylene glycol monovinyl ether and octadecyl vinyl ether.

Hereinafter, monofunctional and multifunctional vinyl ethers will be exemplified in detail.

Examples of the monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Further, examples of multifunctional vinyl ethers include: divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

From the viewpoint of curing properties, adhesion to a recording medium, and the surface hardness of an image formed, the vinyl ether compound is preferably a di- or trivinyl ether compound, particularly preferably a divinyl ether compound.

As the oxetane compound in the present invention in particular which is a compound not included the moiety structure (X-II), any one of known oxetane compounds such as described in JP-A Nos. 2001-220526, 2001-310937, and 2003-341217 may be selected and used.

The oxetane ring-containing compound employable for the specific polymerizable compound of the present invention is preferably a compound having 1 to 4 oxetane rings in its structure. By using such a compound, the viscosity of the composition can be readily kept within a range of excellent handling properties, and high adhesiveness of the cured composition onto the recording medium can be obtained, when it is applied in ink composition and the like.

Examples of the compound having 1 to 2 oxetane rings in a molecule include the compounds represented by the following formulae (1) to (3).

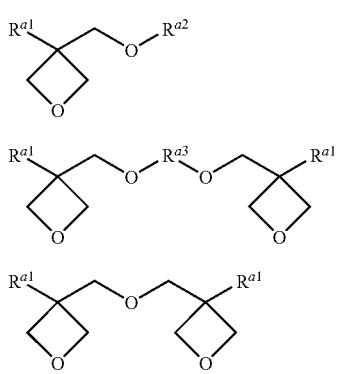

$R^{a1}$ represents a hydrogen atom, an alkyl group having 1 to 6 carbon atoms, a fluoroalkyl group having 1 to 6 carbon atoms, an allyl group, an aryl group, a furyl group, or a thienyl group. If there are two $R^{a1}$ in a molecule, they may be the same or different.

Examples of the alkyl group include a methyl group, an ethyl group, a propyl group, and a butyl group. Preferred examples of the fluoroalkyl group include the alkyl groups wherein any one of hydrogens is substituted with the fluorine atom.

$R^{a2}$ represents a hydrogen atom, an alkyl group having 1 to 6 carbon atoms, an alkenyl group having 2 to 6 carbon atoms, a group having one or more aromatic rings, an alkylcarbonyl group having 2 to 6 carbon atoms, an alkoxycarbonyl group having 2 to 6 carbon atoms, and an N-alkylcarbamoyl group having 2 to 6 carbon atoms.

Examples of the alkyl group include a methyl group, an ethyl group, a propyl group, and a butyl group. Examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group. Examples of the group having one or more aromatic rings include a phenyl group, a benzyl group, a fluorobenzyl group, a methoxybenzyl group, and a phenoxyethyl group.

Examples of the alkylcarbonyl group include an ethylcarbonyl group, a propylcarbonyl group, and a butylcarbonyl group. Examples of the alkoxycarbonyl group include an ethoxycarbonyl group, a propoxycarbonyl group, and a butoxycarbonyl group. Examples of the N-alkylcarbamoyl group include an ethylcarbamoyl group, a propylcarbamoyl group, a butylcarbamoyl group, and a pentylcarbamoyl group.

Further, $R^{a2}$ may have the substituent and examples of the substituent include an alkyl group having 1 to 6 carbon atoms and a fluorine atom.

$R^{a3}$ represents a linear or branched alkylene group, a linear or branched poly(alkyleneoxy) group, a linear or branched unsaturated hydrocarbon group, a carbonyl groups or an alkylene group including one or more carbonyl groups, or one or more carboxyl groups, an alkylene group including one or more carbamoyl groups, or the following groups. Examples of the alkylene group include an ethylene group, a propylene group, and a butylene group. Examples of the poly(alkyleneoxy) group include a poly (ethyleneoxy) group and a poly (propyleneoxy) group.

Examples of the unsaturated hydrocarbon group include a propenylene group, a methylpropenylene group, and a butenylene group.

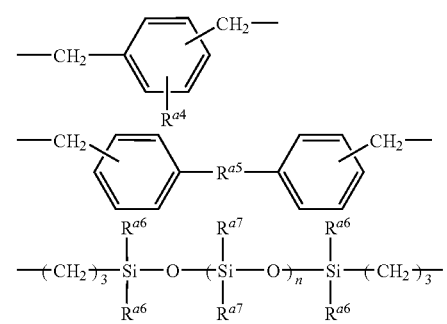

In the polyvalent groups, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group.

$R^{a5}$ represents an oxygen atom, a sulfur atom, a methylene group, NH, SO, $SO_2$, $C(CF_3)_2$, or $C(CH_3)_2$.

$R^{a6}$ represents an alkyl group having 1 to 4 carbon atoms or an aryl group. n is an integer of 0 to 2000.

$R^{a7}$ represents an alkyl group having 1 to 4 carbon atoms, an aryl group, or a monovalent group having the following structure.

In the monovalent group, $R^{a8}$ represents an alkyl group having 1 to 4 carbon atoms or an aryl group. m is an integer of 0 to 100.

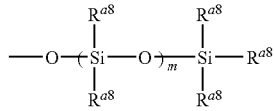

Examples of the compound represented by the formula (1) include 3-ethyl-3-hydroxymethyloxetane (trade name: OXT-101, available from Toagosei Co., Ltd.), 3-ethyl-3-(2-ethylhexyloxymethyl)oxetane (trade name: OXT-212, available from Toagosei Co., Ltd.), and 3-ethyl-3-phenoxymethyloxetane (trade name: OXT-211, available from Toagosei Co., Ltd.). Examples of the compound represented by the formula (2) include 1,4-bis[(3-ethyl-3-oxetanylmethoxy)methyl]benzene (trade name: OXT-121, available from Toagosei Co., Ltd.).

Examples of the compound having 3 to 4 oxetane rings include the compounds represented by the following formula (4).

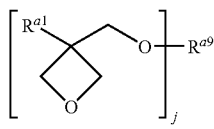
(4)

In the formula (4), $R^{a1}$ is synonymous with $R^{a1}$ in the formula (1). $R^{a9}$ represents a polyvalent linking group. Examples thereof include a branched alkylene group having 1 to 12 carbon atoms such as groups represented by A to C below, a branched poly(alkyleneoxy) group such as a group represented by D below, and a branched polysiloxy group such as a group represented by E below. J is 3 or 4.

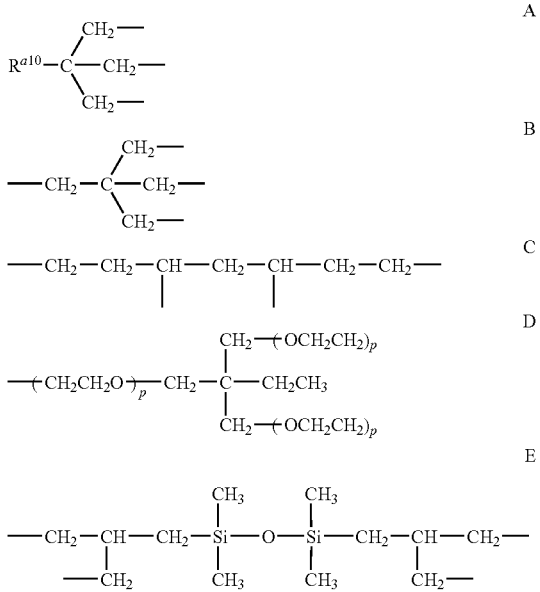

In A, $R^{a10}$ represents a methyl group, an ethyl group, and a propyl group. In D, p is an integer of 1 to 10.

Another mode of the oxetane compound preferably used in the present invention includes a compound represented by the formula (5) having an oxetane ring on the side chain.

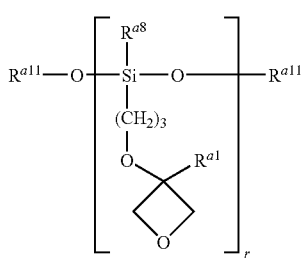
(5)

In the formula (5), $R^{a1}$ and $R^{a8}$ are synonymous with aforesaid $R^{a1}$ and $R^{a8}$. $R^{a11}$ represents an alkyl group having 1 to 4 carbon atoms such as a methyl group, an ethyl group, a propyl group, or a butyl group, or a trialkylsilyl group. r is 1 to 4.

Examples of such an oxetane ring-containing compounds are described in detail in JP-A No. 2003-341217, paragraphs [0021] to [0084]. The compounds described therein can be preferably used in the present invention.

Oxetane compounds described in JP-A No. 2004-91556 may be used together in the present invention. The compounds are described in detail in paragraphs [0022] and [0058] in the document.

Among the oxetane compounds used in the present invention, a compound having one oxetane ring is preferably used from the viewpoint of viscosity and cohesiveness of the ink composition.

In the invention, when the specific polymerizable compound and other cationic polymerizable compounds are used together, the content ratio between the specific polymerizable compound and the other cationic polymerizable compounds is preferably 10:1 to 10:100, more preferably 10:3 to 10:80, and even more preferably 10:5 to 10:60 in terms of weight ratio.

[(B) Compound Generating Acid Upon Exposure to Radiation]

The curable composition and ink composition of the invention preferably contain a compound that generates acid upon exposure to radiation (hereinafter sometimes referred to as a "photoacid generator"). In the invention, the polymerizable compound is cured by initiating polymerization by acid generated upon exposure to radiation.

As for this photoacid generator, a photoinitiator for photocationic polymerization, a photoinitiator for photoradical polymerization, a photo-decolorant for dyes, a photo-decolorant, or a compound generating an acid upon irradiation with rays (ultraviolet rays of 400 to 200 nm, far ultraviolet rays, particularly preferably g rays, h rays, i rays and a KrF eximer laser) which are used for microresist and the like, an ArF excimer laser, electron beam, X-rays, molecular beam or ion beam may be appropriately selected and used.

Examples of the photoacid generator include onium salts such as diazonium salts, phosphonium salts, sulfonium salts and iodonium salts; and sulfonate compounds such as imidosulfonates, oxime sulfonates, diazodisulfones, disulfones and o-nitrobenzyl sulfonates that may be thermally decomposed to generate acid upon exposure to radiation.

Further, the other compounds (photoacid generator) generating an acid upon irradiation with actinic rays or radiation, include, for example, onium salts such as diazonium salts described in S. I. Schlesinger, Photogr. Sci. Eng., 18, 387 (1974) and T. S. Bal et al., Polymer, 21, 423 (1980), ammonium salts described in U.S. Pat. Nos. 4,069,055, 4,069,056 and Re 27,992, and JP-A No. 3-140140, phosphonium salts described in D. C. Necker et al., Macromolecules, 17, 2468 (1984), C. S. Wen et al., Teh. Proc. Conf. Rad. Curing ASIA, p. 478, Tokyo, October (1988), U.S. Pat. Nos. 4,069,055 and 4,069,056, iodonium salts described in J. V. Crivello et al., Macromolecules, 10 (6), 1307 (1977), Chem. & Eng. News, November 28, P. 31 (1988), European Patent Nos. 104,143, 339,049 and 410,201, JP-A No. 2-150848 and JP-A No. 2-296514, sulfonium salts described in J. V. Crivello et al., Polymer, J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al., Macromolecules, 14 (5), 1141 (1981), J. V Crivello et al., J. Polymer Sci., Polymer Chem. Ed., 17, 2877 (1979), European Patent Nos. 370,693, 161, 811, 410,201, 339,049, 233,567, 297,443 and 297,442, U.S. Pat. Nos. 3,902,114, 4,933,377, 4,760,013, 4,734,444 and 2,833,827, German Patent Nos. 2,904,626, 3,604,580 and 3,604,581, JP-A No. 7-28237 and JP-A No. 8-27102, selenonium salts described in J. V Crivello et al., Macromolecules, 10 (6), 1307 (1977) and J. V. Crivello et al., J. Polymer Sci., Polymer Chem. Ed., 17, 1047 (1979) and onium salts such as arsonium salts described in C. S. Wen et al., Teh. Proc. Conf. Rad. Curing ASIA, p. 478, Tokyo, October (1988); organic halogen compounds described in U.S. Pat. No. 3,905,815, JP-B No. 46-4605, JP-A No. 48-36281, JP-A No. 55-32070, JP-A No. 60-239736, JP-A No. 61-169835, JP-A No. 61-169837, JP-A No. 62-58241, JP-A No. 62-212401, JP-A No. 63-70243 and JP-A No. 63-298339; organic metals/organic halides described in K. Meier et al., J. Rad. Curing, 13 (4), 26 (1986), T. P. Gill et al., Inorg. Chem., 19, 3007 (1980), D. Astruc, Acc. Chem. Res., 19 (12), 377 (1986) and JP-A No. 2-161445, photoacid generators having an o-nitrobenzyl type protecting group described in S. Hayase et al., J. Polymer Sci., 25, 753 (1987), E. Reichmanis et al., J. Polymer Sci., Polymer Chem. Ed., 23, 1 (1985), Q. Q. Zhu et al., J. Photochem., 36, 85, 39, 317 (1987), B. Amit et al., Tetrahedron Lett., (24), 2205 (1973), D. H. R. Barton et al., J. Chem. Soc., 3571 (1965), P. M. Collins et al., J. Chem. Soc., Perkin I, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11 (4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130 (6), F. M. Houlihan et al., Macromolecules, 21, 2001 (1988), European Patent Nos. 0,290,750, 046,083, 156,535, 271,851 and 0,388,343, U.S. Pat. Nos. 3,901,710 and 4,181,531, JP-A No. 60-198538 and JP-A No. 53-133022;

compounds producing sulfonic acids by photolysis which are represented by iminosulfonates described in M. Tunooka et al., Polymer Preprints Japan, 35 (8), G Berner et al., J. Rad. Curing, 13 (4), W. J. Mijs et al., Coating Technol., 55 (697), 45 (1983), Akzo, H. Adachi et al., Polymer Preprints Japan, 37(3), European Patent Nos. 0,199,672, 84,515, 044,115, 618,564, and 0,101,122, U.S. Pat. Nos. 4,371,605 and 4,431, 774, JP-A No. 64-18143, JP-A No. 2-245756 and JP-A No. 3-140109; disulfone compounds described in JP-A No. 61-166544 and JP-A No. 2-71270; and diazoketosulfone and diazodisulfone compounds described in JP-A No. 3-103854, JP-A No. 3-103856 and JP-A No. 4-210960.

Also, polymer compounds in which these groups or compounds generating acids with these rays are introduced into their main chains or side chains can be used. Examples of such compounds are described in M. E. Woodhouse et al., J. Am. Chem. Soc., 104, 5586 (1982), S. P. Pappas et al., J. Imaging Sci., 30 (5), 218 (1986), S. Kondo et al., Makromol. Chem., Rapid Commun., 9, 625 (1988), Y. Yamada et al., Makromol. Chem., 152, 153, 163 (1972), J. V. Crivello et al., J. Polymer Sci., Polymer Chem. Ed., 17, 3845 (1979), U.S. Pat. No. 3,849,137, German Patent No. 3,914,407, JP-A No. 63-26653, JP-A No. 55-164824, JP-A No. 62-69263, JP-A No. 63-146038, JP-A No. 63-163452, JP-A No. 62-153853 and JP-A No. 63-146029. For example, photoacid generators include onium salts such as diazonium salts, ammonium salts, phosphonium salts, iodonium salts, sulfonium salts, selenonium salts and arsonium salts; organic halogen compounds; organic metals/organic halides; photoacid generators having an o-nitrobenzyl type protecting group; compounds producing sulfonic acids by photolysis which are represented by iminosulfonates; disulfone compounds; and diazoketosulfone and diazodisulfone compounds.

Further, compounds generating acids with rays can also be used which are described in V. N. R. Pillai, Synthesis, (1) 1 (1980), A. Abad et al., Tetrahedron Lett., (47), 4555 (1971), D. H. R. Barton et al., J. Chem. Soc., (C), 329 (1970), U.S. Pat. No. 3,779,778 and European Patent No. 126,712.

The preferable compound as the photoacid generators usable in the invention include compounds represented by the following formulae (b1), (b2) and (b3):

in the formula (b1), $R^{201}$, $R^{202}$ and $R^{203}$ each independently represent an organic group.

$X^-$ represents a non-nucleophilic anion, and preferred examples thereof include sulfonate anion, carboxylate anion, bis(alkylsulfonyl)amide anion, tris(alkylsulfonyl)methide anion, $BF_4^-$, $PF_6^-$ and $SbF_6^-$, and a group shown in the following. An organic anion having a carbon atom is preferred.

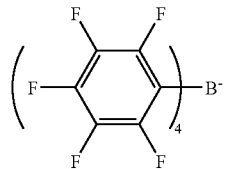

Preferred examples of the organic anion include organic anions represented by the following formulae.

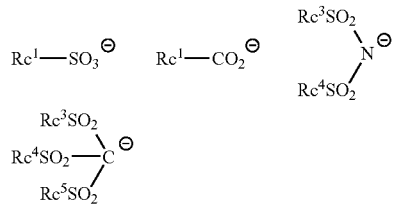

In the formulae above, $Rc^1$ represents an organic group. The organic group in $Rc^1$ includes an organic group having 1 to 30 carbon atoms, and preferred examples thereof include an alkyl group, a cycloalkyl group, an aryl group, and a group where a plurality of these groups are linked through a linking group such as a single bond, —O—, —$CO_2$—, —S—, —$SO_3$— and —$SO_2N(Rd^1)$-.

$Rd^1$ represents a hydrogen atom or an alkyl group. $Rc^3$, $Rc^4$ and $Rc^5$ each independently represent an organic group. The organic group of $Rc^3$, $Rc^4$ and $Rc^5$ is preferably an organic group the same as the preferred organic group in $Rc^1$, most preferably a perfluoroalkyl group having 1 to 4 carbon atoms. $Rc^3$ and $Rc^4$ may combine to form a ring. The group formed by combining $Rc^3$ and $Rc^4$ includes an alkylene group and an arylene group and is preferably a perfluoroalkylene group having 2 to 4 carbon atoms.

The organic group of $Rc^1$ and $Rc^3$ to $Rc^5$ is most preferably an alkyl group with the 1-position being substituted by a fluorine atom or a fluoroalkyl group, or a phenyl group substituted by a fluorine atom or a fluoroalkyl group. By virtue of having a fluorine atom or a fluoroalkyl group, the acidity of the acid generated upon light irradiation is increased and the sensitivity is enhanced.

The carbon atoms of the organic group as $R^{201}$, $R^{202}$ and $R^{203}$ are generally from 1 to 30, preferably from 1 to 20.

Two members of $R^{201}$ to $R^{203}$ may combine to form a ring structure, and the ring may contain an oxygen atom, a sulfur atom, an ester bond, an amide bond or a carbonyl group. Examples of the group formed by combining two members of $R^{201}$ to $R^{203}$ include an alkylene group (e.g., a butylene group, a pentylene group).

Specific examples of the organic group as $R^{201}$, $R^{202}$ and $R^{203}$ include corresponding groups in the compounds (b1-1), (b1-2) and (b1-3) which are described later.

The compound may be a compound having a plurality of structures represented by the formula (b1). For example, the compound may be a compound having a structure that at least one of $R^{201}$ to $R^{203}$ in the compound represented by the formula (b1) is directly bonded or bonded through a linking group to at least one of $R^{201}$ to $R^{203}$ in another compound represented by the formula (b1).

The component (b1) is more preferably a compound (b1-1), (b1-2) or (b1-3) described below.

The compound (b1-1) is an arylsulfonium compound where at least one of $R^{201}$ to $R^{203}$ in the formula (b1) is an aryl group, that is, a compound having an arylsulfonium as the cation.

In the arylsulfonium compound, $R^{201}$ to $R^{203}$ all may be an aryl group or a part of $R^{201}$ to $R^{203}$ may be an aryl group with the remaining being an alkyl group or a cycloalkyl group.

Examples of the arylsulfonium compound include a triarylsulfonium compound, a diarylalkylsulfonium compound, an aryldialkylsulfonium compound, a diarylcycloalkylsulfonium compound and an aryldicycloalkylsulfonium compound.

The aryl group in the arylsulfonium compound is preferably an aryl group such as a phenyl group and a naphthyl group, or a heteroaryl group such as an indole residue and a pyrrole residue, more preferably a phenyl group or an indole residue. In the case where the arylsulfonium compound has two or more aryl groups, these two or more aryl groups may be the same of different from each other.

The alkyl group that is present, if desired, in the arylsulfonium compound is preferably a linear or branched alkyl group having 1 to 15 carbon atoms such as a methyl group, an ethyl group, a propyl group, an n-butyl group, a sec-butyl group and a tert-butyl group.

The cycloalkyl group that is present, if desired, in the arylsulfonium compound is preferably a cycloalkyl group having 3 to 15 carbon atoms such as a cyclopropyl group, a cyclobutyl group and a cyclohexyl group.

The aryl group, alkyl group and cycloalkyl group of $R^{201}$ to $R^{203}$ each may have, as the substituent, an alkyl group (for example, an alkyl group having 1 to 15 carbon atoms), a cycloalkyl group (for example, a cycloalkyl group having 3 to 15 carbon atoms), an aryl group (for example, an aryl group having 6 to 14 carbon atoms), an alkoxy group (for example, an alkoxy group having 1 to 15 carbon atoms), a halogen atom, a hydroxyl group or a phenylthio group. The substituent is preferably a linear or branched alkyl group having 1 to 12 carbon atoms, a cycloalkyl group having 3 to 12 carbon atoms, or a linear, branched or cyclic alkoxy group having 1 to 12 carbon atoms, and most preferably an alkyl group having 1 to 4 carbon atoms or an alkoxy group having 1 to 4 carbon atoms. The substituent may be substituted to any one of three members $R^{201}$ to $R^{203}$ or may be substituted to all of these three members. In the case where $R^{201}$ to $R^{203}$ each is an aryl group, the substituent is preferably substituted at the p-position of the aryl group.

The compound (b1-2) is described below.

The compound (b1-2) is a compound where $R^{201}$ to $R^{203}$ in the formula (b1) each independently represent an aromatic ring-free organic group. The aromatic ring as used herein also includes an aromatic ring containing a heteroatom.

The aromatic ring-free organic group as $R^{201}$ to $R^{203}$ generally has 1 to 30 carbon atoms, preferably from 1 to 20.

$R^{201}$ to $R^{203}$ are each independently preferably an alkyl group, a cycloalkyl group, an allyl group or a vinyl group, more preferably a linear, branched or cyclic 2-oxoalkyl group or an alkoxycarbonylmethyl group, even more preferably a linear or branched 2-oxoalkyl group.

The alkyl group as $R^{201}$ to $R^{203}$ may be linear or branched and is preferably a linear or branched alkyl group having 1 to 10 carbon atoms, and examples thereof include a methyl group, an ethyl group, a propyl group, a butyl group and a pentyl group. The alkyl group as $R^{201}$ to $R^{203}$ is more preferably a linear or branched 2-oxoalkyl group or an alkoxycarbonylmethyl group.

The cycloalkyl group as $R^{201}$ to $R^{203}$ is preferably a cycloalkyl group having 3 to 10 carbon atoms, and examples thereof include a cyclopentyl group, a cyclohexyl group and a norbornyl group. The cycloalkyl group as $R^{201}$ to $R^{203}$ is more preferably a cyclic 2-oxoalkyl group.

The linear, branched or cyclic 2-oxoalkyl group as $R^{201}$ to $R^{203}$ is preferably a group having >C=O at the 2-position of the above-described alkyl or cycloalkyl group.

The alkoxy group in the alkoxycarbonylmethyl group as $R^{201}$ to $R^{203}$ is preferably an alkoxy group having 1 to 5 carbon atoms (e.g., a methoxy group, an ethoxy group, a propoxy group, a butoxy group, a pentoxy group).

$R^{201}$ to $R^{203}$ each may be further substituted by a halogen atom, an alkoxy group (for example, an alkoxy group having 1 to 5 carbon atoms), a hydroxyl group, a cyano group or a nitro group.

The compound (b1-3) is a compound represented by the following formula (b1-3), and this is a compound having a phenacylsulfonium salt structure.

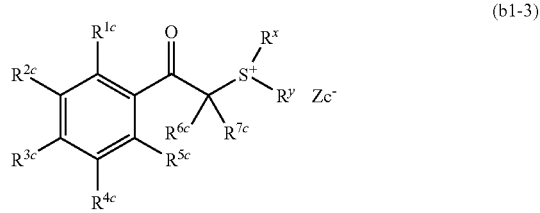

(b1-3)

In the formula (b1-3), $R^{1c}$ to $R^{5c}$ each independently represent a hydrogen atom, an alkyl group, a cycloalkyl group, an alkoxy group or a halogen atom.

$R^{6c}$ and $R^{7c}$ each independently represent a hydrogen atom, an alkyl group or a cycloalkyl group.

$R^x$ and $R^y$ each independently represent an alkyl group, a cycloalkyl group, an allyl group or a vinyl group.

Any two or more members of $R^{1c}$ to $R^{5c}$ or each pair of $R^{6c}$ and $R^{7c}$, and $R^x$ and $R^y$ may combine with each other to form a ring structure.

$Zc^-$ represents a non-nucleophilic anion, and examples thereof are the same as those of the non-nucleophilic anion of $X^-$ in the formula (b1).

The alkyl group as $R^{1c}$ to $R^{7c}$, may be linear or branched and is preferably a linear or branched alkyl group having 1 to 20 carbon atoms, more preferably from 1 to 12 carbon atoms, and examples thereof include a methyl group, an ethyl group, a linear or branched propyl group, a linear or branched butyl group and a linear or branched pentyl group.

The cycloalkyl group as $R^{1c}$ to $R^{7c}$ is preferably a cycloalkyl group having 3 to 8 carbon atoms, and examples thereof include a cyclopentyl group and a cyclohexyl group.

The alkoxy group as $R^{1c}$ to $R^{5c}$ may be linear, branched or cyclic and this is, for example, an alkoxy group having 1 to 10 carbon atoms, preferably a linear or branched alkoxy group having 1 to 5 carbon atoms (e.g., a methoxy group, an ethoxy group, a linear or branched propoxy group, a linear or branched butoxy group, a linear or branched pentoxy group) or a cyclic alkoxy group having 3 to 8 carbon atoms (e.g., a cyclopentyloxy group, a cyclohexyloxy group).

As a group formed by combining any two or more members of $R^{1c}$ to $R^{5c}$ or each pair of $R^{6c}$ and $R^{7c}$, and $R^x$ and $R^y$ may include butylene group and pentylene group, and the ring structure may contain an oxygen atom, a sulfur atom, an ester bond or an amide bond.

A compound where any one of $R^{1c}$ to $R^{5c}$ is a linear or branched alkyl group, a cycloalkyl group or a linear, branched or cyclic alkoxy group is preferred, and a compound where the sum of carbon atoms of $R^{1c}$ to $R^{5c}$ is from 2 to 15 is more preferred. In this case, it is preferable in that the solubility in a solvent is more enhanced and the generation of particles during storage is suppressed.

Examples of the alkyl group and cycloalkyl group as $R^x$ and $R^y$ are the same as those of the alkyl group and cycloalkyl group in $R^{1c}$ to $R^{7c}$.

$R^x$ and $R^y$ is preferably a 2-oxoalkyl group or an alkoxy-carbinylmethyl group.

Examples of the 2-oxoalkyl group include a group having >C=O at the 2-position of the alkyl group or cycloalkyl group as $R^{1c}$ to $R^{5c}$.

Examples of the alkoxy group in the alkoxycarbonylmethyl group are the same as those of the alkoxy group in $R^{1c}$ to $R^{5c}$.

$R^x$ and $R^y$ each is preferably an alkyl or cycloalkyl group having 4 or more carbon atoms, more preferably 6 or more carbon atoms, and even more preferably 8 or more carbon atoms.

In the formulae (b2) and (b3), $R^{204}$ to $R^{207}$ each independently represent an aryl group, an alkyl group, or a cycloalkyl group. $X^-$ represents a non-nucleophilic anion and examples thereof are the same as those of the non-nucleophilic anion of $X^-$ in the formula (b1).

The aryl group as $R^{204}$ to $R^{207}$ is preferably a phenyl group or a naphthyl group, more preferably a phenyl group.

The alkyl group as $R^{204}$ to $R^{207}$ may be linear or branched and is preferably a linear or branched alkyl group having 1 to 10 carbon atoms, and examples thereof include a methyl group, an ethyl group, a propyl group, a butyl group and a pentyl group. The cycloalkyl group as $R^{204}$ to $R^{207}$ is preferably a cycloalkyl group having 3 to 10 carbon atoms, and examples thereof include a cyclopentyl group, a cyclohexyl group and a norbornyl group.

Examples of the substituent which $R^{204}$ to $R^{207}$ each may have include an alkyl group (for example, an alkyl group having 1 to 15 carbon atoms), a cycloalkyl group (for example, a cycloalkyl group having 3 to 15 carbon atoms), an aryl group (for example, an aryl group having 6 to 15 carbon atoms), an alkoxy group (for example, an alkoxy group having 1 to 15 carbon atoms), a halogen atom, a hydroxyl group and a phenylthio group.

Examples of the compound capable of generating acid upon irradiation with actinic rays or radiation, which can be used, further include the compounds represented by the following formulae (b4), (b5) and (b6):

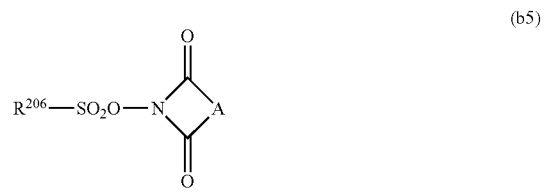

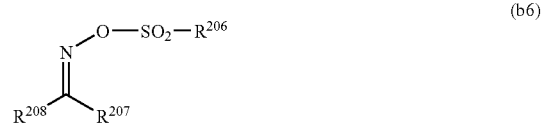

In the formulae (b4) to (b6), $Ar^3$ and $Ar^4$ each independently represent an aryl group, $R^{206}$, $R^{207}$ and $R^{208}$ each independently represent an alkyl group, a cycloalkyl group, or an aryl group, and A represents an alkylene group, an alkenylene group, or an arylene group.

Among the photoacid generators, preferred are the compounds represented by the formulae (b1) to (b3).

Examples of the preferable compound as the photoacid generators (b) usable in the invention include the following [(b-1) to (b-96)], but the invention is not limited thereto.

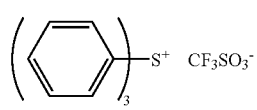

(b-1)

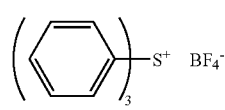

(b-2)

-continued
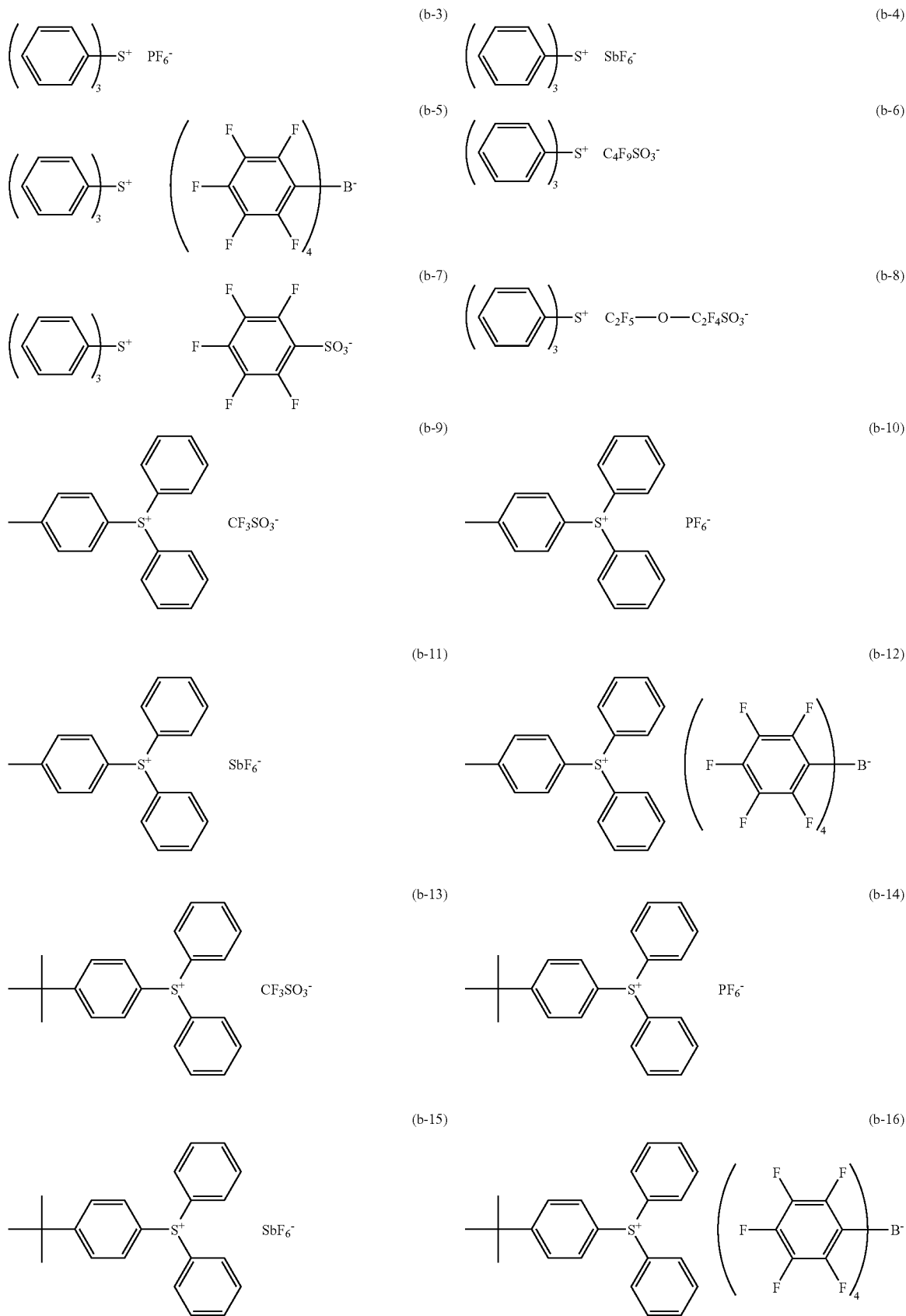

-continued
(b-17) 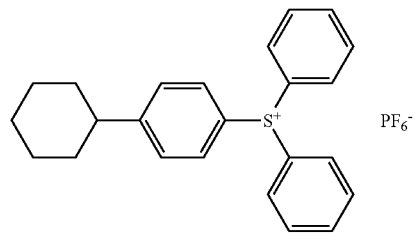
(b-18) 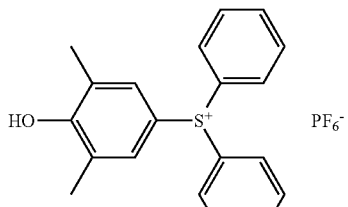
(b-19) 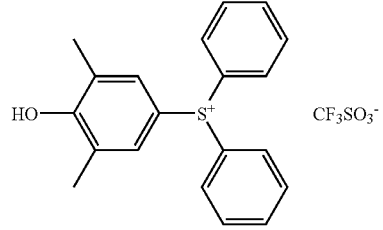
(b-20) 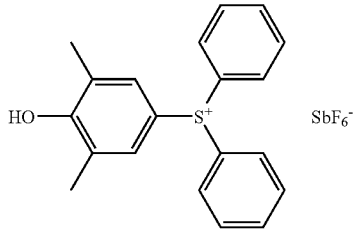
(b-21) 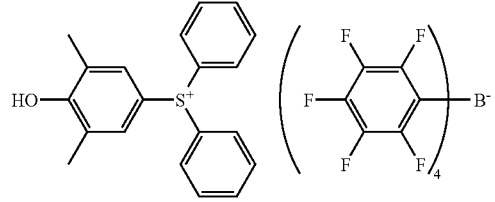
(b-22) 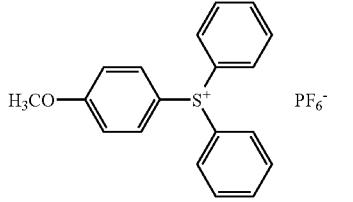
(b-23) 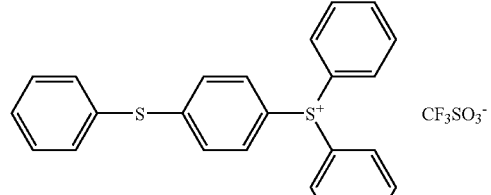
(b-24) 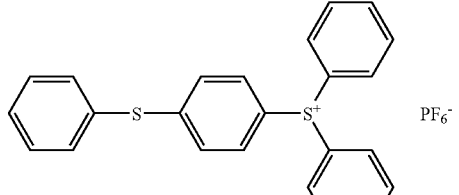
(b-25) 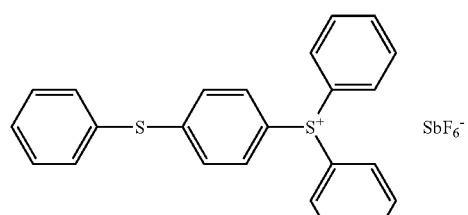
(b-26) 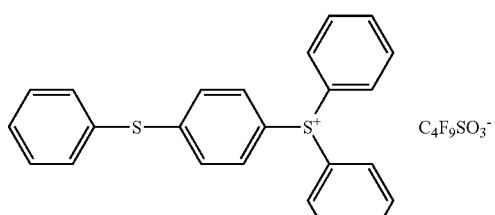
(b-27) 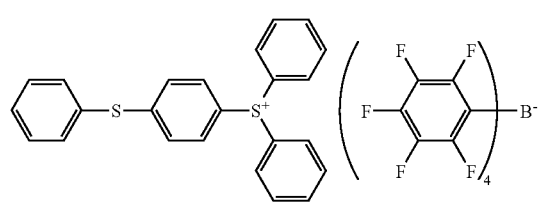
(b-28) 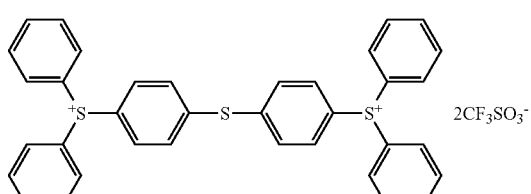
(b-29) 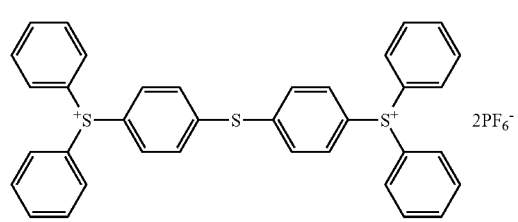
(b-30) 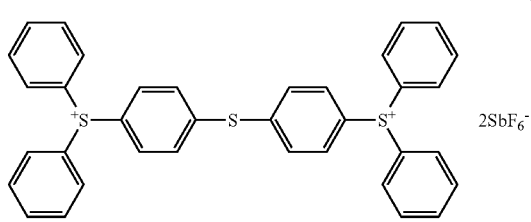

-continued
(b-31)
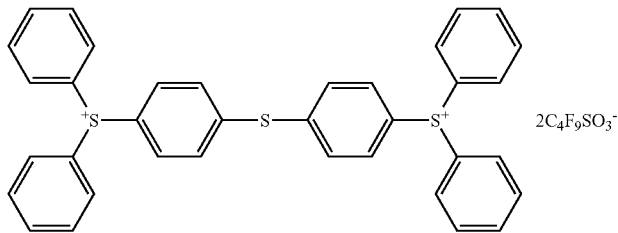 2C₄F₉SO₃⁻
(b-32)
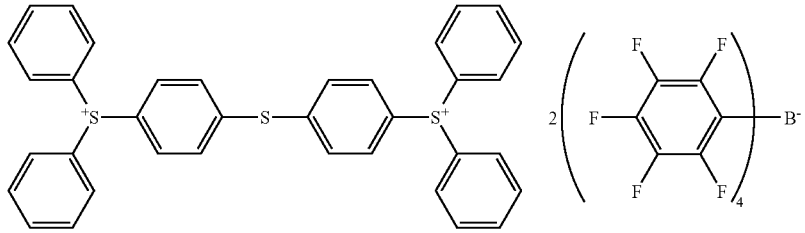
(b-33) 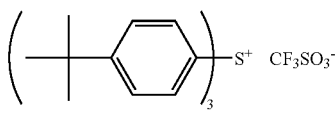
(b-34) 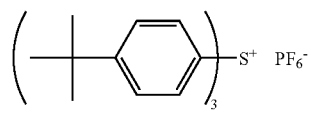
(b-35) 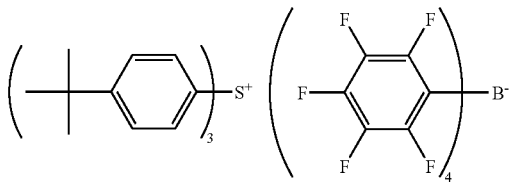
(b-36) 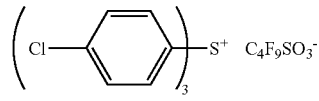
(b-37) 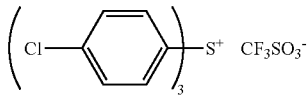
(b-38) 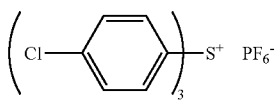
(b-39) 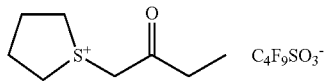
(b-40) 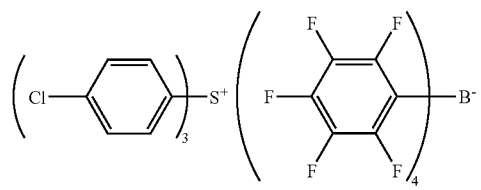
(b-41) 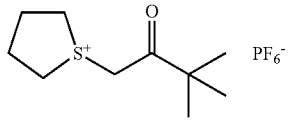
(b-42) 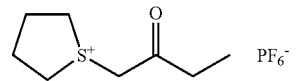
(b-43) 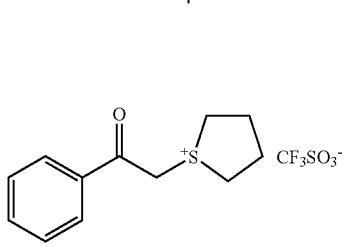
(b-44) 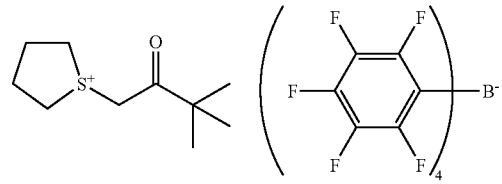
(b-45) 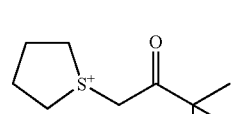
(b-46) 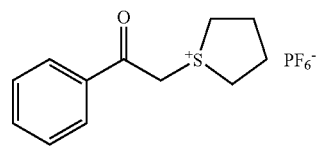

-continued
(b-47) 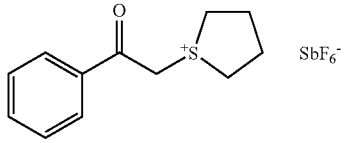
(b-48) 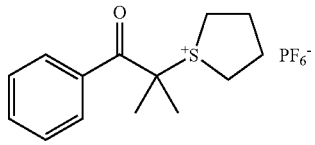
(b-49) 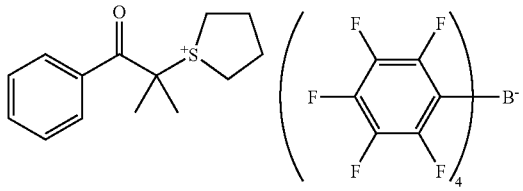
(b-50) 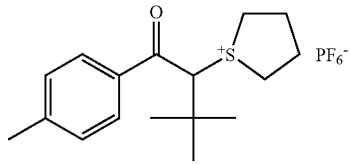
(b-51) 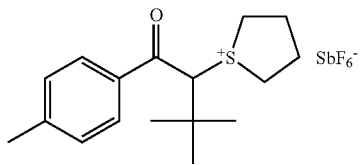
(b-52) 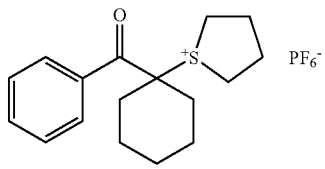
(b-53) 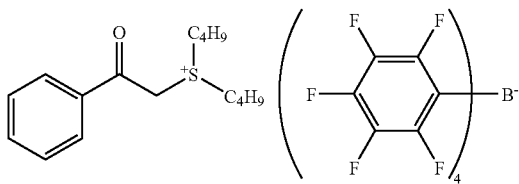
(b-54) 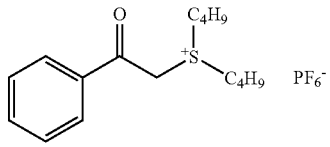
(b-55) 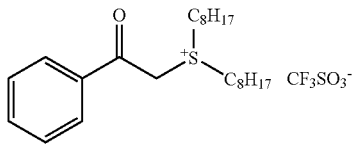
(b-56) 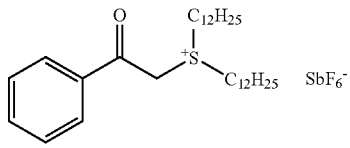
(b-57) 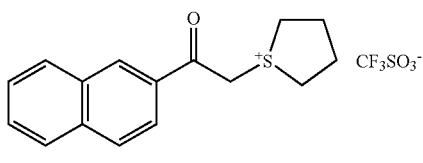
(b-58) 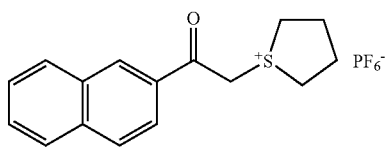
(b-59) 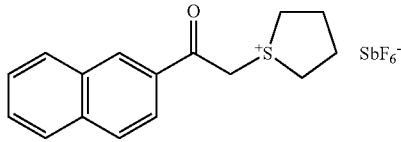
(b-60) 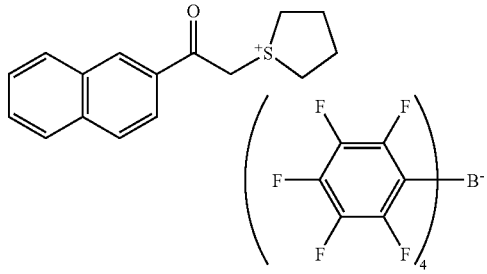
(b-61) 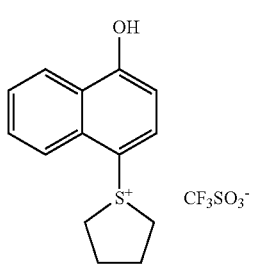
(b-62) 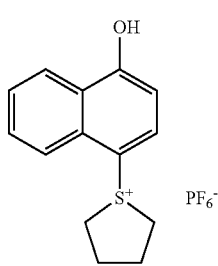

-continued (b-63), (b-64), (b-65), (b-66), (b-67), (b-68), (b-69), (b-70), (b-71), (b-72), (b-73), (b-74), (b-75), (b-76), (b-77), (b-78), (b-79), (b-80)

-continued
(b-81) 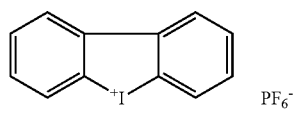
(b-82) 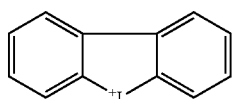
(b-83) 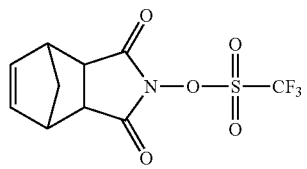
(b-84) 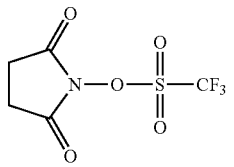
(b-85) 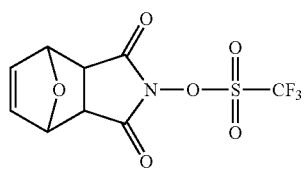
(b-86) 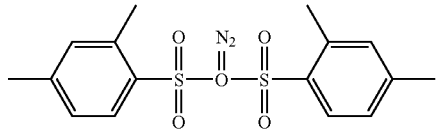
(b-87) 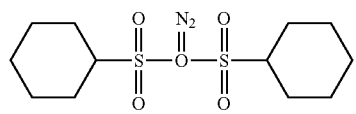
(b-88) 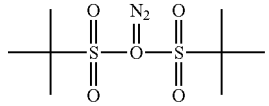
(b-89) 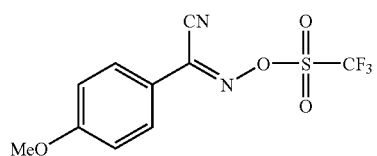
(b-90) 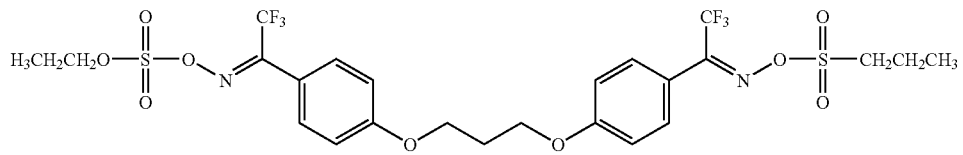
(b-91) 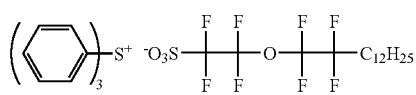
(b-92) 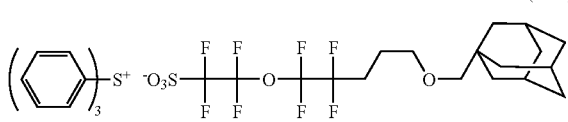
(b-93) 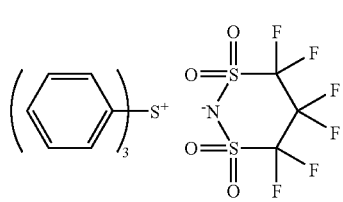
(b-94) 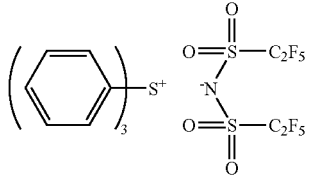
(b-95) 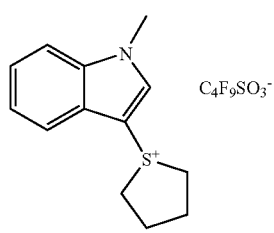
(b-96) 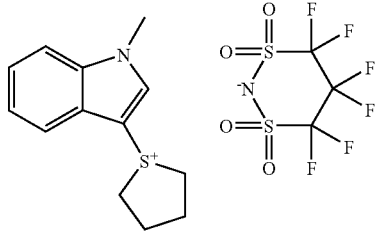

Further, an oxazole derivative, an s-triazine derivative and the like described in detail in paragraphs [0029] to [0030] of JP-A No. 2002-122994, may be also suitably used in the invention.

The onium salts and sulfonate compounds described in detail in paragraphs [0037] to [0063] of JP-A No. 2002-122994, may be also suitably used in the invention.

The photoacid generator may be used alone or in combination of two or more thereof. The photoacid generator is preferably selected from those having a tri(chlorophenyl) sulfonium salt structure such as (b-37) to (b-40) shown above.

The content of the photoacid generator in the curable composition and ink composition of the invention is preferably 0.1 to 20% by weight, more preferably 0.5 to 10% by weight, and even more preferably 1 to 7% by weight in terms of the total solid content of the composition.

[(C) Colorant]

The curable composition of the invention may contain a colorant. Further, the curable composition of the invention is required to contain the colorant when it is used as an ink composition capable of forming colored images.

The colorant usable in the invention is not particularly limited, and a pigment and an oil-soluble dye with excellent weather resistance and good color reproducibility are preferable though any known colorant such as a soluble dye may be selected and used. The colorant suitably usable in the ink composition of the invention preferably does not function as a polymerization inhibitor in a polymerization reaction being a curing reaction. This reason is that it does not lower the sensitivity of the curing reaction with active radiation.

<Pigment>

The pigment is not particularly limited, and any of the commercially available organic and inorganic pigments, a pigment dispersed in an insoluble resin or the like as a dispersion medium, and a pigment having a resin grafted on the surface thereof can be used. Resin particles dyed with a dye can also be also used.

Examples of the pigments include the pigments described in "Ganryo no Jiten (Pigment dictionary)" ed. by Seishiro Ito, Asakura Shoten (2000), W. Herbst, K. Hunger "Industrial Organic Pigments", JP-A No. 2002-12607, JP-A No. 2002-188025, JP-A No. 2003-26978, and JP-A No. 2003-342503.

Specific examples of the organic and inorganic pigments exhibiting yellow color employable in the present invention, include a monoazo pigment such as C.I. Pigment Yellow 1 (e.g., Fast Yellow G), and C.I. Pigment Yellow 74, a disazo pigment such as C.I. Pigment Yellow 12 (e.g., Disazo Yellow AAA) and C.I. Pigment Yellow 17, a non-benzidine azo pigment such as C.I. Pigment Yellow 180, an azo lake pigment such as C.I. Pigment Yellow 100 (e.g., Tartrazine Yellow Lake), a condensed azo pigment such as C.I. Pigment Yellow 95 (e.g., Condensed Azo Yellow GR), an acidic dye lake pigment such as C.I. Pigment Yellow 115 (e.g., Quinoline Yellow Lake), a basic dye lake pigment such as C.I. Pigment Yellow 18 (e.g., Thioflavin Lake), an anthraquinone pigment such as Flavanthrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (e.g., Nickel Nitroso Yellow), and a metallic complex azomethine pigment such as C.I. Pigment Yellow 117 (e.g., Copper Azomethine Yellow).

Examples thereof exhibiting red or magenta color include a monoazo pigment such as C.I. Pigment Red 3 (e.g., Toluidine Red), a disazo pigment such as C.I. Pigment Red 38 (e.g., Pyrazolone Red B), an azo lake pigment such as C.I. Pigment Red 53:1 (e.g., Lake Red C) and C.I. Pigment Red 57:1 (e.g., Brilliant Carmine 6B), a condensed azo pigment such as C.I. Pigment Red 144 (e.g., Condensed Azo Red BR), an acidic dye lake pigment such as C.I. pigment red 174 (e.g., Phloxin B lake), a basic dye lake pigment such as C.I. Pigment Red 81 (e.g., Rhodamine 6G Lake), an anthraquinone pigment such as C.I. Pigment Red 177 (e.g., Dianthraquinonyl Red), a thioindigo pigment such as C.I. Pigment Red 88 (e.g., Thioindigo Bordeaux), a perynone pigment such as C.I. Pigment Red 194 (e.g., Perynone Red), a perylene pigment such as C.I. Pigment Red 149 (e.g., Perylene Scarlett), a quinacridone pigment such as C.I. Pigment Violet 19 (unsubstituted quinacridone), C.I. Pigment Red 122 (e.g., Quinacridone Magenta), an isoindolinone pigment such as C.I. Pigment Red 180 (e.g., Isoindolinone Red 2BLT), and an alizarin lake pigment such as C.I. Pigment Red 83 (e.g., Madder Lake).

Examples thereof exhibiting blue or cyan color include a disazo pigment such as C.I. Pigment Blue 25 (e.g., Dianisidine Blue), a phthalocyanine pigment such as C.I. Pigment Blue 15 (e.g., Phthalocyanine Blue), an acidic dye lake pigment such as C.I. Pigment Blue 24 (e.g., Peacock Blue Lake), a basic dye lake pigment such as C.I. Pigment Blue 1 (e.g., Victoria Pure Blue BO Lake), an anthraquinone pigment such as C.I. Pigment Blue 60 (e.g., Indanthrone Blue), and an alkali blue pigment such as C.I. Pigment Blue 18 (e.g., Alkali Blue V-5:1).

Examples thereof exhibiting green color include a phthalocyanine pigment such as C.I. Pigment Green 7 (Phthalocyanine Green), C.I. Pigment Green 36 (Phthalocyanine Green), and an azo metal complex pigment such as C.I. Pigment Green 8 (Nitroso Green).

Examples thereof exhibiting orange color include an isoindoline pigment such as C.I. Pigment Orange 66 (Isoindoline Orange) and an anthraquinone pigment such as C.I. Pigment Orange 51 (Dichloropyranthrone Orange).

Examples thereof exhibiting black color include a carbon black, titanium black, and an aniline black.

As specific examples of white pigment, basic lead carbonate ($2PbCO_3Pb(OH)_2$, so-called silver white), zinc oxide (ZnO, so-called zinc white), titanium oxide ($TiO_2$, so-called, titanium white), and strontium titanate ($SrTiO_3$, so-called titanium strontium white) are employable.

Here, titanium oxide has a less specific gravity and a greater refractive index, and is chemically and physically stable, compared to other white pigments. Therefore, it has a greater concealing and tinting power as a pigment, and furthermore has a superior durability against acid, alkali, and other environment. Therefore, the titanium oxide is preferably used as a white pigment. Of course, other white pigments (may be other than the abovementioned white pigments) may be used as necessary.

For dispersing the pigment, respective dispersing devices such as a ball mill, a sand mill, an attritor, a roll mill, a jet mill, a homogenizer, a paint shaker, a kneader, an agitator, a henschel mixer, a colloid mill, an ultrasonic homogenizer, a pearl mill, and a wet type jet mill may be used.

Dispersing agents can also be added when a pigment is to be dispersed. Examples of the dispersing agent include a hydroxyl group containing carboxylate ester, a salt of long-chain polyaminoamide and high molecular weight acid ester, a salt of high molecular weight polycarboxylate, a high molecular weight unsaturated acid ester, a high molecular weight copolymer, a modified polyacrylate, an aliphatic polyvalent carboxylic acid, a naphthalenesulfonic acid-formalin condensate, a polyoxyethylenealkyl phosphate ester, and pigment derivatives. Moreover, a commercially available polymer dispersing agent such as a SOLSPERSE® series made by Zeneca Co. may be preferably used.

As a dispersing auxiliary, a synergist according to various types of pigments may be used. 1 to 50 mass parts of the dispersing agent and the dispersing auxiliary are preferably added with respect to 100 mass parts of the pigment.

In the ink composition, a solvent may be added as a dispersion medium for various components such as a pigment. Moreover, the polymerizable compound serving as a low molecular weight component may be used as a dispersion medium, without any solvent. Since the ink composition of the present invention is a radioactive ray curable ink, and the ink is cured after the application on the recording medium, it is preferred not to use a solvent. The reason is that, if the solvent remains in a cured ink image, the solvent resistance is degraded, and problems with volatile organic compounds (VOC) of the residual solvent would occur. From such a viewpoint, polymerizable compounds are preferably used as the dispersion medium. Among these, a cationic polymerizable monomer having the lowest viscosity is preferably selected from the viewpoint of dispersing properties, and improving the handling properties of the ink composition.

The average particle size of the pigment is in the range of preferably 0.02 to 0.4 µm, more preferably 0.02 to 0.1 µm, and even more preferably 0.02 to 0.07 µm.

The selection of pigments, a dispersant and a dispersing medium, dispersion condition, and filtration condition are set so that the average particle size of the pigment particle is in the above-mentioned preferable ranges. Blocking of a head nozzle can be suppressed by this particle size management, and the storage stability of ink, the transparency of ink and the curing sensitivity of ink can be maintained.

<Dye>

The dye used in the present invention is preferably oil soluble. Specifically, it means a dye having a solubility in water (mass of dye soluble in 100 g of water) at 25° C. of not more than 1 g, preferably not more than 0.5 g, and more preferably not more than 0.1 g. Therefore, a so-called oil soluble dye that is water-insoluble is preferably used.

In the dye used in the present invention, one or more oil soluble groups are preferably introduced into the parent dye described above so as to dissolve the required amount thereof into the ink composition.

Examples of the oil soluble group include: a long-chain or branched alkyl group, a long-chain or branched alkoxy group, a long-chain or branched alkylthio group, a long-chain or branched alkylsulfonyl group, a long-chain or branched acyloxy group, a long-chain or branched alkoxycarbonyl group, a long-chain or branched acyl group, a long-chain or branched acylamino group, a long-chain or branched alkylsulfonylamino group, a long-chain or branched alkylaminosulfonyl group; and an aryl group, an aryloxy group, an aryloxycarbonyl group, an arylcarbonyloxy group, an arylaminocarbonyl group, an arylaminosulfonyl group, and an arylsulfonylamino group including the above long-chain or branched substituents.

Moreover, a dye may be obtained by converting the water soluble dye having carboxylic acid or sulfonic acid into an alkoxycarbonyl group, an aryloxy carbonyl group, an alkylaminosulfonyl group, and an arylaminosulfonyl group serving as the oil soluble group using a long-chain or branched alcohol, amine, phenol, and aniline derivatives.

The oil soluble dye preferably has a melting point of not more than 200° C., more preferably a melting point of not more than 150° C., and even more preferably a melting point of not more than 100° C. The use of an oil-soluble dye having a low melting point suppresses the precipitation of a dye crystal in the ink composition, and therefore the storage stability of the ink composition is improved.

Moreover, in order to improve the resistance against discoloration, in particular against an oxidizer such as an ozone, and to improve the curing property, the oxidation potential is desirably noble (high). Therefore, the oil soluble dye used in the present invention preferably has an oxidation potential of not less than 1.0V (vsSCE). The oxidation potential is preferably higher, more preferably not less than 1.1V (vsSCE), and even more preferably not less than 1.15V (vsSCE).

As a dye of yellow color, preferred are the compounds having a structure represented by the formula (Y-I) described in JP-A No. 2004-250483.

Particularly preferred dye includes the dyes represented by the formulae (Y-II) to (Y-IV) described in JP-A No. 2004-250483, paragraph [0034]. Specific examples thereof include the compounds described in JP-A No. 2004-250483, paragraphs [0060] to [0071]. The oil soluble dye represented by the formula (Y-I) described in the document may be used for an ink of any color such as a black ink and a red ink as well as the yellow one.

As a dye of magenta color, preferred are the compounds having a structure represented by the formulae (3) and (4) described in JP-A No. 2002-114930. Specific examples thereof include the compounds described in JP-A No. 2002-114930, paragraphs [0054] to [0073].

Particularly preferred dye includes the azo dyes represented by the formulae (M-1) to (M-2) described in JP-A No. 2002-121414, paragraphs [0084] to [0122]. Specific examples thereof include the compounds described in JP-A No. 2002-121414, paragraphs [0123] to [0132]. The oil soluble dye represented by the formulae (3), (4), (M-1) to (M-2) described in the document may be used for an ink of any color such as a black ink and a red ink as well as the magenta one.

As a dye of cyan color, preferred are the dyes represented by the formulae (I) to (IV) described in JP-A No. 2001-181547, and the dyes represented by the formulae (IV-1) to (IV-4) described in JP-A No. 2002-121414, paragraphs [0063] to [0078]. Specific examples thereof include the compounds described in JP-A No. 2001-181547, paragraphs [0052] to [0066], and the compounds described in JP-A No. 2002-121414, paragraphs [0079] to [0081].

Particularly preferred dye includes the phthalocyanine dyes represented by the formulae (C-I) and (C-II) described in JP-A No. 2002-121414, paragraphs [0133] to [0196], furthermore the phthalocyanine dyes represented by the formula (C-II). Specific examples thereof include the compounds described in JP-A No. 2002-121414, paragraphs [0198] to [0201]. The oil soluble dye represented by the formulae (I) to (IV), (IV-1) to (IV-4), (C-I), and (C-II) may be used for an ink of any color such as a black ink and a green ink as well as the cyan one.

The colorant added in the ink composition is preferably 1 to 20 mass %, and more preferably 2 to 10 mass % in terms of solid contents.

Hereunder is a description of various additives used for the ink composition of the present invention as required.

(Ultraviolet Absorber)

An ultraviolet absorber may be added to the ink composition of the present invention from the viewpoint of improving the weather resistance and preventing discoloration of the obtained image.

Examples of the ultraviolet absorber include benzotriazol compounds described in JP-A Nos. 58-185677, 61-190537, 2-782, 5-197075 and 9-34057; benzophenone compounds described in JP-A Nos. 46-2784 and 5-194483, and U.S. Pat.

No. 3,214,463; cinnamic acid compounds described in JP-B Nos. 48-30492 and 56-21141, and JP-A No. 10-88106; triazine compounds described in JP-A Nos. 4-298503, 8-53427, 8-239368, and 10-182621, and Japanese National Phase Publication No. H08-5012911; compounds described in Research Disclosure No. 24239; compounds which absorb ultraviolet rays to generate fluorescence, such as stilbene and benzoxazol compounds; and so-called fluorescent brightening agents.

The dosage is suitably selected according to the object, and generally about 0.5 to 15 mass % in terms of solid contents.

[Sensitizer]

In the invention, for the purpose of the improvement in acid generating efficiency of photoacid generators and the shift of the photosensitive wavelength to longer wavelengths, the sensitizer may be added if necessary.

The sensitizer may be any one as long as it sensitizes the photoacid generator with an electron-transfer mechanism or energy-transfer mechanism. The sensitizer preferably include an aromatic polycondensed ring such as anthracene, 9,10-dialkoxyanthracene, pyrene and perylene, an aromatic ketone compound such as acetophenone, benzophenone, thioxanthone and Michler's ketone and a heterocyclic compound such as phenothiazine and N-aryloxazolidinone.

The amount added is suitably selected according to purposes, but is preferably 0.01 to 1 mol %, more preferably 0.1 to 0.5 mol % with regard to the photoacid generator.

(Anti-Oxidant)

An anti-oxidant may be added to the ink composition of the present invention in order to improve the stability. Examples of the anti-oxidant include ones described in European Patent Publication Nos. 223739, 309401, 309402, 310551, 310552, and 459416, German Patent Publication No. 3435443, JP-A Nos. 54-48535, 62-262047, 63-113536, and 63-163351, JP-A No. 2-262654, JP-A No. 2-71262, JP-A No. 3-121449, JP-A No. 5-61166, JP-A No. 5-119449, U.S. Pat. No. 4,814,262, and U.S. Pat. No. 4,980,275.

The dosage is suitable selected according to the object, and generally about 0.1 to 8 mass % in terms of solid contents.

(Discoloration Inhibitor)

Various organic compounds and metal complexes can be used as a discoloration inhibitor in the ink composition of the present invention. Examples of the organic discoloration inhibitor include hydroquinones, alkoxyphenols, dialkoxyphenols, phenols, anilines, amines, indans, chromans, alkoxyanilines, and heterocycles. Examples of the metal complexes include a nickel complex and a zinc complex. Specific examples thereof include the compounds disclosed in the cited patents described in the I or J paragraph of the VII section of Research Disclosure No. 17643, Research Disclosure No. 15162, the left column of page 650 of Research Disclosure No. 18716, page 527 of Research Disclosure No. 36544, page 872 of Research Disclosure No. 307105, and Research Disclosure No. 15162, and compounds included in formulae of the representative compounds and examples of the compounds described in JP-A No. 62-215272, page 127 to 137.

The dosage is suitable selected according to the object, and generally about 0.1 to 8 mass % in terms of solid contents.

(Electroconductive Salts)

With the object of controlling the ejecting property, electroconductive salts such as potassium thiocyanate, lithium nitrate, ammonium thiocyanate, and dimethylamine hydrochloride may be added to the ink composition of the present invention.

(Solvent)

In order to improve the adhesiveness onto the recording medium, it is also effective to add trace amount of organic solvent into the ink composition of the present invention.

Examples of the solvent include: ketone solvents such as acetone, methylethyl ketone, diethyl ketone; alcohol solvents such as methanol, ethanol, 2-propanol, 1-propanol, 1-butanol, and tert-butanol; chlorinated solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycolether solvents such as ethylene glycol monomethylether and ethylene glycol dimethylether.

In this case, the effective addition is within a range not causing problems such as solvent resistance and VOC. The amount thereof is preferably within a range of 0.1 to 5 mass %, more preferably 0.1 to 3 mass % with respect to the total ink composition.

(Polymer Compounds)

In order to adjust the film property, various polymer compounds may be added to the ink composition of the present invention. Examples of the polymer compounds include an acrylic polymer, a polyvinyl butyral resin, a polyurethane resin, a polyamide resin, a polyester resin, an epoxy resin, a phenol resin, a polycarbonate resin, a polyvinyl butyral resin, a polyvinylformal resin, a shellac, a vinyl resin, an acrylic resin, a rubber resin, waxes, and other natural resins. Two types of these may be used in combination. Among these, preferred is a vinyl copolymer obtained by the copolymerization of acrylic monomers. Furthermore, copolymers including "carboxyl group containing monomer", "alkylester methacrylate", or "alkylester acrylate" as a structural unit can be also preferably be used as a copolymer composition of the polymer binding material.

(Surfactant)

A surfactant may be added to the ink composition of the present invention. Examples of the surfactant include those described in JP-A Nos. 62-173463 and 62-183457. Examples thereof include: anionic surfactants such as dialkyl sulfosuccinate, alkyl naphthalenesulfonate, and fatty acid salt; nonionic surfactants such as polyoxyethylene alkyl ether, polyoxyethylene alkyl aryl ether, acetylenic glycol, and polyoxyethylene/polyoxypropyrene block copolymer; and cationic surfactants such as alkylamine salt, and quaternary ammonium salt. An organic fluoro compound may be used instead of the surfactant. The organic fluoro compound is preferably hydrophobic. Examples of the organic fluoro compound include fluorine-containing surfactants, oily fluorine-containing compounds (such as fluorine oil), and fluorine-containing solid resins (such as ethylene tetrafluoride resin). The organic fluoro compounds are described in JP-B No. 57-9053 (column 8 to 17), and JP-A No. 62-135826.

In addition, leveling addition agents, matting agents, waxes for adjusting the film property, and a tackifier which does not inhibit the polymerization to improve the adhesiveness onto the recording medium such as polyolefine or PET may be added to the inkjet recording ink of the present invention as necessary.

Specific example of the tackifier include cohesive polymers of high molecular weight described in JP-A No. 2001-49200, page 5 to 6 (for example, a copolymer comprising an ester of (meta)acrylate and alcohol including an alkyl group having 1 to 20 carbon atoms, an ester of (meta)acrylate and alicyclic alcohol having 3 to 14 carbon atoms, and an ester of (meta)acrylate and aromatic alcohol having 6 to 14 carbon atoms), and tackifying resins of low molecular weight having a polymerizable unsaturated bond.

Preferable Embodiment of Ink Composition

The ink composition comprising the curable composition of the invention (ink composition of the invention) contains the specific polymerizable compound, the compound generating acid upon exposure to radiation, other polymerizable compounds optionally contained, a colorant, etc., as described above. In these components, it is suitable that the colorant is contained in an amount of preferably 1 to 10% by weight, more preferably 2 to 8% by weight and the total polymerizable compounds containing the specific polymerizable compound is contained in an amount of preferably 1 to 97% by weight, more preferably 30 to 95% by weight based on the total weight of the ink composition. The compound generating acid upon exposure to radiation is contained in an amount of preferably 0.01 to 20% by weight, more preferably 0.1 to 20% by weight based on the total polymerizable compounds containing the specific polymerizable compound.

Considering the ejecting property, the viscosity of the ink composition of the present invention if applied to an inkjet recording, is preferably 7 to 30 mPa·s, more preferably 7 to 20 mPa·s at the temperature at the time of ejection (For example, 40 to 80° C., preferably 25 to 30° C.). It is preferred to suitably adjust and determine the composition ratio so that the viscosity is within the above range. The viscosity of the ink composition is 35 to 500 mPa·s, preferably 35 to 200 mPa·s at room temperature (25 to 30° C.). By setting a high viscosity at room temperature, even if a porous recording medium is used, it becomes possible to prevent the ink permeation into the recording medium, decrease the uncured monomer, and reduce odor. Furthermore, the dot bleeding at the time of ink droplet depositing can be suppressed, resulting in improvement in the image.

The surface tension of the ink composition of the present invention is preferably 20 to 30 mN/m, more preferably 23 to 28 mN/m. If recording is performed onto various recording media such as polyolefine, PET, a coated paper, and an uncoated paper, the surface tension is preferably not less than 20 mN/m from the viewpoint of bleeding and permeation, and preferably not more than 30 mN/m from the viewpoint of wettability.

Such adjusted ink composition of the present invention is preferably used as the inkjet recording ink. Specifically, the ink composition of the present invention is ejected onto the recording medium by an inkjet printer, and then the ejected ink composition is cured by irradiation of the active radioactive ray for recording.

Since the image area is cured by irradiation of the active radioactive rays such as ultraviolet rays, and the image area has an excellent strength, the printed material obtained by the ink can be used for various usages such as formation of an ink receiving layer (image area) of a planographic printing plate, in addition to image formation by the ink.

<Inkjet Recording Method and Printed Matters>

The inkjet recording method (inkjet recording method of the invention) to which the ink composition of the invention is suitably applied will be described below.

The inkjet recording method of the invention includes the steps of ejecting the ink composition of the invention onto a recording medium (support, recording material, etc.) using an inkjet recording apparatus and curing the ejected ink composition by irradiation with active radiation. Images are formed onto the recording medium with the cured ink composition.

The recording medium to which the ink composition of the present invention can be applied is not specifically limited, and papers such as a normal uncoated paper and a coated paper, various nonabsorbable resin materials used for so-called soft packaging, or a resin film thereof formed into a film shape may be used. Examples of various plastic films include a PET film, an OPS film, an OPP film, an ONy film, a PVC film, a PE film, and a TAC film. Other plastics that can be used as material of the recording medium include polycarbonate, acrylic resin, ABS, polyacetal, PVA, and rubbers. Moreover, metals or glasses may be used as the recording medium.

If a material with less heat shrinkage on curing is selected for the ink composition of the present invention, the adhesiveness of the cured ink composition onto the recording medium becomes excellent, providing an advantage of being capable of forming a very fine image even on a film that is easily curled or deformed by ink shrinkage on curing or heating during the curing reaction, such as a PET film, an OPS film, an OPP film, an ONy film, and a PVC film that can be shrunk by heat.

Further, one recording material applicable in the invention includes a support of a planographic printing plate, which is to be described later.

Examples of the active radiation applicable in the inkjet recording method of the invention include α-rays, γ-rays, X-rays, ultraviolet rays, visible rays, infrared rays and electron beam. The peak wavelength of the active radiation is preferably 200 to 600 nm, more preferably 300 to 450 nm, and even more preferably 350 to 420 nm. Further, the output of the active radiation is preferably 2,000 mJ/cm$^2$ or less, more preferably 10 to 2,000 mJ/cm$^2$, even more preferably 20 to 1,000 mJ/cm$^2$, and particularly preferably 50 to 800 mJ/cm$^2$.

In particular, in the inkjet recording method of the invention, radiation is preferably irradiated from a light-emitting diode generating ultraviolet rays where an emission peak wavelength is 350 to 420 mm and a maximum illuminance on the recording medium surface is 10 to 1,000 mW/cm$^2$.

In addition to the above conditions and the like, the conditions applied to an inkjet recording method of the invention and the details of an inkjet recording apparatus will be described below in a planographic printing plate and a method of manufacturing a planographic printing plate of the invention that are preferred applications of the inkjet recording method of the invention.

By employing the abovementioned inkjet recording method, with respect to various recording media having various surface wettability, the dot diameter of the deposited ink can be kept constant and the image quality is improved. In order to obtain a colored image, it is preferable to superpose inks in the order from less bright color to brighter color. By superposing inks in the order from less bright color to brighter color, the irradiation rays can readily reach to the ink at the bottom, and excellent curable sensitivity, reduction in residual monomer, odor reduction, and improvement in adhesiveness can be expected. In the irradiation, all colors can be ejected and exposed to light all in at once, however each color is preferably exposed to light one by one from the viewpoint of accelerating the curing.

In the printed material of the invention, an image is formed by the above-described inkjet recording method (the inkjet recording method of the invention) using the ink composition of the invention.

For this reason, the printed material has an image with high quality and excellent flexibility.

<Planographic Printing Plate and Method of Manufacturing Planographic Printing Plate>

A method for producing a planographic printing plate of the invention is a method for producing a planographic printing method including a step of ejecting the ink composition of the invention onto a support, and a step of curing the ink composition by irradiating active radiation onto the ejected ink composition so as to form on the substrate a hydrophobic image with the cured ink composition.

A planographic printing plate of the invention is a planographic printing plate that is produced by the method for producing a planographic printing plate of the invention. The planographic printing plate has a substrate, and a hydrophobic image formed onto the substrate.

In the related art, as the planographic printing plate, a PS plate having the configuration in which a lipophilic photosensitive resin layer is provided on a hydrophilic substrate is widely used. As a method of manufacturing the PS plate, normally, after mask exposure (surface exposure) is conducted through a lith film, an unexposed portion is dissolved and removed, thereby obtaining a desired printing plate. In recent years, however, a digitization technology that electronically processes, stores, and outputs image information widely spread, and a new image output system is demanded accordingly. In particular, a computer to plate (CTP) technology that scans digitized image information with light having high preference, such as laser light, without using a lith film, thereby directly manufacturing a printing plate is being developed.

As a system that obtains a planographic printing plate for scanning exposure, a method of directly producing a planographic printing plate using an ink composition or an inkjet recording ink composition is exemplified. According to this method, ink is ejected onto a substrate (preferably, a hydrophilic substrate) by an inkjet method and then is exposed to active radiation such that a portion of the ink composition is exposed, and a printing plate having a desired image (preferably, a hydrophobic image) is obtained. An ink composition that is suitable for this method is the ink composition of the invention.

The respective steps of the method of manufacturing the planographic printing plate of the invention will now be described.

[Step of Ejecting the Ink Composition of the Invention onto a Support]

(Support)

A support (recording medium) on which the inkjet recording ink of the present invention can be ejected is not particularly limited as long as it is a dimensionally stable plate-like material. Examples thereof include a paper, a paper laminated with a plastic (such as polyethylene, polypropylene, and polystyrene), a metal plate (such as aluminum, zinc, and copper), a plastic film (such as cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinylacetal), and a paper and a plastic film on which the abovementioned metals are laminated or deposited. Preferred examples of the support include a polyester film and an aluminum plate. Among these, preferred is an aluminum plate having excellent dimensional stability and relatively low cost.

The aluminum plate is a pure aluminum plate, an alloy plate having aluminum as the main component containing a small amount of different components, or an aluminum or aluminum alloy thin film laminated with plastics. Examples of different components contained in the aluminum alloy include silicon, iron, manganese, copper, magnesium, chromium, zinc, bismuth, nickel, and titanium. The content of the different components in the alloy is preferably not more than 10 weight %. In the present invention, a pure aluminum plate is preferred. However, since it is difficult to produce completely pure aluminum in terms of the refining technique, a small amount of different components may be contained. The composition of the aluminum plate is not specified and well-known materials can be suitably used.

The thickness of the support is preferably 0.1 to 0.6 mm, more preferably 0.15 to 0.4 mm.

Prior to using the aluminum plate, it is preferred to apply surface treatments such as surface roughening and anodic oxidation. Such surface treatments facilitate improving the hydrophilicity and ensuring the adhesiveness of the image recording layer and the support. Prior to the surface roughening of the aluminum plate, a degreasing treatment for removing rolling oil on the surface using, for example, a surfactant, an organic solvent or an alkaline aqueous solution is performed.

The surface roughening of the aluminum plate is performed by various methods, such as mechanical surface roughening, electrochemical surface roughening (surface roughening in which the surface is electrochemically dissolved), and chemical surface roughening (surface roughening in which the surface is chemically selectively dissolved).

As the method of mechanical surface roughening, well-known methods such as a ball polishing method, a brush polishing method, a blast polishing method, and a buff polishing method may be used. Moreover, in the step for rolling the aluminum, a transcriptional method in which a rugged shape is transcripted using a rugged roller may be used.

Examples of the method of electrochemical surface roughening include a method performed by alternating current or direct current in an electrolyte containing acids such as hydrochloric acid and nitric acid. Moreover, examples thereof include a method using mixed acid described in JP-A No. 54-63902.

After the surface-roughening, the aluminum plate is subjected to alkali etching using an aqueous solution such as potassium hydroxide and sodium hydroxide as necessary. Furthermore, after the neutralization treatment, an anodic oxidation is performed so as to improve the abrasion resistance as desired.

In the anodic oxidation of the aluminum plate, any electrolyte may be used, as long as it can form a porous oxide coating. Generally used are, for instance, sulfuric acid, hydrochloric acid, oxalic acid, chromic acid and mixtures thereof. The concentration of these electrolytes is suitably selected depending on the types of electrolytes.

Since the conditions for the anodic oxidation variously vary depending on the types of electrolytes used, it can not be indiscriminately specified. However in general, it is preferable that the electrolyte concentration is 1 to 80% by mass, the electrolyte temperature is 5 to 70° C., the current density is 5 to 60 A/dm$^2$, the electric voltage is 1 to 100 V, and the electrolysis time is 10 seconds to 5 minutes. The amount of the anodic oxide coating formed is preferably 1.0 to 5.0 g/m$^2$, and more preferably 1.5 to 4.0 g/m$^2$. Within such a range, excellent printing durability and excellent scratch resistance in the non-image area of the planographic printing plate may be obtained.

The support used in the present invention may be a substrate as is, that has been surface treated and has an anodic oxide coating. However, an expansion treatment or sealing of microspores in the anodic oxide coating described in JP-A No. 2001-253181 and JP-A No. 2001-32236, and a surface hydrophilizing in which the substrate is soaked in an aqueous solution containing hydrophilic compounds may be suitably selected and performed as necessary, in order to further improve the adhesiveness with the top layer, hydrophilicity, fouling resistance, and thermal insulation properties. Of course, the expansion treatment and sealing are not limited to those described above, and any well-known method may be performed.

[Sealing]

Possible examples of the sealing besides vapor sealing include sealing by an aqueous solution containing inorganic fluorine compounds such as treatment using zirconate fluoride only, treatment by sodium fluoride, vapor sealing by adding lithium chloride, and sealing by hot water.

Among these, preferred are sealing by an aqueous solution containing inorganic fluorine compounds, sealing by vapor, and sealing by hot water. Hereunder are respective descriptions thereof.

<Sealing by Aqueous Solution Containing Inorganic Fluorine Compounds>

Metal fluorides are preferred examples of the inorganic fluorine compounds used for the sealing by an aqueous solution containing inorganic fluorine compounds.

Specific examples thereof include sodium fluoride, potassium fluoride, calcium fluoride, magnesium fluoride, sodium zirconate fluoride, potassium zirconate fluoride, sodium titanate fluoride, potassium titanate fluoride, ammonium zirconate fluoride, ammonium titanate fluoride, potassium titanate fluoride, zirconate fluoride, titanate fluoride, hexafluorosilicic. acid, nickel fluoride, iron fluoride, phosphate fluoride, and ammonium phosphate fluoride. Among these, preferred are sodium zirconate fluoride, sodium titanate fluoride, zirconate fluoride, and titanate fluoride.

The concentration of the inorganic fluorine compound in the aqueous solution is preferably not less than 0.01 mass %, more preferably not less than 0.05 mass % from the point of sufficient sealing of the microspores in the anodic oxide coating, and is preferably not more than 1 mass %, more preferably not more than 0.5 mass % from the point of the fouling resistance.

The aqueous solution containing the inorganic fluorine compound preferably further contains the phosphate compound. If the phosphate compound is contained, the surface hydrophilicity of the anodic oxide coating is improved, so that the developability and the fouling resistance can be improved.

Preferred examples of the phosphate compounds include a metal phosphate such as an alkali metal and an alkali earth metal.

Specifically, examples thereof include zinc phosphate, aluminum phosphate, ammonium phosphate, diammonium hydrogenphosphate, ammonium dihydrogenphosphate, ammonium phosphate, potassium phosphate, sodium phosphate, potassium dihydrogenphosphate, dipotassium hydrogenphosphate, calcium phosphate, sodium ammonium hydrogenphosphate, magnesium hydrogenphosphate, magnesium phosphate, ferrous phosphate, ferric phosphate, sodium dihydrogenphosphate, sodium biphosphate, disodium hydrogenphosphate, lead phosphate, diammonium phosphate, calcium dihydrogenphosphate, lithium phosphate, phosphorus wolframate, ammonium phosphowolframate, sodium phosphowolframate, ammonium phosphomolybdate, sodium phosphomolybdate, sodium phosphite, sodium tripolyphosphate and sodium pyrophosphate. Among these, sodium dihydrogenphosphate, disodium hydrogenphosphate, potassium dihydrogenphosphate and dipotassium hydrogenphosphate are preferred.

The combination of the inorganic fluorine compound and the phosphate compound is not specifically limited. However, the aqueous solution preferably contains at least sodium zirconate fluoride as an inorganic fluorine compound and at least sodium dihydrogenphosphate as a phosphate compound.

The concentration of the phosphate compound in the aqueous solution is preferably not less than 0.01 mass %, more preferably not less than 0.1 mass % from the point of improving the developability and fouling resistance, and is preferably not more than 20 mass %, more preferably not more than 5 mass % from the point of the solubility.

The ratio of the respective compounds in the aqueous solution is not specifically limited. However, the mass ratio of the inorganic fluorine compound and the phosphate compounds is preferably 1/200 to 10/1, more preferably 1/30 to 2/1.

Moreover, the temperature of the aqueous solution is preferably not less than 20° C., more preferably not less than 40° C., and preferably not more than 100° C., more preferably not more than 80° C.

The aqueous solution is preferably not less than pH1, more preferably not less than pH2, and preferably not more than pH11, more preferably not more than pH5.

The method of sealing by an aqueous solution containing the inorganic fluorine compound is not specifically limited, and examples thereof include a soaking method and a spraying method. One type thereof may be solely used for a plurality of times, or two or more types thereof may be used in combination.

Among these, the soaking method is preferred. If the soaking method is used for treatment, the treatment time is preferably not less than 1 second, preferably not less than 3 seconds, and preferably not more than 100 seconds, more preferably not more than 20 seconds.

<Sealing by Vapor>

Examples of sealing by vapor include a method in which a pressurized or atmospheric vapor is continuously or discontinuously made in contact with an anodic oxide coating.

The temperature of the vapor is preferably not less than 80° C., more preferably not less than 95° C., and not more than 105° C.

The pressure of the vapor is preferably within a range from (atmospheric pressure−50 mmAq) to (atmospheric pressure+300 mmAq) ($1.008 \times 10^5$ to $1.043 \times 10^5$ Pa).

Moreover, the time for making the vapor in contact is preferably not less than 1 second, more preferably not less than 3 seconds, and not more than 100 seconds, more preferably not more than 20 seconds.

<Sealing by Hot Water>

Examples of sealing by hot water include a method in which an aluminum plate having an anodic oxide coating formed is soaked in hot water.

The hot water may contain inorganic salts (such as phosphate) or organic salts.

The temperature of the hot water is preferably not less than 80° C., more preferably not less than 95° C., and not more than 100° C.

Moreover, the time for soaking in hot water is preferably not less than 1 second, more preferably not less than 3 seconds, and not more than 100 seconds, more preferably not more than 20 seconds.

Examples of the hydrophilizing used in the present invention include an alkali metal silicate method described in U.S. Pat. Nos. 2,714,066, 3,181,461, 3,280,734, and 3,902,734. In the method, the support is soaked in an aqueous solution such as sodium silicate, or electrolyzed. Other examples include a method of treatment using potassium zirconate fluoride described in JP-B No. 36-22063, and a method of treatment using polyvinylsulfonic acid described in U.S. Pat. Nos. 3,276,868, 4,153,461, and 4,689,272.

The central line average roughness of the support of the present invention is preferably 0.10 to 1.2 μm. Within this range, excellent adhesiveness with the image recording layer, excellent printing durability, and excellent fouling resistance can be obtained.

If the inkjet recording ink of the present invention is ejected onto the surface of the hydrophilic support, it is preferable that the inkjet recording ink is heated to 40 to 80° C., preferably 25 to 30° C. so as to decrease the viscosity of the ink composition to 7 to 30 mPa·s, preferably 7 to 20 mPa·s, and then ejected. In particular, usage of an ink composition having an ink viscosity of 35 to 500 mPa·s at 25° C. provides a great effect. By using this method, high ejecting stability can be achieved.

The radioactive ray curable inkjet recording ink such as the ink of the present invention generally has a greater viscosity than that of an aqueous ink that is normally used for the inkjet recording ink. Therefore the viscosity fluctuates a lot due to the temperature fluctuation at the time of printing. The fluctuation of the ink viscosity has a large affect on the change in the droplet size and the droplet ejecting speed, causing deterioration in the image quality. Therefore, it is required to keep the ink temperature at the time of printing as constant as possible. Therefore, the temperature control range of the present invention is suitably ±5° C., preferably ±2° C., and more preferably ±1° C. with respect to the set temperature.

(Inkjet Recording Apparatus)

The inkjet recording apparatus used in the present invention is not specifically limited, and a commercially available inkjet recording apparatus can be used. That is, in the present invention, the recording can be performed onto the recording medium using a commercially available inkjet recording apparatus.

The inkjet recording apparatus of the present invention includes for example an ink supply system, a temperature sensor, and a radioactive source.

The ink supply system comprises, for example: a source tank containing the inkjet recording ink of the present invention; supply piping; an ink supply tank immediately in front of an inkjet head; a filter; and a piezo type inkjet head. The piezo type inkjet head can be driven so that multisize dots of 1 to 100 pl, preferably 8 to 30 pl can be ejected with a resolution of for example 320×320 to 4000×4000 dpi, preferably 400× 400 to 1600×1600 dpi, and more preferably 720×720 dpi. In the present invention dpi denotes the number of dots per 2.54 cm.

As described above, it is desirable that radiation-curable ink discharged from nozzles be kept at a predetermined temperature. Therefore, it is possible to thermally insulate or heat a portion from the ink supply tank to the inkjet head. For example, the following method may be used as a temperature control method: a plurality of temperature sensors are provided each pipe; and heating control is performed on the basis of the amount of ink flowing through the pipe and an environmental temperature. However, the invention is not limited thereto. The temperature sensors can be provided in the ink supply tank and around the nozzles of the inkjet head. It is preferable that the heating head unit be thermally insulated or shielded such that the main body of the apparatus is not influenced by a variation in temperature due to the air from the outside. In order to shorten the printer warming-up time required for heating or reduce the loss of thermal energy, it is preferable to perform thermal insulation from other portions and to reduce the overall thermal capacity of the heating unit.

[Step of Forming onto a Support a Hydrophobic Image Obtained by Curing an Ink Composition by Irradiating the Ink Composition with Active Radiation]

The ink composition ejected onto the surface of the support is cured by irradiating the active radiation. At this time, when a sensitizing dye is present, together with a polymerization initiator (photoinitiator), in the ink composition, the sensitizing dye in the system is excited by absorbing the active radiation and facilitates decomposition of the polymerization initiator by contacting with the polymerization initiator to achieve a higher sensitive curing reaction.

Here the radioactive rays to be used include α rays, γ rays, electron beams, X rays, ultraviolet rays, visible light, and infrared light. The peak wavelength of the radioactive ray depends on the absorption property of the sensitizing dye. However, it is suitable if this is for example, 200 to 600 nm, preferably 300 to 450 nm, and more preferably 350 to 420 nm. Moreover, the polymerization initiation system of the present invention has sufficient sensitivity even to radioactive rays of low output. Therefore, the output of the radioactive rays is suitably within an irradiation energy of for example not more than 2000 mJ/cm$^2$, preferably 10 to 2000 mJ/cm$^2$, more preferably 20 to 1000 mJ/cm$^2$, and even more preferably 50 to 800 mJ/cm$^2$. The radioactive rays are suitably irradiated at an exposure face illuminance of for example 10 to 2000 mW/cm$^2$, preferably 20 to 1000 mW/cm$^2$.

As the radioactive source, a mercury-vapor lamp or a gas/ solid state laser are mainly used. For the ultraviolet ray curable inkjet, a mercury-vapor lamp and a metal halide lamp are widely known. However, presently, a mercury-free lamp is strongly desired from the viewpoint of environmental protection, and it is industrially and environmentally very useful to replace it by a GaN semiconductor ultraviolet light emitting device. Furthermore, the LED (UV-LED) and the LD (UV-LD) has small size, long life, high efficiency, and low cost, which is expected for a light source for a light curable inkjet.

Moreover, the light emitting diode (LED) and the laser diode (LD) can be used as a radioactive source. In particular, if an ultraviolet source is required, a UV-LED and a UV-LD can be used. For example, Nichia Corporation has brought into the market a purple LED having the wavelength of the main emission spectrum between 365 nm and 420 nm. If a still shorter wavelength is required, an LED emitting radioactive rays having the wavelength center between 300 nm and 370 nm is disclosed in U.S. Pat. No. 6,084,250. Moreover, other UV-LEDs are available, and radiation having different ultraviolet bands can be irradiated. A particularly preferred radioactive source in the present invention is a UV-LED, and more particularly preferred is a UV-LED having a peak wavelength at 350 to 420 nm.

The maximum illuminance on the recording medium of LED is preferably 10 to 2,000 mW/cm$^2$, more preferably 20 to 1,000 mW/cm$^2$, particularly preferably 50 to 800 mW/cm$^2$.

The inkjet recording ink of the present invention is suitably irradiated by such radioactive rays for, for example 0.01 to 120 seconds, preferably 0.1 to 90 seconds.

The irradiation condition and basic irradiation method of the radioactive rays is disclosed in JP-A No. 60-132767. Specifically, it is performed by providing light sources on the both sides of a head unit including the ink ejecting device, and scanning the head unit and the light sources by a so-called shuttle method. The radioactive rays are irradiated after a fixed time (for example 0.01 to 0.5 seconds, preferably 0.01 to 0.3 seconds, more preferably 0.01 to 0.15 seconds) after the ink is deposited. Such a control of the time from ink depositing to irradiation within a very short time enables preventing bleeding of the ink deposited onto the recording medium before being cured. Moreover, since a porous recording medium can also be exposed to light before the ink is permeated to the deep part where the light source can not reach, residual unreacted monomer can be reduced, resulting in odor reduction.

Furthermore, the curing may be completed by another light source without driving. A method of using an optical fiber, and a method wherein a collimated light source is faced to a mirror surface provided on the side face of a head unit to irradiate UV light to a recording unit are disclosed as an irradiation method in WO99/54415.

Thus, according to the method for producing a planographic printing plate of the invention, the ink composition of the invention may be cured at high sensitivity with irradiation of the active radiation to form a hydrophobic image on the support surface.

As described above, the ink composition of the invention may be cured at higher sensitivity with the active radiation to form a hydrophobic area (hydrophobic image) having excellent film strength and flexibility.

In this regard, the planographic printing plate (planographic printing plate of the invention) obtained by the method for producing a planographic printing plate of the invention has an image area having high image quality and excellent flexibility and printing durability.

Hereinafter, the third embodiment of the invention will be described in detail.

The third embodiment of the invention is a compound represented by the following formula (i).

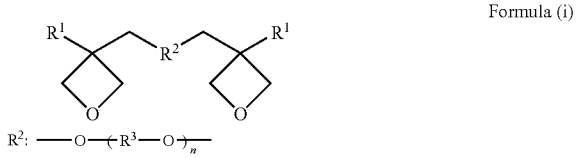

Formula (i)

In the formula (i), $R^1$ each independently represents an alkyl group, a cycloalkyl group or an aryl group; $R^3$ represents an alkylene group, a cycloalkylene group or an arylene group; and n represents an integer of 1 or more.

In the formula (i), an alkyl group represented by $R^1$ includes an alkyl group having 1 to 10 (preferably 1 to 6, more preferably 1 to 4) carbon atoms. Specific examples thereof include a methyl group, an ethyl group, a propyl group, an isopropyl group, a butyl group, a pentyl group and a hexyl group.

The an alkyl group represented by $R^1$ is preferably a methyl group, an ethyl group, a propyl group, an isopropyl group, a butyl group and a pentyl group, more preferably a methyl group, an ethyl group, a propyl group and an isopropyl group.

In the formula (i), a cycloalkyl group represented by $R^1$ includes a cycloalkyl group having 4 to 12 (preferably 5 to 7, more preferably 5 to 6) carbon atoms. Specific examples thereof include a cycloheptyl group, a cyclohexyl group, a cyclopentyl group and a bicyclic group.

The cycloalkyl group represented by $R^1$ is preferably a cycloheptyl group, a cyclohexyl group and a cyclopentyl group, more preferably a cycloheptyl group and a cyclohexyl group.

A phenyl group represented by $R^1$ includes an aryl group having 6 to 12 (preferably 6 to 8) carbon atoms. Specific examples thereof include a phenyl group, a biphenyl group, a naphthyl group and a benzyl group.

An aryl group represented by $R^1$ is preferably a phenyl group, a biphenyl group, a naphthyl group and a benzyl group, more preferably a phenyl group and a benzyl group.

Among these, $R^1$ is preferably an alkyl group, more preferably an alkyl group having 1 to 4 carbon atoms.

Two $R^1$'s in the formula (I) may be the same or different from each other, but are preferably the same from the viewpoint of synthesis suitability and the $R^1$'s are most preferably an alkyl group having 1 to 4 carbon atoms from the viewpoint of polymerization reactivity.

In the formula (i), an alkylene group represented by $R^3$ includes an alkylene group having 2 to 12 (preferably 2 to 8, more preferably 2 to 6) carbon atoms. Specific examples thereof include an ethylene group, a propylene group, an isopropylene group, a butylene group, a pentylene group and a hexylene group.

A cycloalkylene group represented by $R^3$ includes a cycloalkylene group having 4 to 12 (preferably 4 to 8, more preferably 5 to 7) carbon atoms. Specific examples thereof include a cycloheptyl group, a cyclohexyl group, a cyclopentyl group and a bicyclic group.

An arylene group represented by $R^3$ includes an arylene group having 6 to 12 (preferably 6 to 12, more preferably 6 to 8) carbon atoms. Specific examples thereof include a phenyl group, a biphenyl group, a naphthyl group, a benzyl group. Preferred are a phenyl group and a benzyl group.

Among these, $R^3$ is preferably an alkyl group, more preferably an alkyl group having 1 to 4 carbon atoms.

$R^1$ and $R^3$ may be further substituted with substituents, if introducible. Examples of substituents introducible to $R^1$ and $R^3$ include a halogen atom, an alkoxy group, an aryloxy group, a nitro group and an amino group.

The compound represented by the formula (i) is preferably one in which both $R^1$'s are each an alkyl group having 1 to 4 carbon atoms and $R^3$ is an alkyl group having 1 to 4 carbon atoms.

n represents an integer of 1 or more, preferably an integer of 1 to 8, more preferably an integer of 2 to 6, and particularly preferably an integer of 2 to 4, from the viewpoints of low viscosity and high sensitivity.

Hereinafter, representative and specific examples of the compound represented by the formula (i) [exemplified compounds (1) to (7)] will be described, but the invention is not limited to these specific examples in any way.

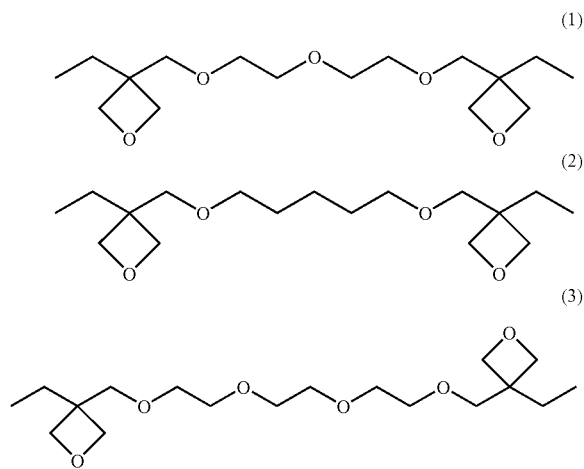

-continued

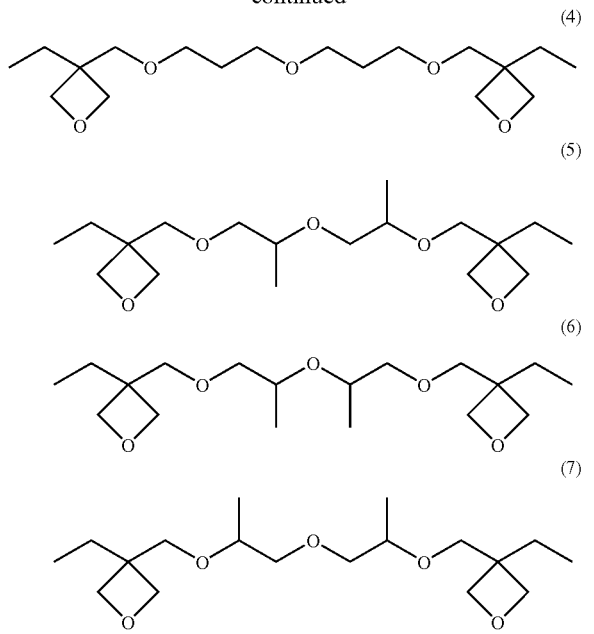

(4)

(5)

(6)

(7)

The compound represented by the formula (i) can be produced by the following production method.

(1) Raw Materials

First, raw materials in the production of an oxetane compound represented by the formula (i) will be described. That is, any raw material can be used if the raw material makes it possible to produce an oxetane compound according to the method by Motoi (Motoi et. al., Bull. Chem. Soc. Jpn. 61, 1998) as a dehydrohalogenation reaction. Specifically, an oxetane compound represented by the formula (i) can be produced by an etherification reaction of an oxetane alcohol compound represented by the formula (ii) with a dihalogenated ether compound represented by the formula (iii).

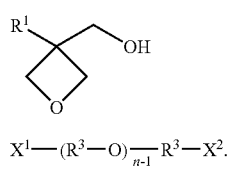

Formula (ii)

$X^1$—$(R^3$—$O)_{n-1}$—$R^3$—$X^2$.

Formula (iii)

In the formula (ii), $R^1$ represents an alkyl group, a cycloalkyl group or an aryl group. In the formula (iii), $R^3$ represents an alkylene group, a cycloalkylene group or an arylene group. n represents an integer of 1 or more. $X^1$ and $X^2$ each independently represent a halogen leaving group or sulfonate ester leaving group.

More specific oxetane compound(s) represented by the formula (ii) may be one or a combination of two or more selected from 3-methyl-3-oxetanemethanol, 3-methyl-3-oxetaneethanol, 3-methyl-3-oxetanepropanol, 3-ethyl-3-oxetanemethanol, 3-ethyl-3-oxetaneethanol, 3-ethyl-3-oxetanepropanol, 3-propyl-3-oxetanemethanol, 3-propyl-3-oxetaneethanol and 3-propyl-3-oxetane propanol.

More specific dihalogenated ether compound(s) represented by the formula (iii) may be one or a combination of two or more selected from bis(2-chloroethyl)ether, bis(2-bromoethyl)ether, bis(3-chloropropyl)ether, bis(3-bromopropyl)ether, bis(4-chlorobutyl)ether, bis(4-bromobutyl)ether, bis(2-bromoethyl)ether and 1,2-bis(2-chloroethoxy)ethane.

The reaction ratio between the oxetane alcohol compound represented by the formula (ii) and the dihalogenated ether compound represented by the following formula (iii) is not particularly limited. Preferably, 0.05 to 0.6 mole of the dihalogenated ether compound represented by the formula (iii) is reacted with 1 mole of the oxetane alcohol compound represented by the formula (ii). More preferably, 0.2 to 0.5 mole of the dihalogenated vinyl ether compound represented by the formula (iii) is reacted with 1 mole of the oxetane alcohol compound represented by the formula (ii).

(2) Reaction Temperature

The following will describe the reaction temperature upon the production of the oxetane compound represented by the formula (I). The reaction temperature for reacting the above-mentioned two components is decided, considering the yield of the oxetane compound or the like, but the reaction temperature is in the range of preferably 0 to 100° C., more preferably 10 to 90° C., and even more preferably 20 to 80° C. from the viewpoint of reactivity between the raw materials and yield improvement, and the degree of freedom of selectivity of organic solvents usable.

(3) Reaction Time

Next, the following will describe the reaction time upon the production of the oxetane compound represented by the formula (i). The reaction time is decided, considering the yield of the oxetane compound, the reaction temperature or the like. For example, a value in the range of 10 minutes to 100 hours is preferable at the preferable reaction temperature of 0 to 100° C. In this reaction time range, unreacted raw materials are not remained and thus high productivity can be attained. The reaction time upon the production of the oxetane compound is more preferably set to a value in the range of 30 minutes to 50 hours and even more preferably set to a value in the range of 1 to 10 hours.

(4) Reaction Atmosphere (pH)

The following will describe the reaction atmosphere (pH) upon the production of the oxetane compound represented by the formula (i). The reaction atmosphere (pH value) is decided, considering the yield of the oxetane compound or the like, but the reaction atmosphere is preferably in the range of 5 to 14 from the viewpoint of suppression of a side reaction and the degree of freedom on the selection of raw materials used. The pH value upon the production of the oxetane compound is more preferably set to a value in the range of 6 to 14 and even more preferably set to a value in the range of 7 to 14. In order to adjust the pH value in these ranges, it is preferable to add alkali such as sodium hydroxide and potassium hydroxide.

(5) Phase Transfer Catalyst

The following will describe the phase transfer catalyst used upon the production of the oxetane compound represented by the formula (i). This phase transfer catalyst is preferably added during the reaction to improve the reactivity of the oxetane alcohol compound and the dihalogenated ether compound. For example, the added amount of the phase transfer catalyst is preferably set to a value in the range of 0.1 to 30 parts by weight per 100 parts by weight of the total amount of the raw materials, from the viewpoint of expression properties of effects such as the improvement in the reactivity and yield by addition, and easy purification of the oxetane compound obtained. The added amount of the phase transfer catalyst is more preferably set to a value in the range of 1.0 to 20.0 parts by weight and even more preferably set to a value in the range of 2.0 to 10.0 parts by weight per 100 parts by weight of the total amount of the raw materials.

The kind of the phase transfer catalyst is not particularly limited. For example, the phase transfer catalyst is preferably at least one compound selected from the group consisting of a quaternary ammonium salt compound and a quaternary phosphonium salt compound. More examples of the phase transfer catalyst include tetra-n-butylammonium bromide, tetramethylammonium bromide, benzyltriethylammonium bromide, hexadecyltrimethylammonium bromide, triethylhexadecylammonium bromide, trioctylmethylammonium bromide, methyltriphenylphosphonium bromide, triethylhexadecylphosphonium bromide, tetraphenylphosphonium bromide and tetrabutylphosphonium bromide. These may be used alone or in combination of two or more thereof.

(6) Organic Solvent

The following will describe the organic solvent used upon the production of the oxetane alcohol compound represented by the formula (ii) and the dihalogenated ether compound represented by the following formula (iii). This organic solvent is preferably a liquid whose boiling point under the atmospheric pressure is 250° C. or lower since the liquid is a good solvent for the raw materials and the production can be easily made. Examples of the organic solvent include hydrocarbons such as hexane, heptane and octane, halogenated hydrocarbons such as dichloromethane and chloroform, ethers such as diethyl ether, dibutyl ether, ethylene glycol dimethyl ether, tetrahydrofuran and dioxane, ketones such as acetone, methyl ethyl ketone, methyl isobutyl ketone and cyclohexanone, esters such as ethyl acetate, butyl acetate, amyl acetate and γ-butyrolactone, and aromatic hydrocarbons such as benzene, toluene and xylene. These may be used alone or in combination of two or more thereof.

A structure of the compound obtained by the production method can be identified from $^1$H-NMR and IR spectra.

Hereinafter, the exemplified embodiments of the invention are will be enumerated.

<1> A curable composition containing a compound (A) that has a structure having two or more cyclic ether groups in a molecule and a linking group that links the cyclic ether groups and includes an alkylene group having 4 or more carbon atoms (hereinafter appropriately referred to as a "specific polymerizable compound").

<2> The curable composition as described in the above <1>, further containing a compound (B) that generates acid upon exposure to radiation.

<3> An ink composition comprising the curable composition as described in the above <1> or <2>.

<4> The ink composition as described in the above <3>, further comprising a colorant (C).

<5> The ink composition that is used for inkjet recording, as described in the above <3> or <4>.

<6> An inkjet recording method, comprising: ejecting the ink composition as described in any one of the above <3> to <5> onto a recording medium using an inkjet recording apparatus; and curing the ejected ink composition by irradiation with active radiation.

<7> The inkjet recording method as described in the above <6>, wherein the active radiation comprises ultraviolet rays irradiated from a light-emitting diode generating ultraviolet rays wherein an emission peak wavelength is in the range of 350 to 420 nm and a maximum illuminance on a surface of the recording medium is 10 to 2,000 mW/cm$^2$.

<8> Printed matter recorded by using the inkjet recording method as described in the above <6> or <7>.

<9> A method for producing a planographic printing plate of the invention comprising: ejecting the ink composition as described in any one of the above <3> to <5> onto a support, and a step of curing the ink composition by irradiating active radiation onto the ejected ink composition so as to form a hydrophobic image on the support with the cured ink composition.

<10> A planographic printing plate, which is produced by the method for producing a planographic printing plate, as described in the above <9>.

<11> A curable composition containing a compound that has, in a molecule, two or more moiety structures containing a 4-membered or more cyclic ether and a moiety structure represented by the following formula (Y-I):

Formula (Y-I)

wherein, in the formula (Y-I), R$^1$ represents an alkylene group, a cycloalkylene group or an arylene group; and n represents an integer of 1 or more.

<12> The curable composition as described in the above <11>, wherein the cyclic ether is any one of cyclic ethers shown in the following figures:

FIG. 1

FIG. 2

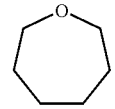

FIG. 3

<13> The curable composition as described in the above <11>, further containing a compound which generates acid upon exposure to radiation.

<14> An ink composition comprising the curable composition as described in any one of the above <11> to <13> and a colorant.

<15> An inkjet recording method, comprising: ejecting an ink composition onto a recording medium using an inkjet recording apparatus, the ink composition containing a polymerizable compound (a) having two or more moiety structures containing a 4-membered or more cyclic ether and a moiety structure represented by the formula (Y-I), a compound (b) that generates acid upon exposure to radiation and a (c) colorant, and curing the ejected ink composition by irradiation with active radiation:

Formula (Y-I)

wherein, in the formula (Y-I), R$^1$ represents an alkylene group, a cycloalkylene group or an arylene group; and n represents an integer of 1 or more.

The curable composition of the invention is useful as a stereolithographic material such as a resist, a color filter such as an optical disc, in addition to an ink composition such as UV curable ink, a coating material and an adhesive.

In particular, the curable composition of the invention can be suitably used as an ink composition, specifically an ink composition for inkjet recording. This ink composition is cured at high sensitivity with radiation such as ultraviolet rays to form high quality images. Therefore, this ink composition also has excellent adhesion to a recording medium and can also exhibit storage stability.

The specific polymerizable compound of the invention has a large distance between crosslinking points due to the presence of a linking group containing a long-chained alkylene group and a large degree of rotation freedom of a linking group, and therefore the cured coating film formed is also in flexibility.

By applying the inkjet recording method, even though the ink composition is discharged onto a nonabsorbable recording medium, the ink composition can be cured at high sensitivity to directly form an image area having high strength on the basis of digital data. Therefore, the ink composition of the invention is suitably used in the production of printed matters and a planographic printing plate, particularly in the production of a planographic printing plate having large surface area, larger than an A2 plate and the planographic printing plate obtained is excellent in printing durability.

<16> A compound represented by the following formula (i):

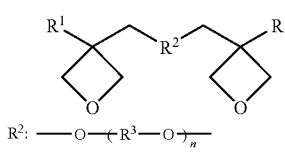

Formula (i)

$R^2$: —O—(R³—O)ₙ— wherein, in the formula (I), each $R^1$ independently represents an alkyl group, a cycloalkyl group or an aryl group; $R^3$ represents an alkylene group, a cycloalkylene group or an arylene group; and n represents an integer of 1 or more.

<17> A method for producing the compound as described in the above <16>, comprising carrying out an etherification reaction of an oxetane alcohol compound represented by the formula (ii) with a dihalogenated ether compound represented by the formula (iii).

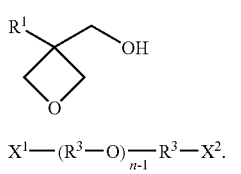

Formula (ii)

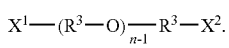

Formula (iii)

$X^1$—(R³—O)ₙ₋₁—R³—X².

EXAMPLES

Hereinafter, the present invention will be described in more detail by reference to Examples and Comparative Examples, but the invention is not limited to these examples.

Example 1

Preparation of Ink

<Yellow Ink X-1>

| | |
|---|---|
| (C) C.I. Pigment Yellow 13 | 5 parts by weight |
| (B) Photocationic polymerization initiator: triphenylsulfonium salt | 6 parts by weight |
| (UVI-6992, available from The Dow Chemical Company) Sensitizing dye: 9,10-dibutoxyanthracene Polymerizable compound | 3 parts by weight |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 29 parts by weight |
| Monomer: (A) the following specific polymerizable compound (X-a-1) | 22 parts by weight |

Specific polymerizable compound (X-a-1)

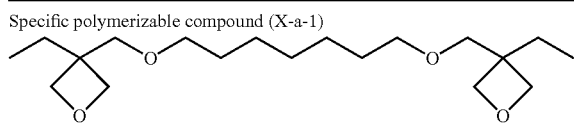

<Magenta Ink X-1>

| | |
|---|---|
| (C) C.I. Pigment Red 57: 1 | 15 parts by weight |
| (B) Photocationic polymerization initiator: triphenylsulfonium salt (UVI-6992, available from The Dow Chemical Company) | 6 parts by weight |
| Sensitizing dye: 9,10-dibutoxyanthracene Polymerizable compound | 3 parts by weight |
| Monomer: 3,4-epoxycyclohexylmethyl-3',4'-epoxycyclohexanecarboxylate (Celloxide 2021A: manufactured by Daicel UCB Co., Ltd.) | 35 parts by weight |
| Monomer: 3-ethyl-3-hydroxymethyloxetane (OXT-101: available from Toagosei Co., Ltd.) | 29 parts by weight |
| Monomer: (A) the specific polymerizable compound (X-a-1) | 22 parts by weight |

<Cyan Ink X-1>

| | |
|---|---|
| (C) C.I. Pigment Blue 15: 3 | 5 parts by weight |
| (B) Photocationic polymerization initiator: triphenylsulfonium salt (UVI-6992, available from The Dow Chemical Company) | 6 parts by weight |
| Sensitizing dye: 9,10-dibutoxyanthracene Polymerizable compound | 3 parts by weight |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 29 parts by weight |
| Monomer: (A) the specific polymerizable compound (X-a-1) | 22 parts by weight |

<Black Ink X-1>

| | |
|---|---|
| (C) C.I. Pigment Black 7 | 5 parts by weight |
| (B) Photocationic polymerization initiator: triphenylsulfonium salt (UVI-6992, available from The Dow Chemical Company) | 6 parts by weight |
| Sensitizing dye: 9,10-dibutoxyanthracene polymerizable compound | 3 parts by weight |
| Monomer: 3,4-epoxycyclohexylmethyl-3',4'-epoxycyclohexanecarboxylate (Celloxide 2021A: available from Daicel UCB Co., Ltd.) | 35 parts by weight |

| | |
|---|---|
| Monomer: 3-ethyl-3-hydroxymethyloxetane (OXT-101: available from Toagosei Co., Ltd.) | 29 parts by weight |
| Monomer: (A) the specific polymerizable compound (X-a-1) | 22 parts by weight |

Each coarse color ink X-1 prepared above was filtrated through a filter having an absolute filtration precision of 2 μm to obtain ink X-1 of each color.

<<Inkjet Image Recording>>

Next, recording on a recording medium was performed using a commercially available inkjet recording apparatus having a piezo type inkjet nozzle. The ink supply system has an initial tank, a supply piping, an ink supply tank immediately in front of an inkjet head, a filter, and a piezo type inkjet head. The heat insulation and heating were performed from the ink supply tank to the inkjet head. The temperature sensors were respectively provided in the vicinity of the ink supply tank and the nozzle of the inkjet head to perform temperature control such that the nozzle part was always at 70° C.±2° C. The piezo type inkjet head was driven such that multi-size dots of 8 to 30 pl can be ejected with a resolution of 720×720 dpi. After spotting, the exposure system, the main scanning speed, and the ejection frequency were adjusted such that UV rays were concentrated to an exposure illuminance of 100 mW/cm², and the irradiation starts after 0.1 second since ink was spotted onto the recording medium. Moreover, the exposure time was variable to irradiate exposure energy. The term 'dpi' in the invention denotes the number of dots per 2.54 cm.

<Formation and Evaluation of Color Image>

Ink of each color prepared above was respectively ejected at an environmental temperature of 25° C., in an order of black→cyan→magenta→yellow, and the ultraviolet rays were irradiated for each color using a metal halide lamp (Trade Name: Vzero 085, manufactured by Integration Technology, Co., Ltd.). Light exposure was performed such that the total exposure energy per one color is uniform, that is, 100 mJ/cm², as energy for complete curing, to eliminate stickiness in a touch test. The respective color images were recorded on a grained aluminum substrate, a biaxial oriented transparent polypropylene film that was subjected to a surface treatment to give printability, a soft polyvinyl chloride sheet, a cast coated paper, and a commercially available recycled paper, as the recording medium. As a result, all provided an image of high resolution without dot bleeding. Further, on a woodfree paper, ink did not penetrate to the backside, and ink was sufficiently cured with almost no odor due to unreacted monomer. In addition, ink recorded onto the film had sufficient flexibility. Even if the film was bent, no crack occurred in ink, and there was no peeling and no problem found in the adhesiveness test by Cellophane Tape® peeling.

Example 2

Magenta Ink X-2

Magenta Ink X-2 was prepared in the same as in Magenta Ink X-1 except that, in Magenta Ink X-1 prepared in Example 1, 22 parts by weight of (A) the specific polymerizable compound (X-a-1) of monomers used as the polymerizable compound, was changed to 22 parts by weight of (A) the following specific polymerizable compound (X-a-2).

Specific polymerizable compound (X-a-2)

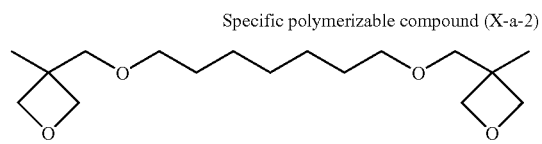

Example 3

Magenta Ink X-3

Magenta Ink X-3 was prepared in the same as in Magenta Ink X-1 except that, in Magenta Ink X-1 prepared in Example 1, 22 parts by weight of (A) the specific polymerizable compound (X-a-1) of monomers used as the polymerizable compound, was changed to 22 parts by weight of (A) the following specific polymerizable compound (X-a-3).

Specific polymerizable compound (X-a-3)

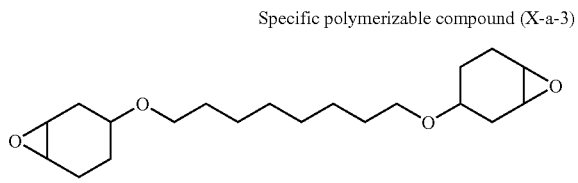

Example 4

Magenta Ink X-4

Magenta Ink X-4 was prepared in the same as in Magenta Ink X-1 except that, in Magenta Ink X-1 prepared in Example 1, 22 parts by weight of (A) the specific polymerizable compound (X-a-1) of monomers used as the polymerizable compound, was changed to 22 parts by weight of (A) the following specific polymerizable compound (X-a-4).

Specific polymerizable compound (X-a-4)

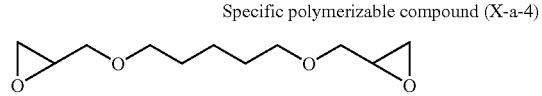

Example 5

Magenta Ink X-5

| | |
|---|---|
| (C) C.I. Pigment Red 57: 1 | 5 parts by weight |
| (B) Photocationic polymerization initiator: triphenylsulfonium salt (UVI-6992, available from The Dow Chemical Company) | 6 parts by weight |
| Sensitizing dye: 9,10-dibutoxyanthracene | 3 parts by weight |
| Polymerizable compound | |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 31 parts by weight |

-continued

| | |
|---|---|
| Monomer: 3,7-bis(3-oxetanyl)-5-oxanonane (OXT-221: available from Toagosei Co., Ltd.) | 17 parts by weight |
| Monomer: (A) the following specific polymerizable compound (X-a-5) | 3 parts by weight |

Specific polymerizable compound (X-a-5)

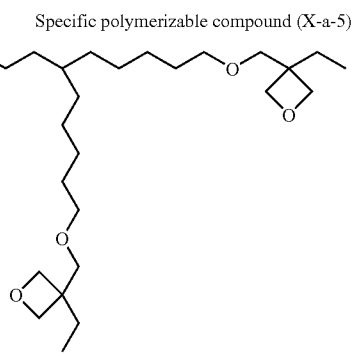

Example 6

Magenta Ink X-6

| | |
|---|---|
| (C) C.I. Pigment Red 57: 1 | 5 parts by weight |
| (B) photocationic polymerization initiator: triphenylsulfonium salt (UVI-6992, available from The Dow Chemical Company) | 6 parts by weight |
| Sensitizing dye: 9,10-dibutoxyanthracene | 3 parts by weight |
| Polymerizable compound | |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 32 parts by weight |
| Monomer: 3,7-bis(3-oxetanyl)-5-oxanonane (OXT-221: available from Toagosei Co., Ltd.) | 17 parts by weight |
| Monomer: (A) the following specific polymerizable compound (X-a-6) | 2 parts by weight |

Specific polymerizable compound (X-a-6)

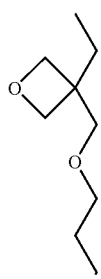

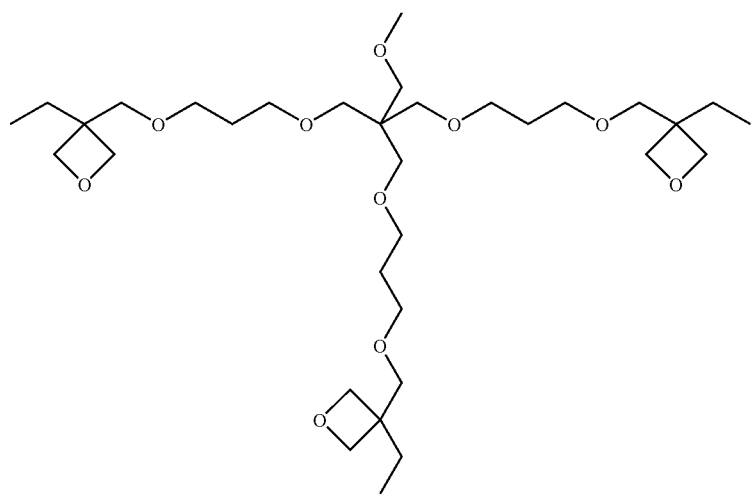

Comparative Example 1

Magenta Ink X-8

Magenta Ink X-8 was prepared in the same as in Magenta Ink X-1 except that, in Magenta Ink X-1 prepared in Example 1, 22 parts by weight of (A) the specific polymerizable compound (X-a-1) of monomers used as the polymerizable compound, was changed to 22 parts by weight of 3,7-bis(3-oxetanyl)-5-oxanonane (OXT-221: available from Toagosei Co., Ltd.).

Coarse Magenta Inks X-2 to X-8 prepared in Examples 2 to 7 and Comparative Example 1 were filtrated through a filter having an absolute filtration precision of 2 μm to obtain Magenta Inks X-2 to X-8.

The ink compositions prepared in Examples and Comparative Example had an ink viscosity of 7 to 20 mPa·s at the temperature during ejecting of ink.

<Evaluation>

The curability (curing sensitivity) of each ink was measured by the following method.

In addition, Magenta Ink X-2 to X-8 of Examples 2 to 7 and Comparative Example 1 prepared in such a manner, and Magenta Ink X-1 prepared in Example 1 were used, and magenta images were formed in the same manner as the method described in Example 1. For each formed image, the evaluation on the flexibility of the cured material was performed by the following method.

1. Evaluation of Curability

Upon curing of Magenta Ink X-1 to X-8, exposure energy was measured by a radiometer (Trade Name: UV PowerMAP, manufactured by EIT Inc.). As a result, a total exposure of ultraviolet rays is approximately 330 mJ/cm$^2$, and it was confirmed that ink is cured with high sensitivity.

The curability was evaluated through a touch test of the image area of the printed material by such ink after curing. Here, 'good' flexibility refers to a state where no stickiness exists, and 'bad' flexibility refers to a state where stickiness exists.

2. Measurement of Curing Sensitivity

The amount (mJ/cm$^2$) of exposure energy providing no stickiness on an image surface after irradiation of ultraviolet rays was defined as the curing sensitivity. A smaller numeric value means high sensitivity.

3. Evaluation of Flexibility

The evaluation of flexibility was performed according to a degree of a crack generated a cured film (image) after bending a PVC sheet having a magenta image ten times. The bending test is a functional evaluation of a five scale evaluation when a state where no crack is generated is set to a value of five. The value of three or more is evaluated as a state where no problem for practical use exists.

TABLE 1

| | Magenta Ink Number | Curability | Sensitivity (mJ/cm$^2$) | Flexibility |
| --- | --- | --- | --- | --- |
| Example 1 | X-1 | Good | 250 | 5 |
| Example 2 | X-2 | Good | 250 | 5 |
| Example 3 | X-3 | Good | 250 | 5 |
| Example 4 | X-4 | Good | 250 | 4 |
| Example 5 | X-5 | Good | 165 | 5 |
| Example 6 | X-6 | Good | 165 | 5 |
| Example 7 | X-7 | Good | 250 | 5 |
| Comparative Example 1 | X-8 | Bad | 660 | 1 |

As will be apparent from Table 1, the ink compositions (magenta ink X-1 to X-7) of the invention are cured with high sensitivity and have good curability. In addition, the resultant image has excellent flexibility.

Meanwhile, in case of magenta ink X-8 of Comparative Example 1, it can be seen that curability and flexibility of the formed image are low.

Example 8

Image Formation with Light-Emitting Diode (LED)

Inkjet image recording was performed in the same manner as Example 1, except that Magenta Ink X-1 prepared in Example 1 was used, and an ultraviolet light-emitting diode (UV-LED) is used, instead of a metal halide lamp (Trade Name: Vzero 085, manufactured by Integration Technology, Co., Ltd.).

The UV-LED used in this example was NCCU033 manufactured by Nichia Corporation. The LED emits ultraviolet light having a wavelength of 365 nm from a single chip. The light emission at approximately 100 mW is realized when a current of approximately 500 mA is applied to the chip. Multiple chips arranged at an interval of 7 mm give power of 0.3 W/cm$^2$ on the surface of the recording medium. The period from ink deposition to exposure, and the exposure time can be changed according to the conveyance speed of the recording medium and the distance between the head and the LED in the conveyance direction. In this Example, the droplet is exposed to light approximately 0.5 second after ink deposition.

By appropriately setting the distance to the medium and the conveyance speed, the exposure energy on the recording medium may be adjusted in a range of 0.01 to 15 J/cm$^2$.

Comparative Example 2

Image Formation with Light-Emitting Diode (LED)

Inkjet image recording was performed in the same manner as in Example 8 except that, in Example 8, Magenta Ink X-8 prepared in Comparative Example 1 is used instead of magenta ink X-1.

<Evaluation>

For ink of Example 8 and Comparative Example 3, curability and curing sensitivity are measured in the above-described method.

Further, for the image formed by ink of Example 8 and Comparative Example 3, the evaluation of flexibility is performed by the above-described method.

The evaluation results are shown in Table 2.

TABLE 2

| | Magenta Ink Number | Curability | Sensitivity (mJ/cm$^2$) | Flexibility |
| --- | --- | --- | --- | --- |
| Example 8 | X-1 | Good | 50 | 5 |
| Comparative Example 2 | X-8 | Bad | 165 | 2 |

From Table 2, it can be seen that the ink composition (magenta ink X-1) of the invention has high sensitivity to the ultraviolet light-emitting diode, and the resultant image has excellent flexibility.

Further, through the comparison of a case where an ultraviolet lamp in Table 1 is used and a case where an ultraviolet light-emitting diode in Table 2 is used, it can be seen that a case where the ultraviolet light-emitting diode is used is high sensitive to irradiation of radiation.

Example 9

Fabrication of Substrate

A melt is prepared from Si: 0.06% by weight, Fe: 0.30% by weight, Cu: 0.025% by weight, Mn: 0.001% by weight, Mg: 0.001% by weight, Zn: 0.001% by weight, and Ti: 0.03% by weight, with the balance being aluminum and an aluminum alloy as inadvertent impurities. The melt was subjected to molten metal treatment and filtration, and then was cast into a 500 mm thick, 1,200 mm wide ingot by a direct chill (DC) casting method. The ingot was scalped with a scalping machine, removing an average of 10 mm from the surface, and then soaked and held at 550° C. for about 5 hours. When the temperature was fallen to 400° C., the ingot was rolled with a hot rolling mill to a thickness of 2.7 mm. Further, a heat treatment was carried out at 500° C. in a continuous annealing furnace, following which cold rolling was carried out to a final thickness of 0.24 mm, thereby giving a sheet of JIS 1050 aluminum. The resultant aluminum had a minor axis of 50 μm and a major axis of 300 μm in the average grain diameter. The aluminum sheet was cut to a width of 1,030 mm, and then subjected to a surface treatment as described below, thereby producing an aluminum substrate.

—Surface Treatment—

The aluminum sheet was successively subjected to the following surface treatments (a) to (j). After each treatment and subsequent rinsing with water, liquid is removed from the sheet with nip rollers.

(a) Mechanical Surface-Roughening Treatment

While supplying a suspension (specific gravity: 1.12) of an abrasive (pumice) in water, as an abrading slurry, onto a surface of the aluminum plate, a mechanical surface-roughening treatment was performed by rotating roller-shaped nylon brushes. The average grain diameter of the abrasive is 30 μm and the maximum grain diameter thereof was 100 μm. The material of the nylon brushes is 6·10-nylon, the bristle length thereof was 45 mm, and the bristle diameter thereof was 0.3 mm. The nylon brushes were each obtained by making holes in a stainless steel cylinder having a diameter of 300 mm and then planting bristles densely. The number of the used rotating brushes was three. The distance between two support rollers (diameter: 200 mm) under each of the brushes was 300 mm. Each of the brush rollers was pushed against the aluminum plate until the load of a driving motor for rotating the brush got 7 kW larger than the load before the brush roller was pushed against the aluminum plate. The rotational direction of the brush was the same as the moving direction of the aluminum plate. The rotation speed of the brush was 200 rpm.

(b) Alkali Etching Treatment

An aqueous solution having a caustic soda concentration of 2.6% by weight, an aluminum ion concentration of 6.5% by weight, and a temperature of 70° C. was sprayed to etch the aluminum plate, thereby dissolving the aluminum plate by 10 g/m². Thereafter, the aluminum plate was washed with sprayed water.

(c) Desmutting Treatment

The aluminum plate was subjected to a desmutting treatment with a 30° C. aqueous solution having a nitric acid concentration of 1% by weight (and containing 0.5% by weight of aluminum ions), which was sprayed, and then washed with sprayed water. The aqueous nitric acid solution used in the desmutting treatment was a waste liquid from the step of conducting an electrochemical surface-roughening treatment using an alternating current in an aqueous nitric acid solution.

(d) Electrochemical Surface-Roughening Treatment

An alternating current having a frequency of 60 Hz was used to conduct an electrochemical surface-roughening treatment continuously. An electrolyte used at this time was a 10.5 g/L solution of nitric acid in water (containing 5 g/L of aluminum ions and 0.007% by weight of ammonium ions), and the temperature thereof was 50° C. The alternating current was a trapezoidal wave alternating current. The time until the current value was raised from zero to a peak is 0.8 msec, and the duty ratio of the current is 1:1. A carbon electrode was used as a counter electrode to conduct the electrochemical surface-roughening treatment. Ferrite was used as an auxiliary anode.

The density of the current is 30 A/dm² when the current is at the peak. The total of electricity quantities when the aluminum plate functions as an anode is 220 C/dm². 5% of the current sent from a power source is caused to flow into the auxiliary anode. Thereafter, the aluminum plate is washed with sprayed water.

(e) Alkali Etching Treatment

An aqueous solution having a caustic soda of 26% by weight and an aluminum ion concentration of 6.5% by weight was used to etch the aluminum plate at 32° C. so as to dissolve the aluminum plate by 0.50 g/m², thereby removing smut components mainly formed of aluminum hydroxide and generated when the alternating current was used to conduct the electrochemical surface-roughening treatment in the previous step, and further dissolving edges of formed pits so as to be made smooth. Thereafter, the aluminum plate was washed with sprayed water.

(f) Desmutting Treatment

The aluminum plate was subjected to a desmutting treatment with a 30° C. aqueous solution having a nitric acid concentration of 15% by weight (and containing 4.5% by weight of aluminum ions), which was sprayed, and then washed with sprayed water. The aqueous nitric acid solution used in the desmutting treatment was a waste liquid from the step of conducting the electrochemical surface-roughening treatment using the alternating current in the aqueous nitric acid solution.

(g) Electrochemical Surface-Roughening Treatment

An alternating current having a frequency of 60 Hz was used to conduct an electrochemical surface-roughening treatment continuously. An electrolyte used at this time was a 5.0 g/L solution of hydrochloric acid in water (containing 5 g/L of aluminum ions), and the temperature thereof was 35° C. The alternating current was a trapezoidal wave alternating current. The time until the current value was raised from zero to a peak is 0.8 msec, and the duty ratio of the current is 1:1. A carbon electrode was used as a counter electrode to conduct the electrochemical surface-roughening treatment. Ferrite was used as an auxiliary anode.

The density of the current was 25 A/dm² when the current was at the peak. The total of electricity quantities when the aluminum plate functions as an anode was 50 C/dm². Thereafter, the aluminum plate was washed sprayed water.

(h) Alkali Etching Treatment

An aqueous solution having a caustic soda of 26% by weight and an aluminum ion concentration of 6.5% by weight was used to etch the aluminum plate at 32° C. so as to dissolve the aluminum by 0.12 g/m², thereby removing smut components mainly formed of aluminum hydroxide and generated when the alternating current was used to conduct the electrochemical surface-roughening treatment in the previous step, and further dissolving edges of formed pits so as to be made smooth. Thereafter, the aluminum plate was washed with sprayed water.

(i) Desmutting Treatment

The aluminum plate was subjected to a desmutting treatment with a 60° C. aqueous solution having a sulfuric acid concentration of 25% by weight (and containing 0.5% by weight of aluminum ions), which was sprayed, and then washed with sprayed water.

(j) Anodic Oxidation Treatment

An anodic oxidation device (the length of each of first and second electrolyzing sections was 6 m, the length of each of first and second feeding sections was 3 m, and the length of each of first and second feeding sections was 2.4 m) was used to conduct an anodic oxidation treatment. The electrolytes supplied to the first and second electrolyzing sections were each sulfuric acid. The electrolytes are each an electrolyte having a sulfuric acid concentration of 50 g/L (and containing 0.5% by weight of aluminum ions), and the temperature thereof was 20° C. Thereafter, the substrate is washed with sprayed water. The final amount of an oxidation film was 2.7 g/m².

(Fabrication and Evaluation of Planographic Printing Plate)

An image was formed and cured on the aluminum substrate fabricated in the above manner using magenta ink X-1 prepared in Example 1 in the same manner as Example 1. This was used as a planographic printing plate and evaluated in terms of image and printing durability.

a. Evaluation of Image

The planographic printing plate produced using magenta ink X-1 of Example 1 was treated by a Heidel KOR-D machine. Ink [VALUES-G red for sheet-feed (made by Dainippon Ink and Chemicals, Inc.)] and a dampening water [Ecolity 2 (made by Fuji Photo Film Co. Ltd.)] were supplied to perform printing. The printed material after 100 sheets of printing was visually evaluated. As a result, it was confirmed that a good image having neither a spot peeling on the image area nor blots in the non-image area was obtained.

b. Evaluation of Printing Durability

After printing was continued in the above state, it was confirmed that 10,000 or more good printed materials having no spot peeling on the image area or no blots in the non-image area were obtained, and printing durability was at a non-problematic level for practical use.

Example 10

Preparation of Cationic Polymerizable Ink

<Preparation of Ink>>

<Yellow Ink Y-1>

| | |
|---|---|
| C.I. Pigment Yellow 13 | 5 parts by weight |
| Photocationic polymerization initiator: triphenylsulfonium salt (UVI-6992, available from The Dow Chemical Company) | 6 parts by weight |
| Sensitizing dye: 9,10-dibutoxyanthracene | 3 parts by weight |

-continued

| Polymerizable compound | |
|---|---|
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 24 parts by weight |
| Monomer: specific polymerizable compound (Y-a-1) (the following structure) | 27 parts by weight |

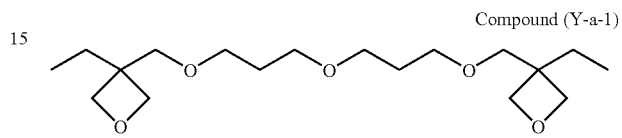

Compound (Y-a-1)

<Magenta Ink Y-1>

| | |
|---|---|
| C.I. Pigment Red 57: 1 | 5 parts by weight |
| Photocationic polymerization initiator: triphenylsulfonium salt (UVI-6992, available from The Dow Chemical Company) | 6 parts by weight |
| Sensitizing dye: 9,10-dibutoxyanthracene | 3 parts by weight |
| Polymerizable compound | |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 24 parts by weight |
| Monomer: specific polymerizable compound (Y-a-1) (the structure) | 27 parts by weight |

<Cyan Ink Y-1>

| | |
|---|---|
| C.I. Pigment Blue 15: 3 | 5 parts by weight |
| Photocationic polymerization initiator: triphenylsulfonium salt (UVI-6992, available from The Dow ChemicalCompany) | 6 parts by weight |
| Sensitizing dye: 9,10-dibutoxyanthracene | 3 parts by weight |
| Polymerizable compound | |
| Monomer: 3',4'-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 24 parts by weight |
| Monomer: Specific polymerizable compound (Y-a-1) (the structure) | 27 parts by weight |

<Black Ink Y-1>

| | |
|---|---|
| C.I. Pigment Black 7 | 5 parts by weight |
| Photocationic polymerization initiator: triphenylsulfonium salt (UVI-6992, available from The Dow Chemical Company) | 6 parts by weight |
| Sensitizing dye: 9,10-dibutoxyanthracene | 3 parts by weight |
| Polymerizable compound | |
| Monomer: 3,4-epoxycyclohexylmethyl-3',4'-epoxycyclohexanecarboxylate (Celloxide 2021A: available from Daicel UCB Co., Ltd.) | 35 parts by weight |

| | |
|---|---|
| Monomer: 3-ethyl-3-hydroxymethyloxetane (OXT-101: available from Toagosei Co., Ltd.) | 24 parts by weight |
| Monomer: Specific polymerizable compound (Y-a-1) (the structure) | 27 parts by weight |

Each coarse color ink Y-1 prepared above was filtrated through a filter having an absolute filtration precision of 2 μm to obtain ink Y-1 of each color.

<<Inkjet Image Recording>>

(Image Formation with Irradiation of Ultraviolet Rays)

(Evaluation of Multicolor Image)

Next, recording on a recording medium was performed using a commercially available inkjet recording apparatus having a piezo type inkjet nozzle. The ink supply system has an initial tank, a supply piping, an ink supply tank immediately in front of an inkjet head, a filter, and a piezo type inkjet head. The heat insulation and heating were performed from the ink supply tank to the inkjet head.

The temperature sensors were respectively provided in the vicinity of the ink supply tank and the nozzle of the inkjet head to perform temperature control such that the nozzle part was always at 70° C.±2° C.

The piezo type inkjet head was driven such that multi-size dots of 8 to 30 pl can be ejected with a resolution of 720×720 dpi. After spotting, the exposure system, the main scanning speed, and the ejection frequency were adjusted such that UV rays were concentrated to an exposure illuminance of 100 mW/cm$^2$, and the irradiation starts after 0.1 second since ink was spotted onto the recording medium. Moreover, the exposure time was variable to irradiate exposure energy. The term 'dpi' in the invention denotes the number of dots per 2.54 cm.

Ink of each color prepared above was respectively ejected at an environmental temperature of 25° C., in an order of black→cyan→magenta→yellow, and the ultraviolet rays were irradiated for each color using a metal halide lamp (Trade Name: Vzero 085, manufactured by Integration Technology, Co., Ltd.). Light exposure was performed such that the total exposure energy per one color was uniform, that is, 100 mJ/cm$^2$, as energy for complete curing, to eliminate stickiness in a touch test. The respective color images were recorded on a grained aluminum substrate, a biaxial oriented transparent polypropylene film that was subjected to a surface treatment to give printability, a soft polyvinyl chloride sheet, a cast coated paper, and a commercially available recycled paper, as the recording medium. As a result, all provided an image of high resolution without dot bleeding.

Further, on a woodfree paper, ink did not penetrate to the backside, and ink was sufficiently cured with almost no odor due to unreacted monomer.

In addition, ink recorded onto the film had sufficient flexibility. Even if the film was bent, no crack occurred in ink, and there was no peeling and no problem found in the adhesiveness test by Cellophane Tape® peeling.

Example 11

Preparation of Cationic Polymerizable Ink

<Magenta Ink Y-2>

Magenta Ink Y-2 was prepared in the same as in Magenta Ink Y-1 except that, in Magenta Ink Y-1 prepared in Example 10, 22 parts by weight of the specific polymerizable compound (Y-a-1) of monomers used as the polymerizable compound, was changed to 27 parts by weight of the following specific polymerizable compound (Y-a-2).

Specific polymerizable compound (Y-a-2)

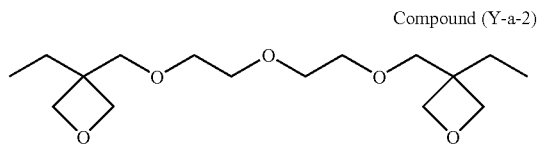

Compound (Y-a-2)

Example 12

Preparation of Cationic Polymerizable Ink

<Magenta Ink Y-3>

Magenta Ink Y-3 was prepared in the same as in Magenta Ink Y-1 except that, in Magenta Ink Y-1 prepared in Example 10, the specific polymerizable compound (Y-a-1) of monomers used as the polymerizable compound, was changed to 22 parts by weight of the following specific polymerizable compound (Y-a-3).

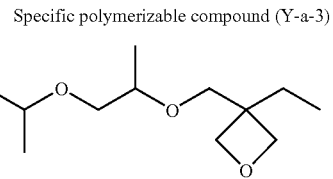

Specific polymerizable compound (Y-a-3)

Example 13

Preparation of Cationic Polymerizable Ink

<Magenta Ink Y-4>

Magenta Ink Y-4 was prepared in the same as in Magenta Ink Y-1 except that, in Magenta Ink Y-1 prepared in Example 10, 22 parts by weight of the specific polymerizable compound (Y-a-1) of monomers used as the polymerizable compound, was changed to 22 parts by weight of the following specific polymerizable compound (Y-a-4).

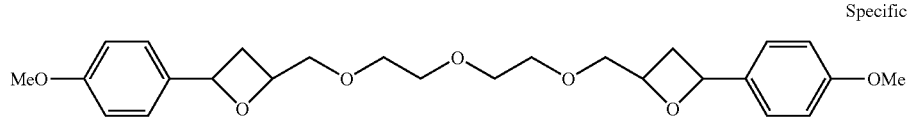

Specific polymerizable compound (Y-a-4)

Example 14

Preparation of Cationic Polymerizable Ink

<Magenta Ink Y-5>

| | |
|---|---|
| C.I. Pigment Red 57: 1 | 5 parts by weight |
| photocationic polymerization initiator: triphenylsulfonium salt (UVI-6992, available from The Dow Chemical Company) | 6 parts by weight |
| Sensitizing dye: 9,10-dibutoxyanthracene Polymerizable compound | 3 parts by weight |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 21 parts by weight |
| Monomer: 3,7-bis(3-oxetanyl)-5-oxanonane (OXT-221: available from Toagosei Co., Ltd.) | 27 parts by weight |
| Monomer: Specific polymerizable compound (Y-a-5) (the following structure) | 3 parts by weight |

Example 15

Preparation of Cationic Polymerizable Ink

<Magenta Ink Y-6>

| | |
|---|---|
| C.I. Pigment Red 57: 1 | 5 parts by weight |
| photocationic polymerization initiator: triphenylsulfonium salt (UVI-6992, available from The Dow Chemical Company) | 6 parts by weight |
| Sensitizing dye: 9,10-dibutoxyanthracene polymerizable compound | 3 parts by weight |
| Monomer: 3,4-epoxycyclohexylmethyl-3',4'-epoxycyclohexanecarboxylate (Celloxide 2021A: available from Daicel UCB Co., Ltd.) | 35 parts by weight |
| Monomer: 3-ethyl-3-hydroxymethyloxetane (OXT-101: available from Toagosei Co., Ltd.) | 16 parts by weight |
| Monomer: 3,7-bis(3-oxetanyl)-5-oxanonane (OXT-221: available from Toagosei Co., Ltd.) | 27 parts by weight |
| Monomer: Specific polymerizable compound (Y-a-6) (the following structure) | 2 parts by weight |

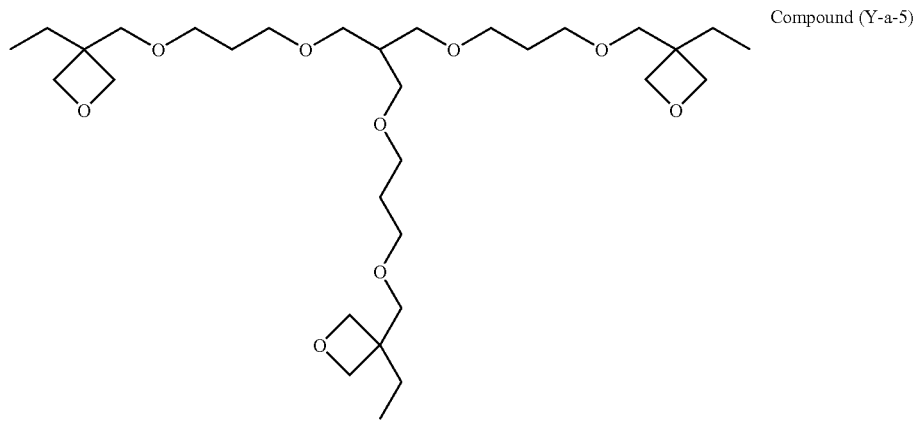

Compound (Y-a-5)

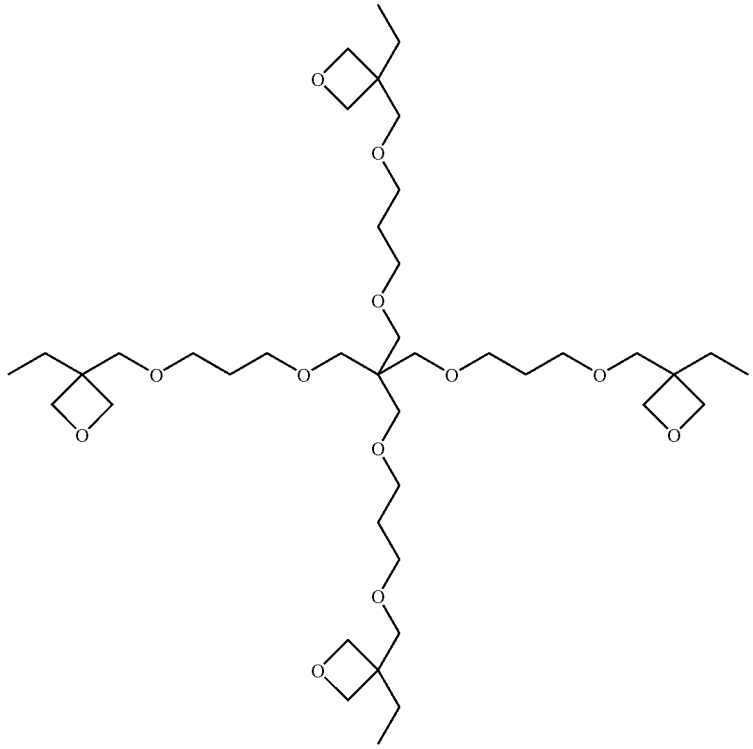

Compound (Y-a-6)

Example 16

Preparation of Cationic Polymerizable Ink

<Magenta Ink Y-7>

Magenta Ink Y-7 was prepared in the same as in Magenta Ink Y-1 except that, in Magenta Ink 1 prepared in Example 10, 3 parts by weight of 9,10-dibutoxyanthracene used as the sensitizing dye, was changed to 3 parts by weight of Darocur ITX (available from Ciba Specialty Chemicals, Inc.),

Comparative Example 3

Preparation of Cationic Polymerizable Ink

<Magenta Ink Y-8>

Magenta Ink Y-8 was prepared in the same as in Magenta Ink Y-1 except that, in Magenta Ink 1 prepared in Example 10, 27 parts by weight of the specific polymerizable compound (Y-a-1) of monomers used as the polymerizable compound, was changed to 27 parts by weight of 3,7-bis(3-oxetanyl)-5-oxanonane (OXT-221: available from Toagosei Co., Ltd.)

Coarse Magenta Inks prepared in Examples 11 to 16 and Comparative Example 3 were filtrated through a filter having an absolute filtration precision of 2 μm to obtain Magenta Inks Y-2 to Y-8.

The ink compositions prepared in Examples and Comparative Example had an ink viscosity of 7 to 30 mPa·s at the temperature during ejecting of ink.

<<Inkjet Image Recording>>

(Image Formation with Irradiation of Ultraviolet Rays)

The magenta images were produced using magenta ink Y-2 to Y-8 of Examples 11 to 16 and Comparative Example 3 and magenta ink Y-1 prepared in Example 10 in the same manner as described in Example 10.

<Evaluation of Inkjet Image>

The formed images were respectively evaluated in terms of sensitivity required for curing, odor, ink bleeding in a grained aluminum substrate, adhesiveness, printing durability, and storage stability by the following method.

(Measurement of Curing Sensitivity)

The amount of exposure energy (mJ/cm$^2$) providing no stickiness on the image surface after irradiation of ultraviolet rays was defined as the curing sensitivity. A smaller value means higher sensitivity.

(Evaluation of Odor)

The odor of the image printed on a commercially available recycled paper was evaluated by the following method.

A: almost no permeation, no odor of polymerization initiator

B: a little permeation, a little odor of polymerization initiator

C: apparent permeation of ink to the backside, strong odor of polymerization initiator (Evaluation of Ink Bleeding in Grained Aluminum Substrate)

The image printed on the grained aluminum substrate was evaluated in terms of ink bleeding by the following method.

A: no bleeding between adjacent dots

B: a little bleeding of dot

C: apparently blurred image due to bleeding of dots (Evaluation of Adhesiveness on Grained Aluminum Substrate)

Regarding the printed image made in the above manner, a sample without any scratches on the printed surface, and a sample with 11×vertical and horizontal cuts at intervals of 1 mm on the printed surface having 100 grids of 1 mm² according to JISK 5400 were made. Cellophane Tapes® were respectively attached onto the printed surfaces and quickly peeled off at an angle of 90 degrees. The conditions of the remaining printed image and the grids were evaluated by the following method.

A: no peel of printed image in the grid test

B: a little peel of ink in the grid test, but almost no peel unless the ink surface is scratched C: both are easily peeled off by Cellophane Tape®

(Evaluation of Printing Durability)

The image printed on the grained aluminum substrate was used as a printing plate for printing with a Heidel KOR-D machine, and relative comparison with the number of complete prints as an index of the printing durability was conducted (assuming that the number of prints in comparative example 10 was 100. A larger value means higher printing durability and is more preferable.

(Evaluation of Storage Stability)

Ink produced is stored at 75% RH at 60° C. for 3 days, and then ink viscosity at the ejection temperature was measured. The increase of ink viscosity is shown as a ratio of the viscosity after storage to the viscosity before storage. A ratio near 1.0 means excellent storage stability with less change in viscosity, and ink with a ratio of less than 1.5 was judged to be excellent in storage stability.

The evaluation results are shown in Table 3 described below.

(film strength) were further improved, compared with a case where a compound having two cyclic ether sections is used.

Example 17

Image Formation with Light-Emitting Diode (LED)

Inkjet image recording was conducted in the same manner as Example 10, except that magenta ink Y-1 prepared in Example 10 is used, and an ultraviolet light-emitting diode (UV-LED) was used, instead of a metal halide lamp (Trade Name: Vzero 085, manufactured by Integration Technology, Co., Ltd.).

The UV-LED used in this example was NCCU033 manufactured by Nichia Corporation. The LED emits ultraviolet light having a wavelength of 365 nm from a single chip. The light emission at approximately 100 mW is realized when a current of approximately 500 mA is applied to the chip. Multiple chips arranged at an interval of 7 mm give power of 0.3 W/cm² on the surface of the recording medium (hereinafter refer to also as medium). The period from ink deposition to exposure, and the exposure time can be changed according to the conveyance speed of the medium and the distance between the head and the LED in the conveyance direction. In this Example, the droplet is exposed to light approximately 0.5 second after ink deposition.

By appropriately setting the distance to the medium and the conveyance speed, the exposure energy on the medium may be adjusted in a range of 0.01 to 15 J/cm².

Comparative Example 4

Image Formation with Light-Emitting Diode (LED)

Inkjet image recording was conducted in the same manner as Example 17, except that magenta ink Y-8 prepared in

TABLE 3

| | Magenta Ink Number | Curing Sensitivity (mJ/cm²) | Permeability | Ink Bleeding | Adhesiveness | Printing Durability | Storage Stability |
|---|---|---|---|---|---|---|---|
| Example 10 | Y-1 | 250 | A | A | A | 100 | 1.2 |
| Example 11 | Y-2 | 330 | A | A | A | 93 | 1.2 |
| Example 12 | Y-3 | 250 | A | A | A | 93 | 1.2 |
| Example 13 | Y-4 | 250 | A | A | A | 93 | 1.2 |
| Example 14 | Y-5 | 250 | A | A | A | 93 | 1.2 |
| Example 15 | Y-6 | 165 | A | A | A | 100 | 1.2 |
| Example 16 | Y-7 | 165 | A | A | A | 100 | 1.2 |
| Comparative Example 3 | Y-8 | 660 | C | C | C | 47 | 1.4 |

From Table 3, the ink compositions of Examples 10 to 16 prepared using the curable composition of the invention were cured with high sensitivity to irradiation of ultraviolet rays and can form sharp images without ink bleeding. Further, the ink compositions were excellent in adhesiveness to the recording medium, and exhibited sufficient printing durability for practical use even though it was used to produce a planographic printing plate. Further, through the comparison of Examples 10 to 14 and Example 15 and 16, when a specified polymerizable compound having three or more cyclic ether sections was used, a curing speed and printing durability Comparative Example 3 was used, instead of magenta ink Y-1 in Example 17.

<<Evaluation of Inkjet Image>>

The formed images were respectively evaluated in terms of sensitivity required for curing, permeability on a commercially available recycled paper, ink bleeding in a grained aluminum substrate, adhesiveness, printing durability, and storage stability in the same manner as Examples 10 to 16 and Comparative Example 3 by the above-described method. The evaluation results are shown in Table 4.

TABLE 4

| | Magenta Ink Number | Exposure Method | Curing Sensitivity (mJ/cm$^2$) | Permeability | Ink Bleeding | Adhesiveness | Printing Durability | Storage Stability |
|---|---|---|---|---|---|---|---|---|
| Example 10 | Y-1 | Metal Halide Lamp | 250 | A | A | A | 100 | 1.2 |
| Example 17 | Y-1 | Light-Emitting Diode | 60 | A | A | A | 100 | 1.2 |
| Comparative Example 4 | Y-8 | Light-Emitting Diode | 85 | C | C | C | 40 | 1.2 |

The result of Example 10 when an image was cured by an ultraviolet lamp (metal halide lamp) using magenta ink of Example 10 previously conducted was described, together with the result of Example 17. Like Example 17, when the image was cured by the ultraviolet light-emitting diode, it has high sensitivity to irradiation of radiation while maintaining an image formation property with high printing durability, compared with a case where an ultraviolet lamp is used.

Comparative Example 5

Magenta Ink Y-9

Magenta Ink Y-9 was prepared in the same as the preparation of Magenta Ink Y-1 except that monomer (Y-a-1) used in Example 10 was replaced with the same amount of the monomer (Y-a-30) shown below:

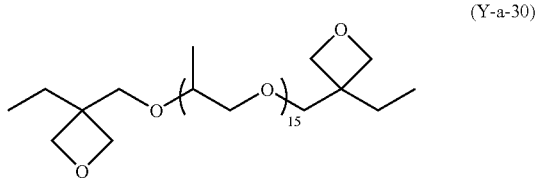

(Y-a-30)

The curing sensitivity of Magenta Ink Y-9 obtained was measured in the same manner as in Example 10. The sensitivity of Magenta Inks Y-1 and Y-9 are shown below, together with the viscosity thereof at 25° C.

TABLE 5

| | Magenta Ink Number | Curing Sensitivity (mJ/cm$^2$) | Viscosity at 25° C. (mPa) |
|---|---|---|---|
| Example 10 | Y-1 | 250 | 25 |
| Comparative Example 5 | Y-9 | 480 | 110 |

Example 18

Magenta Ink Y-10

Magenta Ink Y-10 was prepared in the same as the preparation of Magenta Ink Y-1 except that the photocationic polymerization initiator UVI-6992 used in Example 10 was replaced with the same amount of photoacid generator (b-39). The curing sensitivity of Magenta Ink Y-10 obtained was evaluated in the same manner as in Example 10, and was found to be 180 (mJ/cm$^2$). Other characteristics of Magenta Ink Y-10 were also measured, and found to be similar to those of Magenta Ink Y-1.

Example 19

A cooling tube and two dropping funnels were provided in a 3 L three-neck flask. In the 3 L three-neck flask, 1000 g of 50 wt % NaOH, 34.0 G (0.1 mol) of tetrabutylammonium bromide, and 700 ml of hexane were placed and were cooled down using a cooling bath to 0° C. 278.8 g (2.4 mol) of 3-ethyl-3-oxetane methanol was placed on one of the two dropping funnels, and 177.0 g (0.4 mol) of dipropylene glycol ditosyl ether (isomer mixture) was placed on the other dropping funnel. Then, dropping gradually started from the two dropping funnels simultaneously. After one hour, dropping ends and stirring was continued for 30 minutes in that state. Subsequently, the temperature rises to a room temperature, and stirring was performed for one hour. In addition, the temperature rises to an internal temperature of 73° C. using an oil bath. In that state, stirring was conducted for 5 hours.

After the reaction was completed, washing was conducted with water and a saturated saline solution, then filtering after drying was conducted with magnesium sulfate, and subsequently a filtered liquid was concentrated by an evaporator. The concentrated filtered liquid was purified by a silica gel column (expansion solution: hexane/ethylacetate=9/1 to 2/1). Accordingly, 200 g of a target compound (the following structure: isomer mixture) is obtained. The structure of a compound 1 was identified by $^1$H-NMR. A $^1$H-NMR chart of the compound 1 is shown in FIG. 1.

mixture

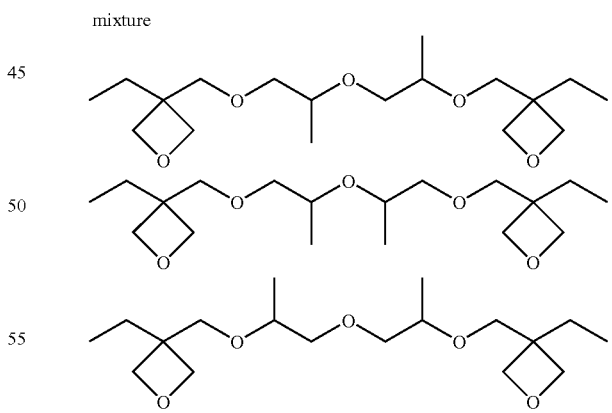

The compound of the invention is excellent in reactivity, and is useful as a polymerizable component of a curable composition that is used together with a cation polymerization initiator. The curable composition is suitably applied to UV curable ink, an adhesive, a coating agent, or the like.

According to the invention, it is possible to provide a curable composition that is cured with high sensitivity to irradiation of radiation and a cured material of which has sufficient flexibility, or a curable composition that is cured with high sensitivity to irradiation of radiation and can form a film with high strength.

According to the invention, it is possible to provide an ink composition that is cured with high sensitivity to irradiation of radiation and can form a high-quality image, and in which an image to be formed by curing has sufficient flexibility, an inkjet recording method using the ink composition, or an ink composition that is excellent in adhesiveness to a recording medium and an inkjet recording method using the ink composition.

According to the invention, it is possible to provide a printed material that has a high-quality image having excellent flexibility obtained using the ink composition and the inkjet recording method.

According to the invention, it is possible to provide a planographic printing plate that has an image area having high quality and high flexibility obtained using the ink composition and is excellent in printing durability, and a method of manufacturing the planographic printing plate.

According to the invention, it is possible to provide a novel oxetane compound that is useful as a polymerizable component of a curable composition.

All publications, patent applications, and technical standards mentioned in this specification are herein incorporated by reference to the same extent as if each individual publication, patent application, or technical standard was specifically and individually indicated to be incorporated by reference.

What claimed is:

1. An inkjet ink composition comprising a curable composition comprising a compound (A) that has a structure having two cyclic ether groups having three- or four-membered rings in a molecule and a linking group that links the cyclic ether groups and includes an alkylene group having 7 to 16 carbon atoms,
   wherein the compound (A) is a compound which is produced by an etherification reaction of a cyclic ether alcohol compound represented by the following formula (X-I) and a dihalogenated alkyl compound represented by the following Formula (X-II):

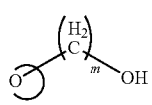

Formula (X-I)

X$^1$-R-X$^2$   Formula (X-II)

wherein, in Formula (X-I), m represents an integer of 0 to 10, the cyclic ether group in Formula (X-I) may be substituted with an alkyl group having 1 to 5 carbon atoms or an aromatic group, and in Formula (X-II), R represents an alkylene group; and X$^1$ and X$^2$ each independently represents a halogen group.

2. The inkjet ink composition of claim 1, further comprising a colorant (C).

3. An inkjet recording method, comprising:
   ejecting the inkjet ink composition of claim 1 onto a recording medium using an inkjet recording apparatus; and
   curing the ejected ink composition by irradiation with active radiation.

4. The inkjet recording method of claim 3, wherein the active radiation comprises ultraviolet rays irradiated from a light-emitting diode generating ultraviolet rays, wherein an emission peak wavelength is in the range of 350 to 420 nm and a maximum illuminance on a surface of the recording medium is 10 to 2,000 mW/cm$^2$.

5. Printed matter recorded by using the inkjet recording method of claim 3.

6. A curable composition comprising a compound represented by the following Formula (i):

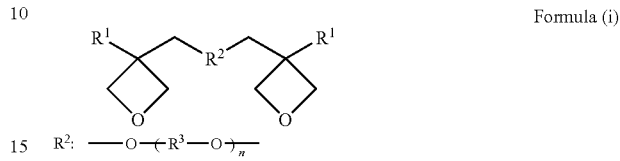

wherein, in Formula (i), each R$^1$ independently represents an alkyl group, a cycloalkyl group or an aryl group; R$^3$ represents an alkylene group having 2 to 6 carbon atoms; and n represents an integer of 2 to 4.

7. The curable composition of claim 6, further comprising a compound that generates acid upon exposure to radiation.

8. An ink composition comprising the curable composition of claim 6 and a colorant.

9. An inkjet recording method, comprising: ejecting an ink composition onto a recording medium using an inkjet recording apparatus, the ink composition containing the curable composition of claim 6, a compound (b) that generates acid upon exposure to radiation and a colorant (c); and curing the ejected ink composition by irradiation with active radiation.

10. The curable composition of claim 6, wherein the compound represented by the Formula (i) is any one of following compounds (1) and (3) to (7):

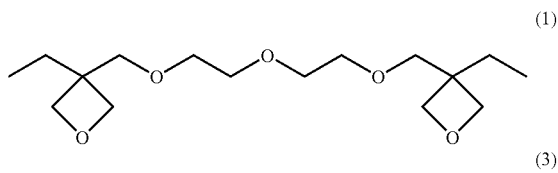

(1)

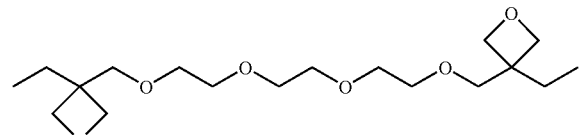

(3)

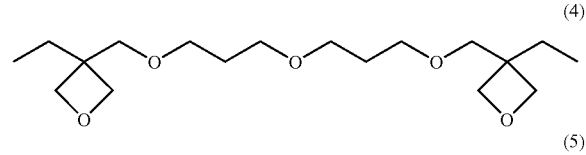

(4)

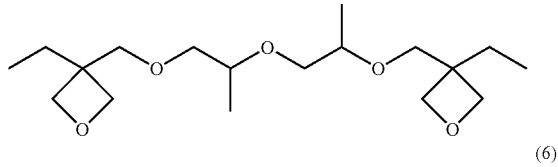

(5)

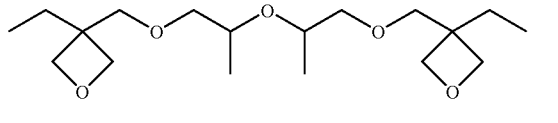

(6)

-continued

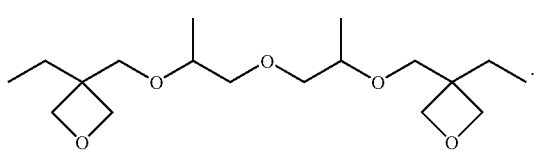
(7)

11. The inkjet ink composition of claim 1, wherein the cyclic ether groups have four-membered rings in the molecule.

12. The inkjet ink composition of claim 1, further comprising a mono-functional oxetane compound.

13. The inkjet ink composition of claim 1, having a viscosity of 35 to 200 mPa·s at room temperature.

14. The inkjet ink composition of claim 1, wherein a content of the compound (A) is 1% to 50% by weight based on the total solid content constituting the composition.

15. The curable composition of claim 6, further comprising a mono-functional oxetane compound.

16. The curable composition of claim 6, having a viscosity of 35 to 200 mPa·s at room temperature.

* * * * *